US009135944B2

(12) United States Patent
Jenks

(10) Patent No.: US 9,135,944 B2
(45) Date of Patent: Sep. 15, 2015

(54) SYSTEMS AND METHODS FOR EJECTING REMOVABLE MODULES FROM ELECTRONIC DEVICES

(71) Applicant: Apple Inc., Cupertino, CA (US)

(72) Inventor: Kenneth A. Jenks, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/089,704

(22) Filed: Nov. 25, 2013

(65) Prior Publication Data

US 2014/0078682 A1 Mar. 20, 2014

Related U.S. Application Data

(63) Continuation of application No. 13/439,580, filed on Apr. 4, 2012, now Pat. No. 8,591,240.

(51) Int. Cl.
*H01R 13/62* (2006.01)
*G11B 17/00* (2006.01)
*H01R 13/629* (2006.01)
*G06K 13/08* (2006.01)

(52) U.S. Cl.
CPC ............ *G11B 17/00* (2013.01); *G06K 13/0831* (2013.01); *H01R 13/62905* (2013.01)

(58) Field of Classification Search
CPC .. H01R 13/62; H01R 13/62938; G11B 17/00; G06K 13/0831

USPC .......................... 439/157–160; 361/754, 798
See application file for complete search history.

(56) References Cited

U.S. PATENT DOCUMENTS

| | | | |
|---|---|---|---|
| 6,027,350 A | 2/2000 | Chen et al. | |
| 6,871,080 B2 | 3/2005 | Malthouse | |
| 7,011,537 B1 | 3/2006 | Wu | |
| 7,112,075 B1 | 9/2006 | Su | |
| 7,367,828 B2 | 5/2008 | Matsukawa | |
| 7,427,206 B2 * | 9/2008 | Takei et al. | 439/159 |
| 7,815,449 B2 | 10/2010 | Maruyama | |
| 7,865,210 B2 * | 1/2011 | Wang et al. | 455/550.1 |
| 8,371,866 B1 * | 2/2013 | Su et al. | 439/159 |
| 8,395,555 B2 | 3/2013 | Hobson et al. | |

* cited by examiner

*Primary Examiner* — Khiem Nguyen
(74) *Attorney, Agent, or Firm* — Brownstein Hyatt Farber Schreck, LLP

(57) ABSTRACT

An electronic device may be provided with an ejector mechanism for at least partially ejecting a removable module (e.g., a SIM card tray) from the device. The ejector mechanism may include a user interface portion and a tray interface portion, and each interface portion may include a first end fixed to the device and a second end coupled to the second end of the other interface portion. Tension between the fixed first ends may bias the ejector mechanism to alternate between two ejector mechanism states when the ejector mechanism receives either a user input force to eject the removable module from the connector or a tray input force to insert the removable module into the connector.

18 Claims, 34 Drawing Sheets

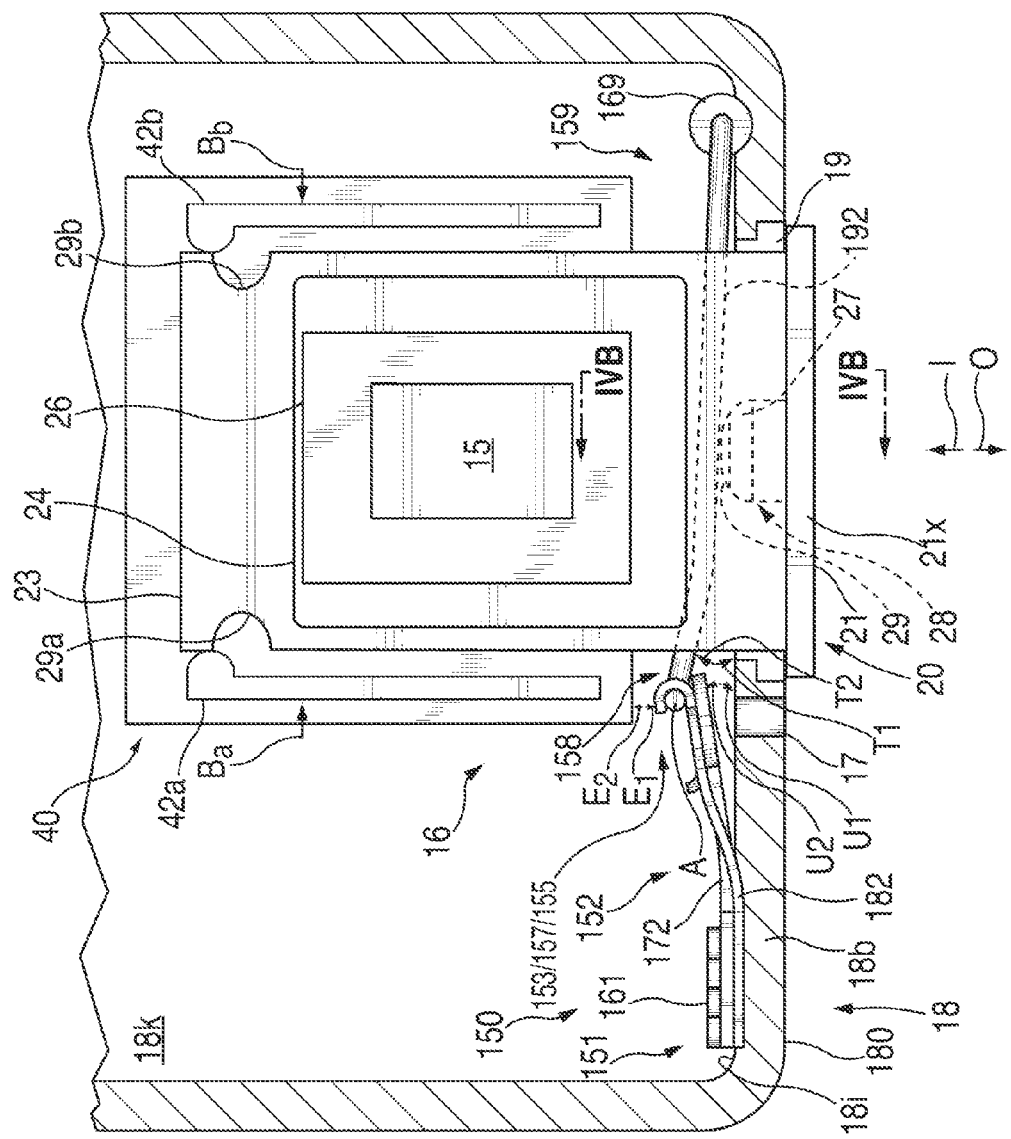

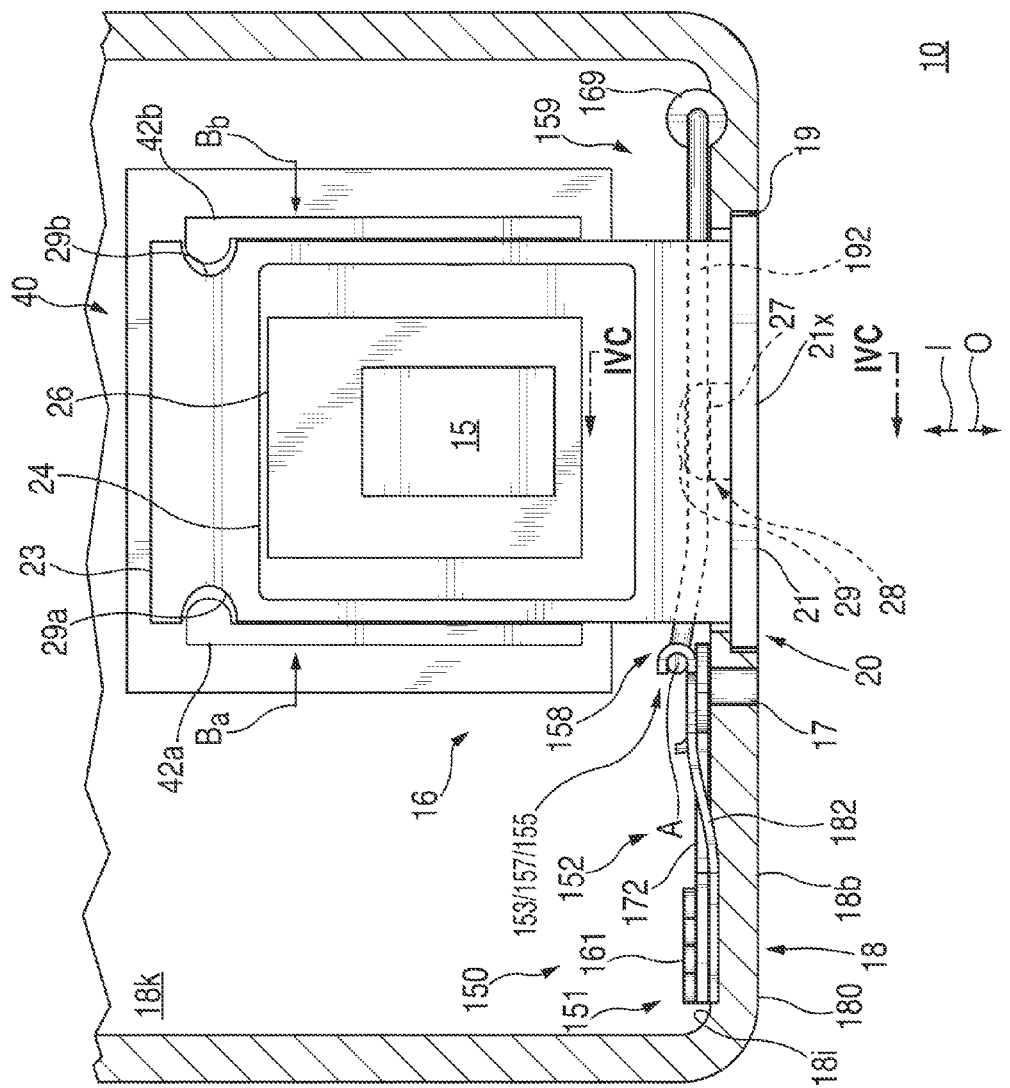

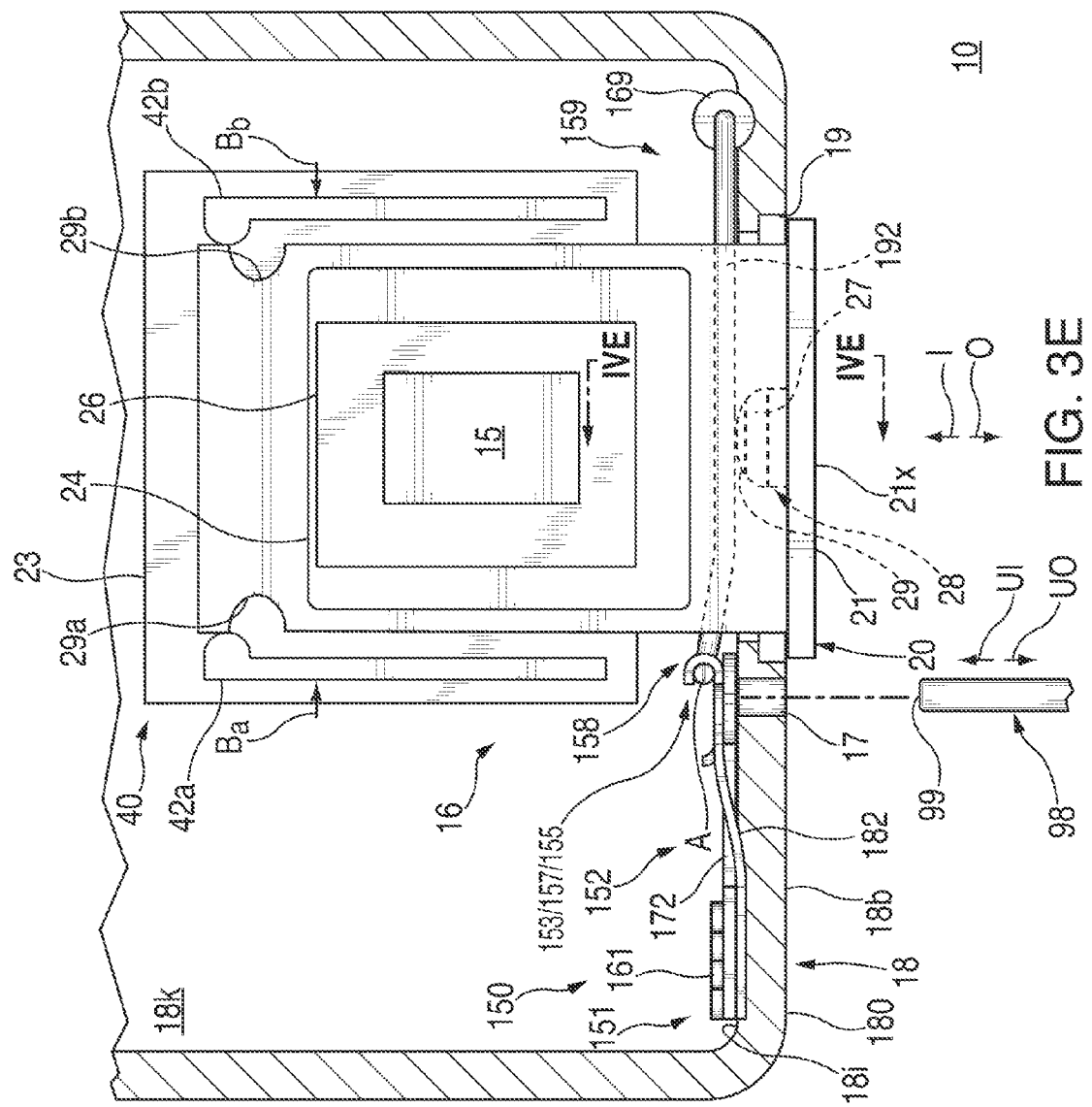

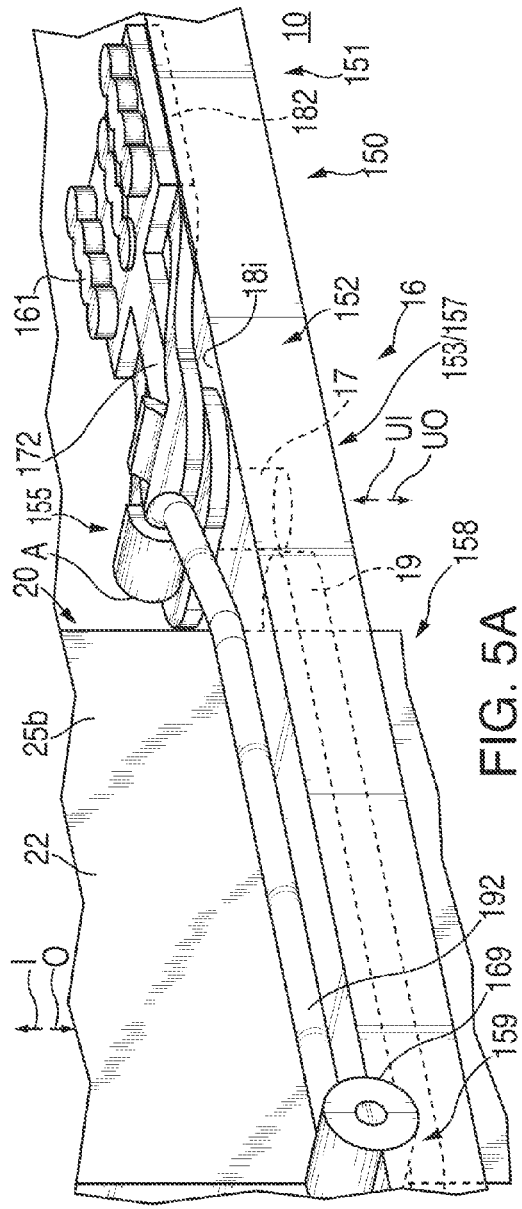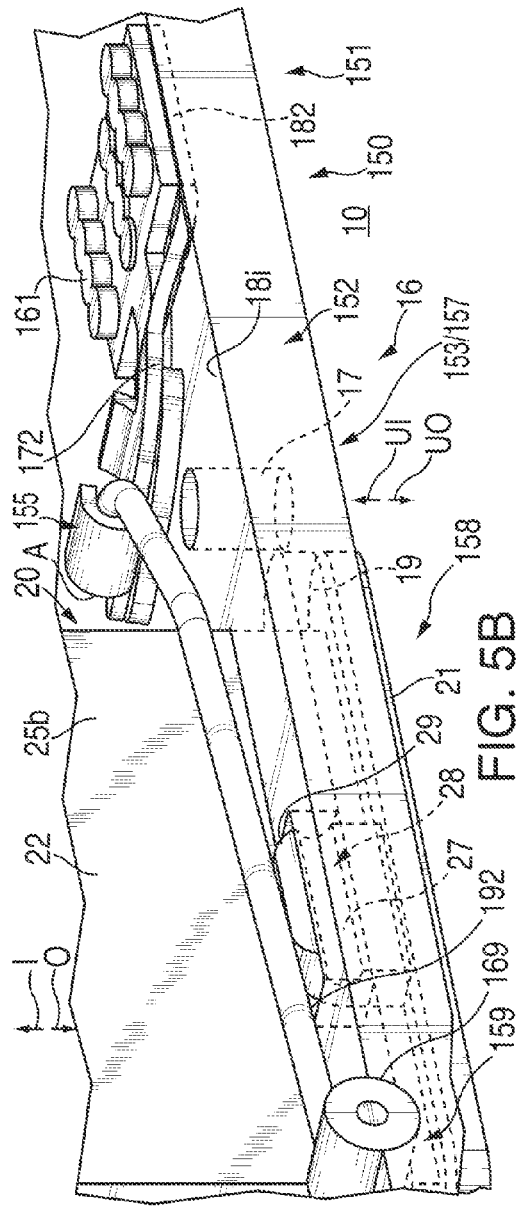

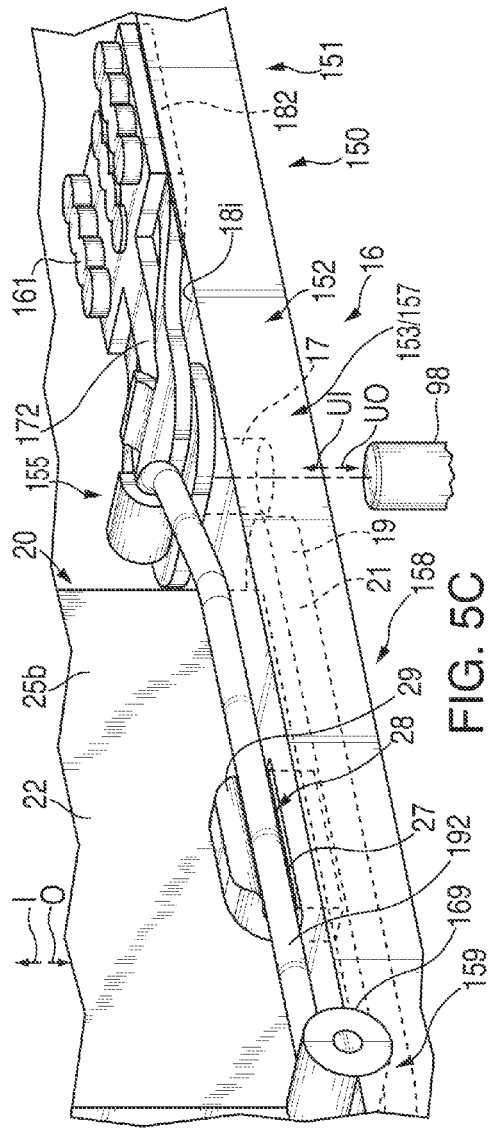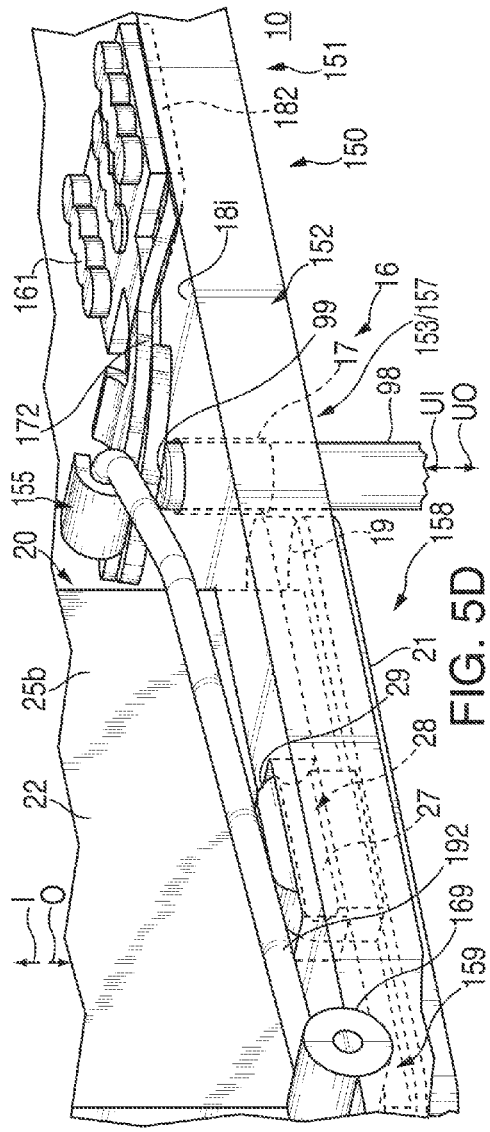

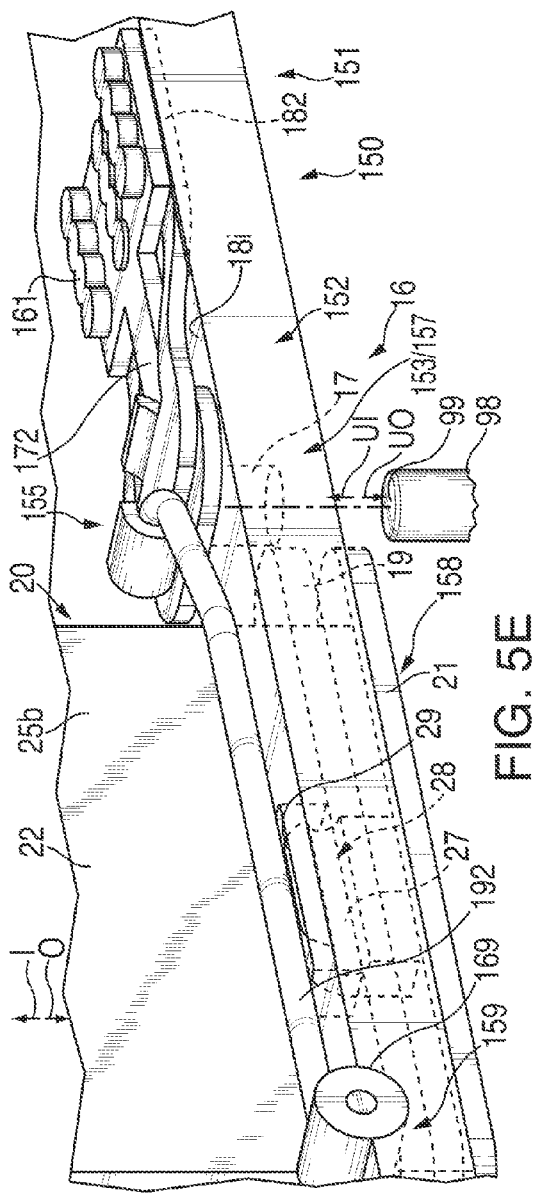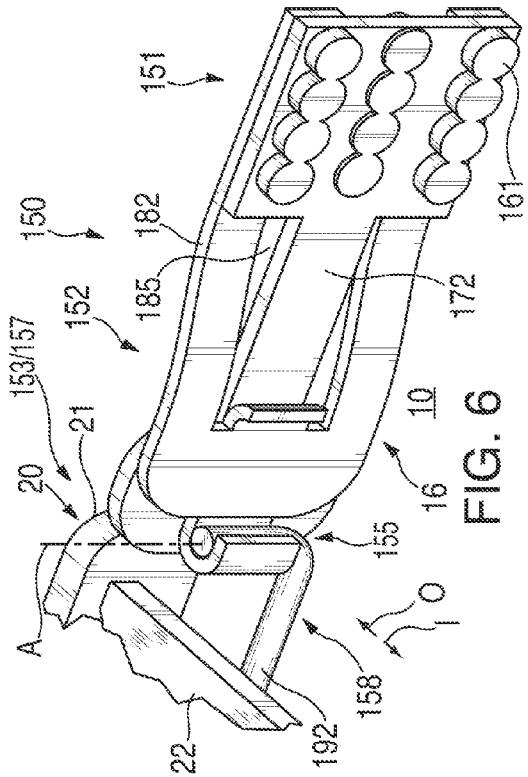

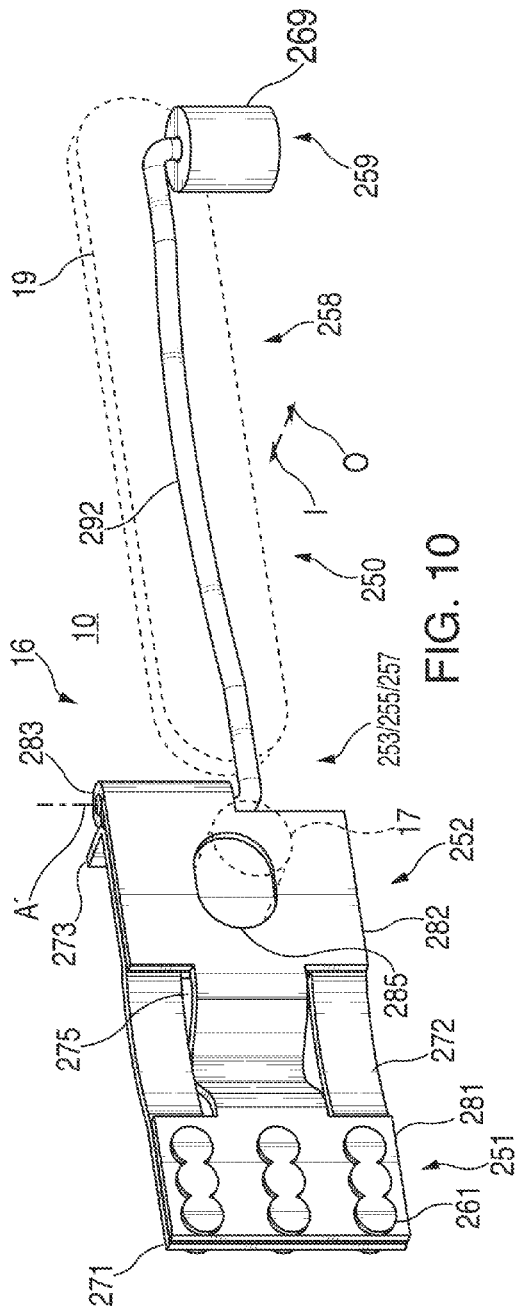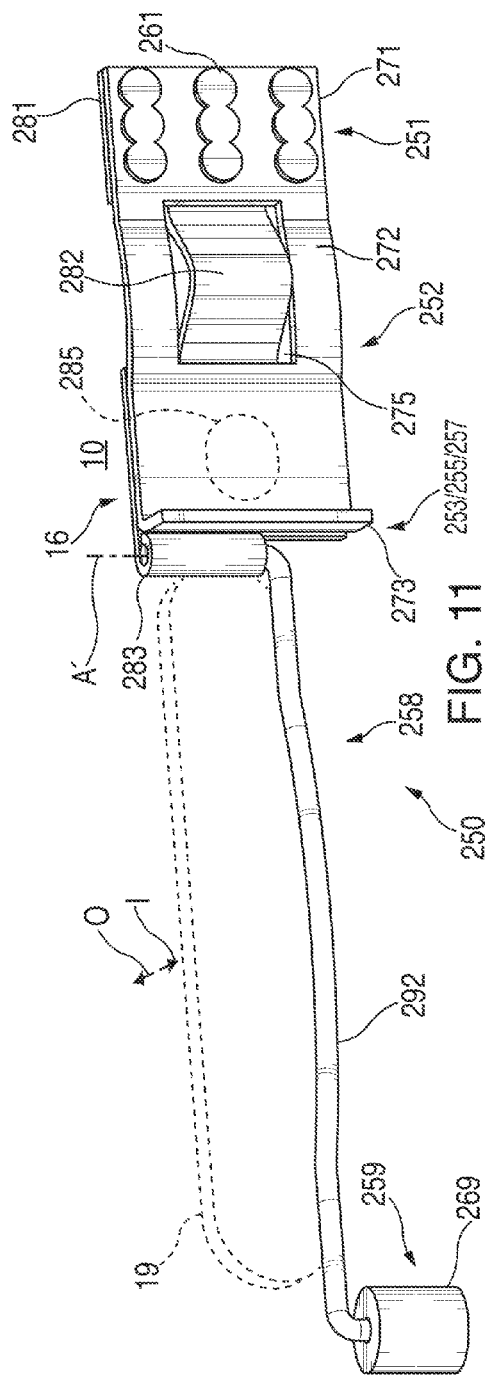

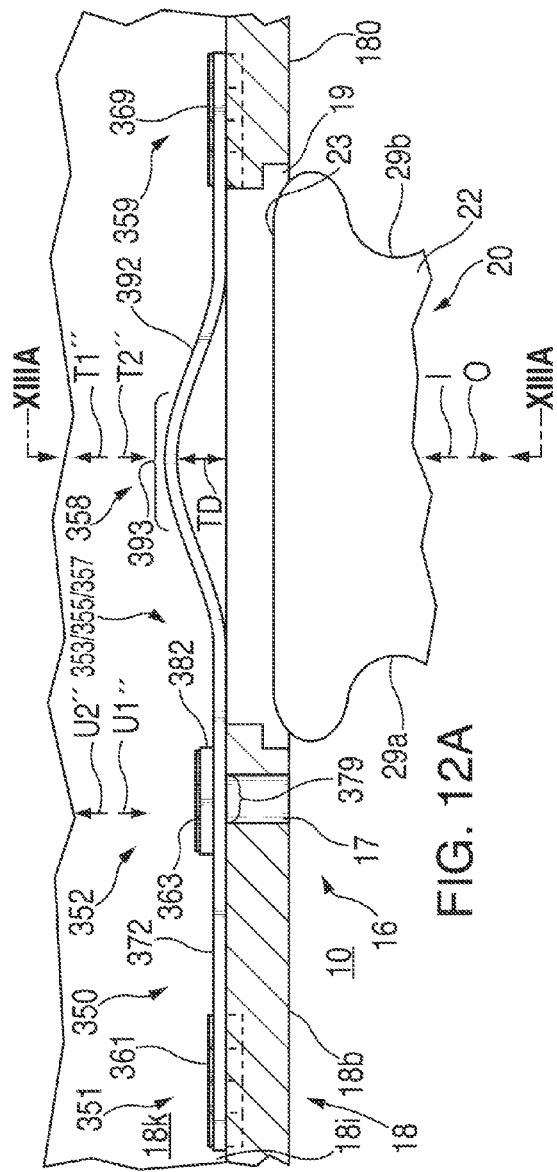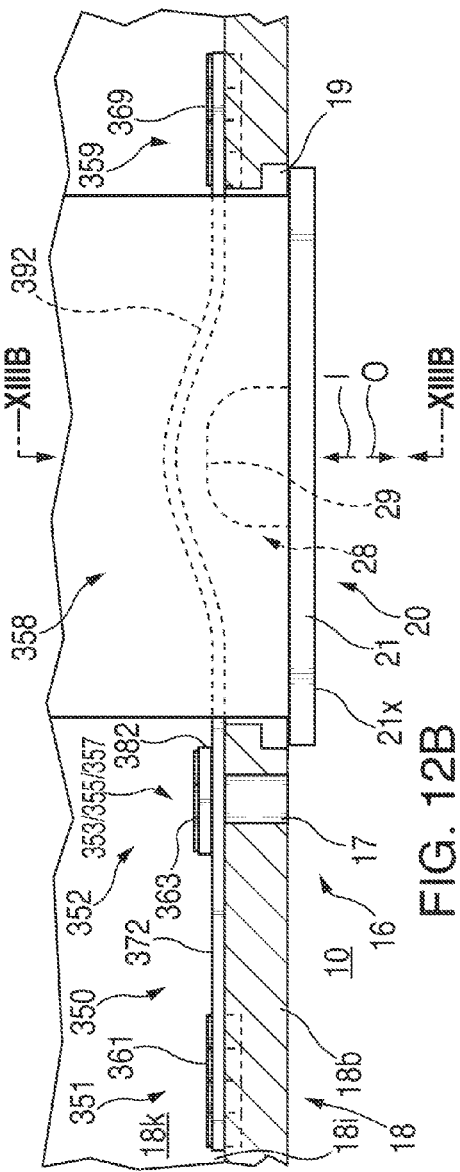

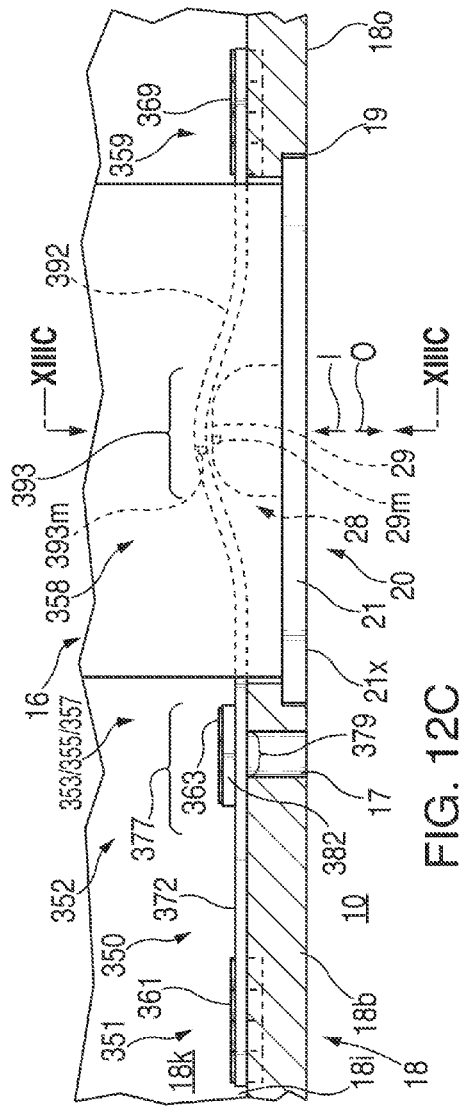
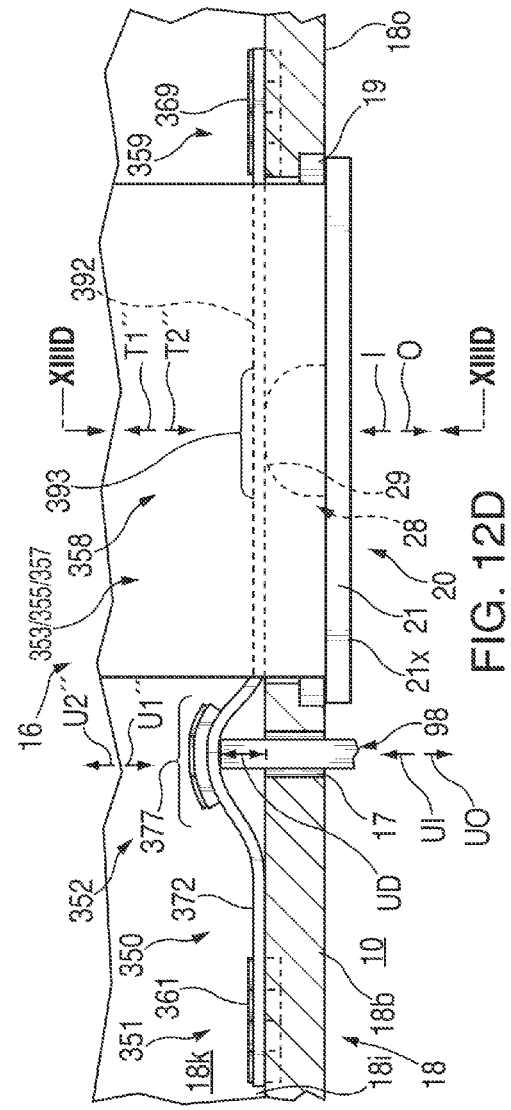
FIG. 12C
FIG. 12D

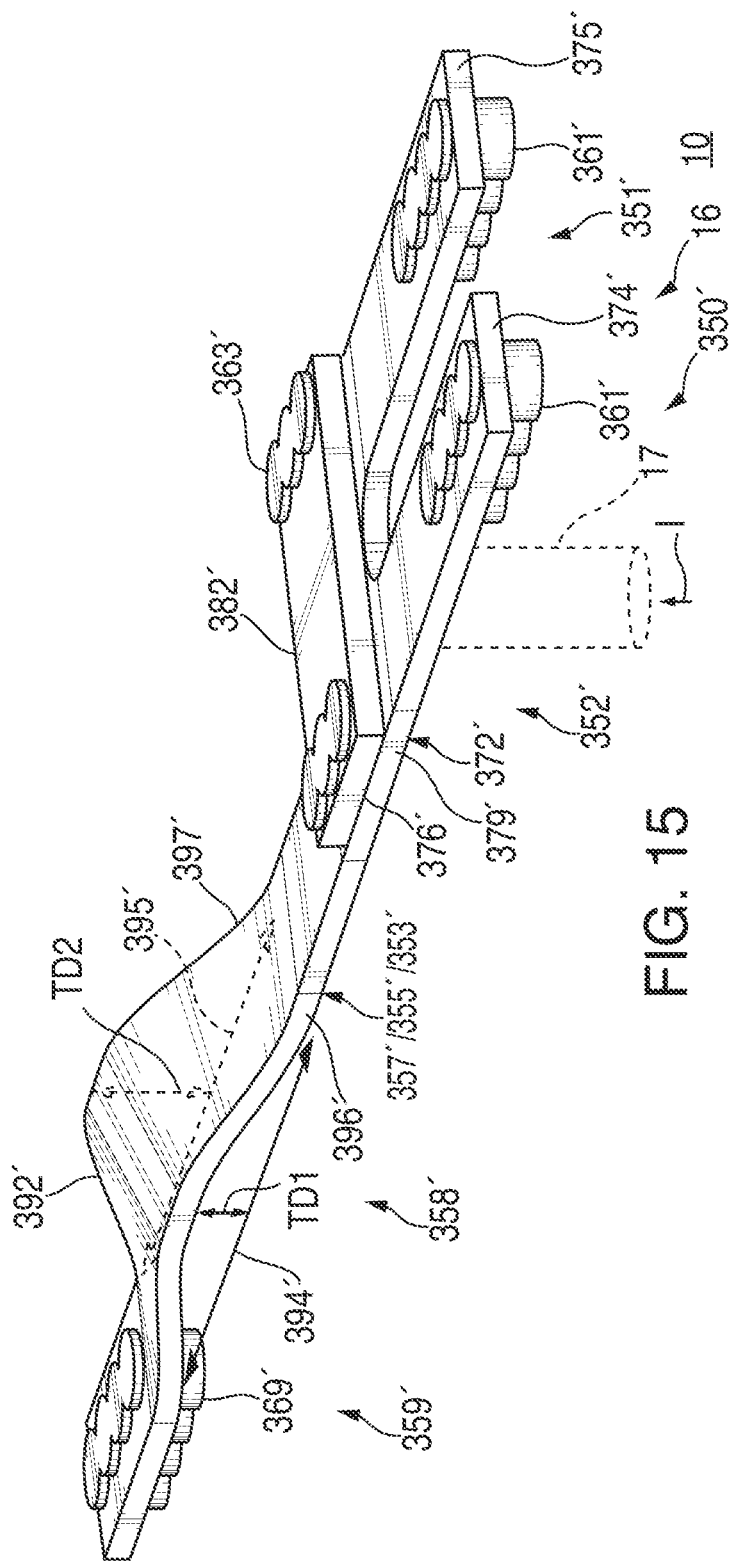

SYSTEMS AND METHODS FOR EJECTING REMOVABLE MODULES FROM ELECTRONIC DEVICES

CROSS-REFERENCE TO RELATED APPLICATIONS

This application is a continuation patent application of U.S. patent application Ser. No. 13/439,580, filed Apr. 4, 2012 and titled "Systems and Methods for Ejecting Removable Modules from Electronic Devices," the disclosure of which is hereby incorporated herein by reference in its entirety.

FIELD OF THE INVENTION

This can relate to systems and methods for ejecting removable modules from electronic devices.

BACKGROUND OF THE DISCLOSURE

To enhance the use of electronic devices (e.g., cellular telephones), ejectable component assemblies may be used to couple removable modules (e.g., subscriber identity module ("SIM") cards) to electrical components of the electronic devices. Some known ejectable component assemblies include a tray for receiving a removable module, and a connector within a housing of the device for receiving the tray as it is inserted through an opening in the housing. The connector may retain the tray such that contacts of the module may be electrically coupled to a circuit board or other electrical component of the device.

Some known ejectable component assemblies also include an ejector mechanism for ejecting the tray from the connector and, thus, from the housing of the device. Such an ejector mechanism often takes up valuable real estate within the housing of the device. Moreover, a portion of such an ejector mechanism often requires a user to interact with the ejector mechanism through an opening in the housing that may allow debris to enter the housing and impair the function of the device.

SUMMARY OF THE DISCLOSURE

Systems and methods for ejecting removable modules from electronic devices are provided.

For example, in some embodiments, there is provided an ejectable component assembly that may include any suitable assembly operative to insert into an electronic device, retain within the electronic device, and/or eject from the electronic device a removable module, such as a subscriber identity module ("SIM") card. The ejectable component assembly can include a tray that may hold the removable module, and a connector within the electronic device that may receive, retain, and release the tray and module. Moreover, the ejectable component assembly may include an ejector mechanism for at least partially ejecting the tray and module from the connector.

The ejector mechanism may be configured to change between a first ejector mechanism state and a second ejector mechanism state. The first state may be configured to receive the tray and module into the ejectable component assembly, and the second state may be configured to at least partially eject the tray and module from the ejectable component assembly. The ejector mechanism may be biased to remain in either its first or second states absent any external forces acting on the ejector mechanism. The ejector mechanism may include a user interface portion and a tray interface portion, and each interface portion may include a first end fixed to the device and a second end coupled to the second end of the other interface portion. Tension between the fixed first ends may bias the ejector mechanism to alternate between its two ejector mechanism states when the ejector mechanism receives either a user input force to eject the tray and module from the connector or a tray input force to insert the tray and module into the connector.

In some embodiments, the ejector mechanism may include a user interface portion and a tray interface portion that may be coupled to the user interface portion. The user interface portion may be configured to change between a first user interface state of the first ejector mechanism state and a second user interface state of the second ejector mechanism state, and the tray interface portion may be configured to change between a first tray interface state of the first ejector mechanism state and a second tray interface state of the second ejector mechanism state. The user interface portion may receive a user input force through a user interface opening in a housing of the electronic device, which may cause the user interface portion to change from one of its two user interface states to the other. This change of user interface states may cause a similar change of the tray interface portion from one of its two tray interface states to the other, which may cause the tray interface portion to apply an ejection force onto the tray for at least partially ejecting the tray and module from the ejectable component assembly through a module opening in the housing of the electronic device.

In some embodiments, there is provided an electronic device that may include a housing, a connector positioned within the housing, and an ejector mechanism. The ejector mechanism may include a user interface portion and a tray interface portion. The user interface portion may include a first user interface end coupled to a first location within the housing and a second user interface end. The tray interface portion may include a first tray interface end coupled to the second user interface end and a second tray interface end coupled to a second location within the housing. The user interface portion may be configured to change from a first user interface state to a second user interface state when a user input force is applied to the user interface portion. In response to the change of the user interface portion from the first user interface state to the second user interface state, the tray interface portion may be configured to apply an ejection force onto a removable entity for at least partially ejecting the removable entity from the connector.

In some other embodiments, there is provided an electronic device that may include a housing having a first wall with a module opening through the first wall. The electronic device may also include an ejector mechanism positioned within the housing. The ejector mechanism may include a user interface portion and a tray interface portion. The user interface portion may include a first user interface end and a second user interface end. The tray interface portion may include a first tray interface end coupled to the second user interface end and a second tray interface end. The tray interface portion may be configured to change from a first tray interface state to a second tray interface state when a removable entity input force is applied to the tray interface portion by a removable entity during insertion of the removable entity into the housing through the module opening. The user interface portion may be configured to change from a first tray interface state to a second tray interface state in response to the change of the tray interface portion from the first tray interface state to the second tray interface state. Moreover, the user interface portion may be configured to receive a user input force through the housing.

In yet some other embodiments, there is provided an ejector mechanism for ejecting a removable entity from a connector. The ejector mechanism includes a user interface portion and a tray interface portion. The user interface portion may include a first user interface end and a second user interface end. The tray interface portion may include a first tray interface end coupled to the second user interface end and a second tray interface end. The user interface portion may be configured to move from a first user interface position to a second user interface position when a user input force is applied to the user interface portion. The tray interface portion may be configured to apply an ejection force onto the removable entity for at least partially ejecting the removable entity from the connector in response to the movement of the user interface portion from the first user interface position to the second user interface position.

BRIEF DESCRIPTION OF THE DRAWINGS

The above and other aspects of the invention, its nature, and various features will become more apparent upon consideration of the following detailed description, taken in conjunction with the accompanying drawings, in which like reference characters may refer to like parts throughout, and in which:

FIG. 3B is an elevational view of a portion of the electronic device of FIGS. 1-3A, similar to FIG. 2B, of the first alternative embodiment of the portion of the ejectable component assembly of FIG. 3A, in a second stage of actuation, similar to FIG. 2B, in accordance with some embodiments of the invention;

FIG. 3C is an elevational view of a portion of the electronic device of FIGS. 1-3B, similar to FIG. 2C, of the first alternative embodiment of the portion of the ejectable component assembly of FIGS. 3A and 3B, in a third stage of actuation, similar to FIG. 2C, in accordance with some embodiments of the invention;

FIG. 3E is an elevational view of a portion of the electronic device of FIGS. 1-3D, similar to FIG. 2E, of the first alternative embodiment of the portion of the ejectable component assembly of FIGS. 3A-3D, in a fifth stage of actuation, similar to FIG. 2E, in accordance with some embodiments of the invention;

FIG. 5A is a perspective view of the first alternative embodiment of the portion of the ejectable component assembly of FIGS. 3A-4E, in the first stage of actuation of FIGS. 3A and 4A, in accordance with some embodiments of the invention;

FIG. 5B is a perspective view, similar to FIG. 5A, of the first alternative embodiment of the portion of the ejectable component assembly of FIGS. 3A-5A, in the second stage of actuation of FIGS. 3B and 4B, in accordance with some embodiments of the invention;

FIG. 5C is a perspective view, similar to FIGS. 5A and 5B, of the first alternative embodiment of the portion of the ejectable component assembly of FIGS. 3A-5B, in the third stage of actuation of FIGS. 3C and 4C, in accordance with some embodiments of the invention;

FIG. 5D is a perspective view, similar to FIGS. 5A-5C, of the first alternative embodiment of the portion of the ejectable component assembly of FIGS. 3A-5C, in the fourth stage of actuation of FIGS. 3D and 4D, in accordance with some embodiments of the invention;

FIG. 5E is a perspective view, similar to FIGS. 5A-5D, of the first alternative embodiment of the portion of the ejectable component assembly of FIGS. 3A-5D, in the fifth stage of actuation of FIGS. 3E and 4E, in accordance with some embodiments of the invention;

FIG. 6 is another perspective view of the first alternative embodiment of the portion of the ejectable component assembly of FIGS. 3A-5E, in the first stage of actuation of FIGS. 3A, 4A, and 5A, in accordance with some embodiments of the invention;

FIG. 10 is a perspective view of the second alternative embodiment of the portion of the ejectable component assembly of FIGS. 8A-9E, in accordance with some embodiments of the invention;

FIG. 11 is another perspective view, similar to but the opposite of FIG. 10, of the second alternative embodiment of the portion of the ejectable component assembly of FIGS. 8A-10, in accordance with some embodiments of the invention;

FIG. 12A is an elevational view of a portion of the electronic device of FIGS. 1-2E, similar to FIG. 2A, of a third alternative embodiment of a portion of the ejectable component assembly of FIGS. 1-2E, in a first stage of actuation, similar to FIG. 2A, in accordance with some embodiments of the invention;

FIG. 12B is an elevational view of a portion of the electronic device of FIGS. 1-2E and 12A, similar to FIG. 2B, of the third alternative embodiment of the portion of the ejectable component assembly of FIG. 12A, in a second stage of actuation, similar to FIG. 2B, in accordance with some embodiments of the invention;

FIG. 12C is an elevational view of a portion of the electronic device of FIGS. 1-2E, 12A, and 12B, similar to FIG. 2C, of the third alternative embodiment of the portion of the ejectable component assembly of FIGS. 12A and 12B, in a third stage of actuation, similar to FIG. 2C, in accordance with some embodiments of the invention;

FIG. 12D is an elevational view of a portion of the electronic device of FIGS. 1-2E and 12A-12C, similar to FIG. 2D, of the third alternative embodiment of the portion of the ejectable component assembly of FIGS. 12A-12C, in a fourth stage of actuation, similar to FIG. 2D, in accordance with some embodiments of the invention;

FIG. 15 is a perspective view, similar to FIG. 14, of a portion of a fourth alternative embodiment of the portion of the ejectable component assembly of FIGS. 1-2E, in accordance with some embodiments of the invention;

DETAILED DESCRIPTION OF THE DISCLOSURE

Systems and methods for ejecting removable modules from electronic devices are provided and described with reference to FIGS. 1-17.

The following discussion describes various embodiments of an electronic device that may include at least one ejectable component assembly. The term "electronic device" can include, but is not limited to, music players, video players, still image players, game players, other media players, music recorders, video recorders, cameras, other media recorders, radios, medical equipment, calculators, cellular telephones, other wireless communication devices, personal digital assistants, remote controls, pagers, laptop computers, desktop computers, tablets, servers, printers, or combinations thereof. In some cases, the electronic device may perform a single function (e.g., an electronic device dedicated to playing music) and in other cases, the electronic device may perform several functions (e.g., an electronic device that plays music, displays video, stores pictures, and receives and transmits telephone calls).

The electronic device may generally be any portable, mobile, hand-held, or miniature electronic device so as to allow a user, for example, to listen to music, play games, record videos, take pictures, and/or conduct communications operations (e.g., telephone calls) wherever he or she travels. Some miniature electronic devices may have a form factor that is smaller than that of hand-held electronic devices, such as an iPod™ available by Apple Inc. of Cupertino, Calif. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or any combination thereof. Alternatively, electronic devices that incorporate an ejectable component assembly may not be portable at all.

Figure 1:
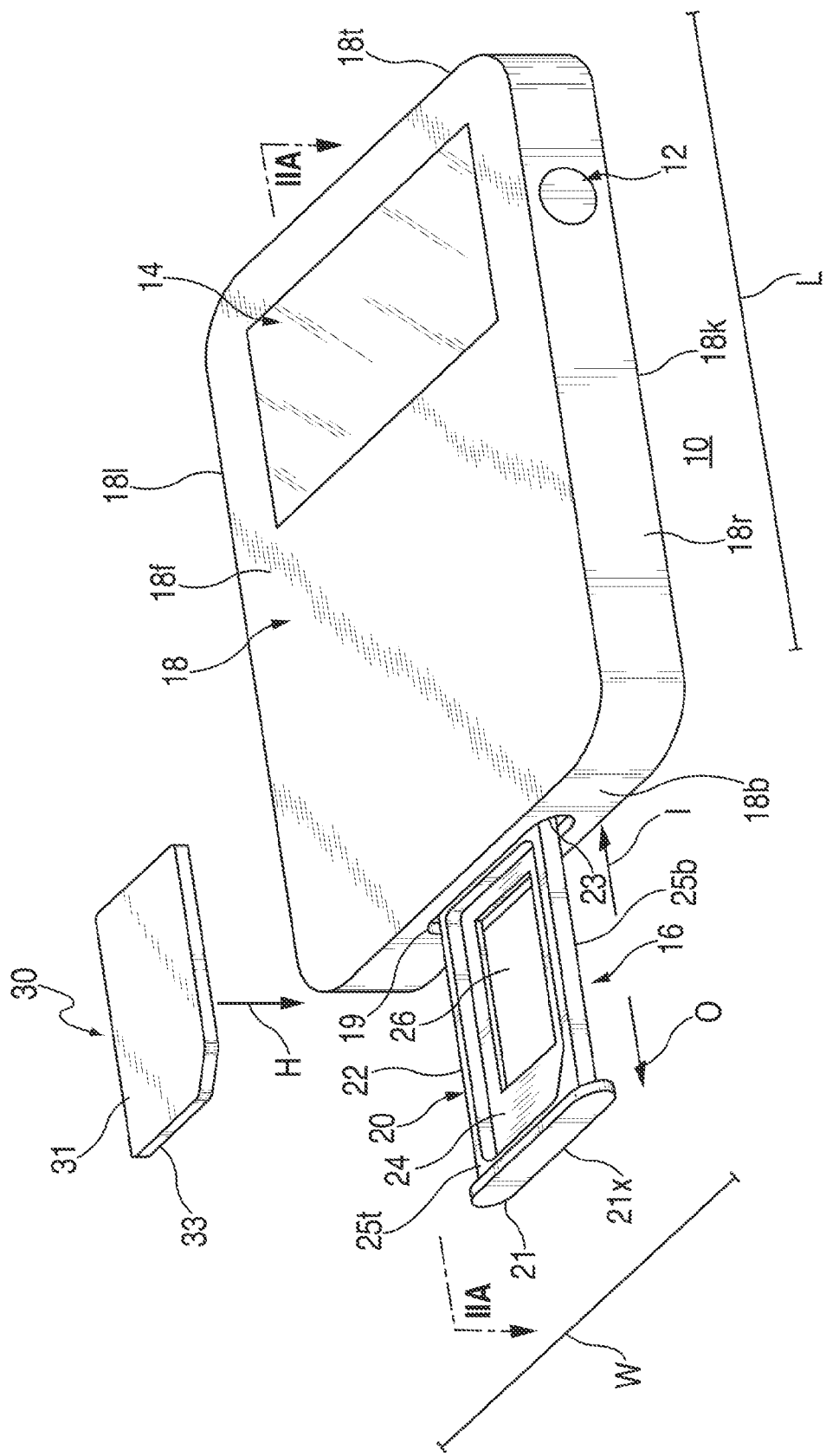
FIG. 1 is a perspective view of an exemplary electronic device including an ejectable component assembly in a first stage of actuation, in accordance with some embodiments of the invention.

FIG. 1 is a perspective view of an illustrative electronic device 10 that may include an ejectable component assembly in accordance with some embodiments of the invention. Electronic device 10 can include at least one user input component assembly 12 that may allow a user to interface with device 10, at least one device output component assembly 14 that may provide the user with device generated information, at least one ejectable component assembly 16 that may allow a user to insert and eject a removable module into and from device 10, and a protective housing 18 that may at least partially enclose one or more of the input, output, and ejectable component assemblies of device 10. Housing 18 may be any suitable shape and may include any suitable number of walls. In some embodiments, as shown in FIG. 1, for example, housing 18 may be of a generally hexahedral shape and may include a top wall 18*t*, a bottom wall 18*b* that may be opposite top wall 18*t*, a left wall 18*l*, a right wall 18*r* that may be opposite left wall 18*l*, a front wall 18*f*, and a back wall 18*k* that may be opposite front wall 18*f*. Each wall of housing 18 may have an inner surface 18*i* and an outer surface 18*o*.

Component assemblies 12 and 14 can include any type of component assembly operative to receive and/or transmit digital and/or analog data (e.g., audio data, video data, other types of data, or a combination thereof). Input component assembly 12 may include any suitable input mechanism, such as, for example, one or more sliding switches, buttons, keypads, track balls, joysticks, dials, scroll wheels, touch screen displays, electronics for accepting audio and/or visual information, antennas, infrared ports, or combinations thereof. Output component assembly 14 may include any suitable output mechanism, such as, for example, one or more audio speakers, headphones, audio line-outs, visual displays, antennas, infrared ports, rumblers, vibrators, or combinations thereof. It should be noted that one or more input component assemblies 12 and one or more output component assemblies 14 may sometimes be referred to collectively herein as an input/output ("I/O") interface or I/O component assembly. It should also be noted that input component assembly 12 and output component assembly 14 may sometimes be a single I/O component assembly, such as a touch screen that may receive input information through a user's touch of a display screen and that may also provide visual information to a user via that same display screen.

Ejectable component assembly 16 may include any suitable assembly that may be operative to insert into device 10, retain within device 10, and/or eject from device 10 a removable module 30. Removable module 30 may include, for example, any suitable type of integrated circuit card ("ICC"), chip card, memory card, flash memory card, microprocessor card, smart card, such as a subscriber identity module ("SIM") card (e.g., a mini-SIM card or a micro-SIM card), or combinations thereof. In some embodiments, removable module 30 may contain electronic circuitry (e.g., on the bottom of module 30 (not shown)), from which electronic device 10 may read data and/or to which electronic device 10 may write data.

Ejectable component assembly 16 can include a module tray 20 that may be at least partially insertable into device 10 (e.g., in the direction of arrow I) and ejectable from device 10 (e.g., in the direction of arrow O) via a module housing opening 19 that may be provided through housing 18. Module housing opening 19 may be formed through any suitable portion of housing 18 for providing tray 20 and/or module 30 access into housing 18 of device 10. For example, as shown in FIG. 1, module housing opening 19 may be provided through bottom wall 18*b* of housing 18. It is to be noted that, although module housing opening 19 is shown in FIG. 1 to be provided through bottom wall 18*b* that may define a width W of housing 18, module housing opening 19 may be provided through any wall portion of housing 18. For example, in some embodiments, module housing opening 19 may be provided through right wall 18*r* that may define a length L of housing 18, which may be longer than width W of housing 18.

Tray 20 of ejectable component assembly 16 may include a body portion 22 having a top surface 25*t* and a bottom surface 25*b* extending between a first tray end 21 and a second tray end 23. Tray 20 may include an outer surface 21*x* at first tray end 21 that may provide a cosmetic surface for device 10 when tray 20 is inserted into device 10. In some embodiments, outer surface 21*x* of tray 20 may be fashioned to be aesthetically pleasing to a user of device 10, for example, by matching the color and/or material of surface 21*x* with that of the exterior surface of housing 18 about module housing opening 19. First tray end 21, second tray end 23, and/or body portion 22 may define the periphery and/or walls of a module holder 24 of tray 20. Module holder 24 may be operative to receive and hold removable module 30 with respect to tray 20 (e.g., when module 30 is inserted into holder 24 in the direction of arrow H). More particularly, module holder 24 may be operative to receive and hold removable module 30 with respect to an opening 26 that may be provided through a portion of tray 20. Electronic circuitry of module 30 may align with opening 26 when module 30 is held by tray 20.

Tray 20 may be formed as a single unitary component from any suitable material, such as plastic, glass, metal, ceramic materials, epoxies, composite materials, or the like. Moreover, tray 20 may be a single unitary component made by any suitable process, such as casting, molding, forming, forging, machining, extruding, and the like. Alternatively, tray 20 may be formed by joining at least two distinct tray portions. Holder 24 can be sized and shaped to substantially match the size and shape of module 30, such that module 30 can be snap-fitted or otherwise releasably retained by holder 24, and such that a portion of module 30 may be exposed through opening 26 of tray 20.

As mentioned, tray 20 may be configured to receive and retain any suitable module 30 for insertion into device 10, such as an integrated circuit card, chip card, memory card, flash memory card, microprocessor card, smart card, such as a SIM card, and the like. As shown in FIG. 1, for example, module 30 may include a top surface 31 and a bottom surface 33. One or more electrical contacts (not shown) of module 30 may be exposed along bottom surface 33 of module 30. Therefore, when module 30 is inserted into module holder 24 in the direction of arrow H, at least a portion of some or all of the electrical contacts on bottom surface 33 of module 30 may be exposed through opening 26 of tray 20. For example, opening 26 may allow electrical circuitry of electronic device 10 to access data from one or more electrical contacts of module 30 through opening 26 when tray 20 and module 30 are partially or fully inserted into device 10 through module housing opening 19.

Once module 30 has been loaded into holder 24, tray 20 may be inserted into a connector that is at least partially internal to housing 18 of device 10. For example, as shown in FIGS. 2A-2E, ejectable component assembly 16 may also include a connector 40 for receiving and/or holding removable tray 20 at least partially within housing 18 of device 10 such that opening 26 of tray 20 may align with a module reader/writer of device 10. For example, opening 26 of tray 20 may align with module reader/writer coupling circuitry 15 of device 10 when tray 20 is positioned within connector 40, such that one or more electrical contacts of module 30 may be electrically coupled to coupling circuitry 15 through opening 26 when module 30 is held by tray 20.

Figure 2A:
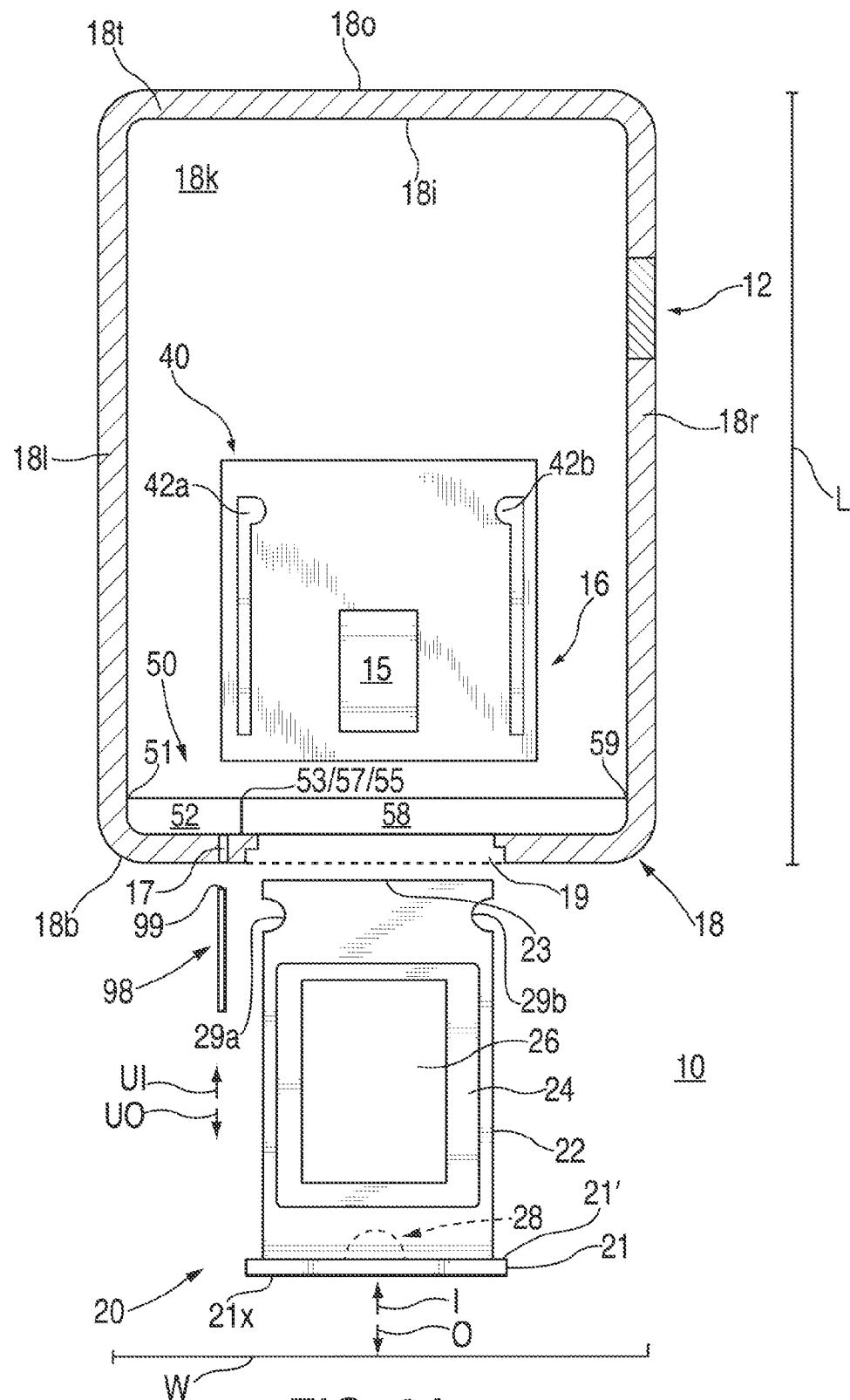
FIG. 2A is an elevational view of a portion of the electronic device of FIG. 1, taken from line IIA-IIA of FIG. 1.
Figure 2B:
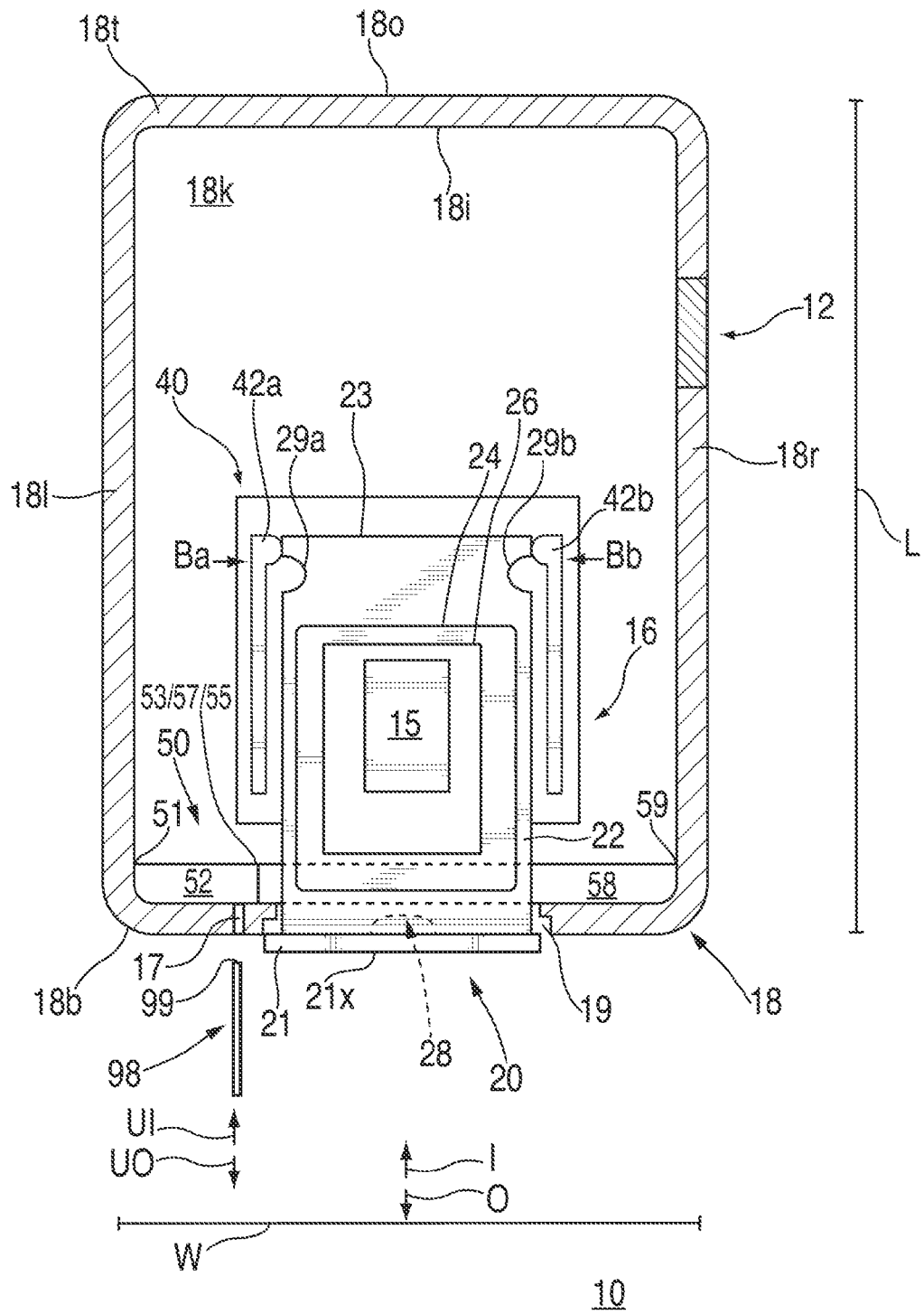
FIG. 2B is an elevational view of a portion of the electronic device of FIGS. 1 and 2A, similar to FIG. 2A, but with the ejectable component assembly in a second stage of actuation, in accordance with some embodiments of the invention.
Figure 2C:
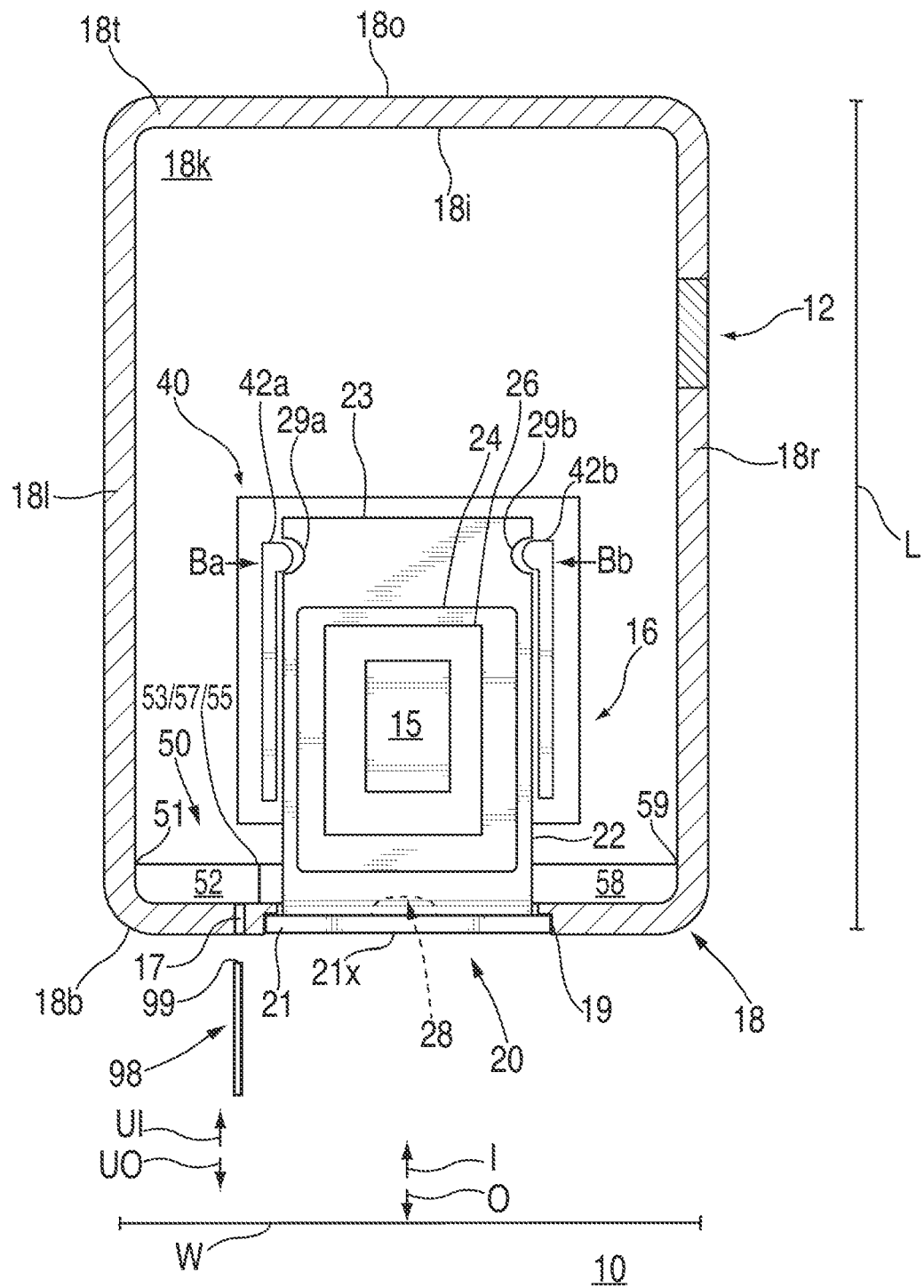
FIG. 2C is an elevational view of a portion of the electronic device of FIGS. 1-2B, similar to FIGS. 2A and 2B, but with the ejectable component assembly in a third stage of actuation, in accordance with some embodiments of the invention.

Connector 40 may be coupled to device 10 (e.g., by surface mount technology ("SMT")) such that, when tray 20 is inserted into device 10 through opening 19 of housing 18 in the direction of arrow I, connector 40 may receive, guide, support, and/or retain tray 20 such that one or more electrical contacts of module 30 held by tray 20 may align with coupling circuitry 15 of device 10 through opening 26 of tray 20. Although portions of housing 18 about opening 19 may at least initially guide the insertion of end 23 of tray 20 through opening 19 in the direction of arrow I (e.g., as shown in FIG. 2A), connector 40 can include retention members 42a and 42b for guiding tray 20 in the direction of arrow I once tray 20 has been at least partially inserted through opening 19 (e.g., as shown in FIG. 2B). Once tray 20 has been fully loaded into connector 40 (e.g., as shown in FIG. 2C), retention members 42a and 42b of connector 40 may interact with tray 20 to retain tray 20 in a functional position with respect to coupling circuitry 15 of device 10, such that one or more electrical contacts of module 30 may align with coupling circuitry 15 of device 10 through opening 26 of tray 20. For example, retention members 42a and 42b can retain a portion of tray 20 therebetween by exerting a biasing force of members 42a and 42b on that portion of tray 20. As shown in FIG. 2C, for example, retention members 42a and 42b may contact and exert their respective biasing connector forces (e.g., in the direction of respective arrows Ba and Bb) on tray 20 within respective grooved or notched portions 29a and 29b of tray 20. It is to be understood, however, that connector 40 may be configured to receive, guide, and/or retain tray 20 and/or module 30 in any other suitable way using any other type of connector force or collection of connector forces on any suitable portion or portions of tray 20 and/or module 30.

Surface 21x of tray end 21 of tray 20 can be any suitable shape such that it can be substantially flush with the portions of housing 18 about opening 19 when tray 20 is held in its functional or fully loaded position by connector 40, thereby creating a smooth profile for that portion of device 10. For example, as shown in FIG. 2C, the external surface of housing 18 about opening 19 may be substantially straight and flat, and, therefore, so may be surface 21x of tray 20. Alternatively, however, the surface of housing 18 about opening 19 may be substantially curved, and, therefore, so may be surface 21x of tray 20. A curvature of surface 21x may be continuous with a curvature of housing 18 about opening 19 so as to create a smooth profile for that portion of device 10. In other embodiments, surface 21x of tray 20 may be positioned within housing 18 when tray 20 is held in its functional or fully loaded position.

With continued reference to FIGS. 2A-2E, ejectable component assembly 16 can also include an ejector mechanism 50 for at least partially ejecting tray 20 and/or module 30 from connector 40 and/or housing 18. For example, ejector mechanism 50 may be provided for ejecting tray 20 from its fully loaded position of FIG. 2C to an at least partially ejected position of FIG. 2D, and/or to a more completely ejected position of FIG. 2E (e.g., a position where retention members 42a and 42b may not have a retaining influence on tray 20). Ejector mechanism 50 may include a user interface portion 52 and a tray interface portion 58. User interface portion 52 may extend between a first user interface portion end 51 and a second user interface portion end 53. Tray interface portion 58 may extend between a first tray interface portion end 57 and a second tray interface portion end 59. First end 51 of user interface portion 52 may be coupled to a fixed portion of device 10 (e.g., first end 51 may be coupled to a portion of housing 18 or another component of device 10 whose position is fixed with respect to housing 18) and second end 59 of tray interface portion 58 may be coupled to another fixed portion of device 10 (e.g., second end 59 may be coupled to a portion of housing 18 or another component of device 10 whose position is fixed with respect to housing 18), while second end 53 of user interface portion 52 may be coupled to first end 57 of tray interface portion 58. In some embodiments, first end 51 of user interface portion 52 and second end 59 of tray interface portion 58 may be fixed with respect to one another or be at least partially constrained with respect to one another. Each one of first end 51 and second end 59 may be fixed to or have its movement at least partially constrained by any portion of device 10 (e.g., housing 18, connector 40, etc.). First end 51 may be fixed to or have its movement at least partially constrained/restrained by a first portion of device 10 at a first location within or with respect to housing 18, and second end 59 may be fixed to or otherwise have its movement at least partially constrained/restrained by a second portion of device 10 at a second location within or with respect to housing 18.

User interface portion 52 may be any suitable unitary component or collection of suitable components that may be capable of deflecting, deforming, bending, springing, pivoting, translating, rotating, responding, reacting, resulting, conforming, complying, traversing, relocating, moving, or otherwise changing between a first user interface state or position and a second user interface state or position. For example, user interface portion 52 may be made of any suitable material, such as rubber, plastic, metal, or any suitable combinations thereof. In some embodiments, user interface portion 52 may be a single component made of any suitable material while, in other embodiments, user interface portion 52 may be several distinct components. Different portions of user interface portion 52 may be flexible or rigid. For example, a first portion of user interface portion 52 at or near first end 51 may be rigid (e.g., for coupling to a portion of housing 18), while another portion of user interface portion 52 may be flexible (e.g., for bending or deflecting from the first user interface state to the second user interface state).

Tray interface portion 58 may be any suitable unitary component or collection of suitable components that may be capable of deflecting, deforming, bending, springing, pivoting, translating, rotating, moving, or otherwise changing between a first tray interface state or position and a second tray interface state or position. For example, tray interface portion 58 may be made of any suitable material, such as rubber, plastic, metal, or any suitable combinations thereof. In some embodiments, tray interface portion 58 may be a single component made of any suitable material while, in other embodiments, tray interface portion 58 may be several distinct components. Different portions of tray interface portion 58 may be flexible or rigid. For example, a first portion of tray interface portion 58 at or near second end 59 may be rigid (e.g., for coupling to a portion of housing 18), while another portion of tray interface portion 58 may be flexible (e.g., for bending or deflecting from the first tray interface state to the second tray interface state).

First end 57 of tray interface portion 58 may be coupled to second end 53 of user interface portion 52 in any suitable manner using any suitable coupling 55. Coupling 55 may allow constrained relative motion between user interface portion 52 and tray interface portion 58, such that user interface portion 52 may change between its first and second user interface states when tray interface portion 58 may change between its first and second tray interface states, and vice versa. For example, coupling 55 may be a ball and socket, a hinge pin, a compliant coupler, or any other suitable mechanism for coupling first end 57 of tray interface portion 58 to second end 53 of user interface portion 52. Therefore, coupling 55 may allow for ejector mechanism 50 to change between a first ejector mechanism state (e.g., when each one of user interface portion 52 and tray interface portion 58 is in its respective first state) and a second ejector mechanism state (e.g., when each one of user interface portion 52 and tray interface portion 58 is in its respective second state).

User interface portion 52 may be configured to change from the first user interface state to the second user interface state when a user input force is applied by a user onto user interface portion 52 or in response to tray interface portion 58 changing from the first tray interface state to the second tray interface state. User interface portion 52 may also be configured to change from the second user interface state to the first user interface state when the application of a user input force onto user interface portion 52 is terminated or in response to tray interface portion 58 changing from the second tray interface state to the first tray interface state. Moreover, tray interface portion 58 may be configured to change from the first tray interface state to the second tray interface state when a tray input force is applied by tray 20 onto tray interface portion 58 or in response to user interface portion 52 changing from the first user interface state to the second user interface state. Tray interface portion 58 may also be configured to change from the second tray interface state to the first tray interface state when the application of a tray input force onto tray interface portion 58 is terminated or otherwise overcome, or in response to user interface portion 52 changing from the second user interface state to the first user interface state.

In some embodiments, in response to user interface portion 52 receiving a user input force and thereby changing from the first user interface state to the second user interface state, a resultant change of tray interface portion 58 from the first tray interface state to the second tray interface state may cause tray interface portion 58 to at least partially eject tray 20 from connector 40 and/or opening 19. Additionally or alternatively, in some embodiments, in response to the termination of the application of a tray input force onto tray interface portion 58 (e.g., when tray interface portion 58 may overcome a tray input force), a resultant change of tray interface portion 58 from the second tray interface state to the first tray interface state may cause tray interface portion 58 to at least partially secure tray 20 to ejector mechanism 50 (e.g., to at least partially secure tray 20 in its functional or fully loaded position of FIG. 2C).

Figure 2D:
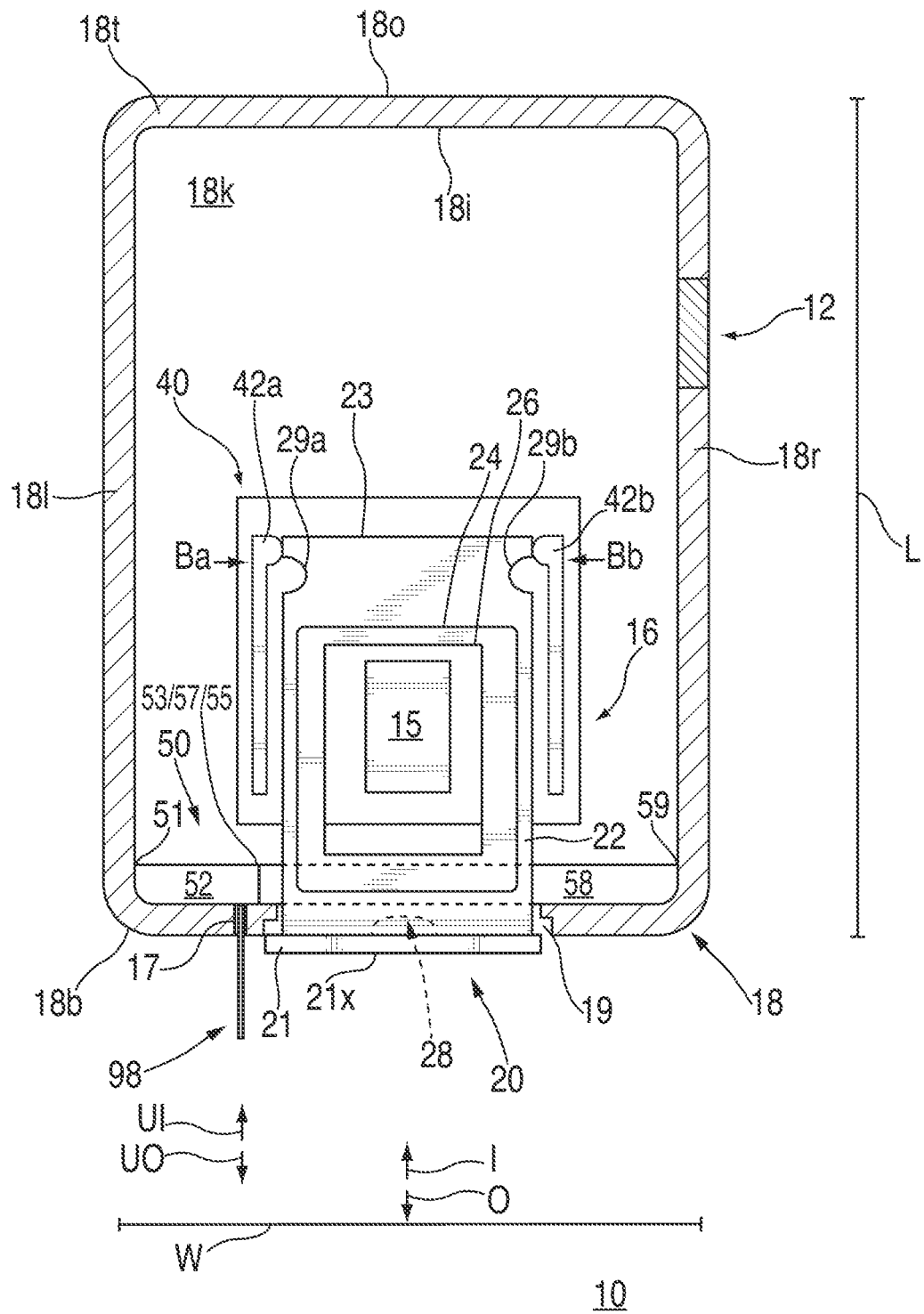
FIG. 2D is an elevational view of a portion of the electronic device of FIGS. 1-2C, similar to FIGS. 2A-2C, but with the ejectable component assembly in a fourth stage of actuation, in accordance with some embodiments of the invention.

When tray 20 is held in its functional or fully loaded position within housing 18, as shown in FIG. 2C, for example, ejector mechanism 50 may be configured to interact with tray 20 either to actively retain tray 20 in its fully loaded position (e.g., as described in more detail with respect to the embodiments of FIGS. 3A-7B) or to passively allow tray 20 to remain in its fully loaded position (e.g., as described in more detail with respect to some of the embodiments of FIGS. 8A-11). Then, as shown in FIGS. 2C and 2D, for example, when a user input force is applied to a portion of user interface portion 52, user interface portion 52 may be configured to change from the first user interface state to the second user interface state, which may cause tray interface portion 58 to change from the first tray interface state to the second tray interface state for at least partially ejecting tray 20. For example, a first end 99 of a user input tool 98 may be inserted through a user interface opening 17 in housing 18 for applying a user input force in the direction of arrow UI onto a portion of user interface portion 52. When this user input force is applied onto user interface portion 52, user interface portion 52 may be configured to change from the first user interface state of FIG. 2C to the second user interface state of FIG. 2D. When user interface portion 52 changes from its first state to its second state, the change may cause tray interface portion 58 to change from the first tray interface state of FIG. 2C to the second tray interface state of FIG. 2D. For example, tray interface portion 58 may be configured to change from a relaxed state to a taut state, or vice versa, in response to a change of user interface portion 52 from its first user interface state to its second user interface state. This alteration of states by tray interface portion 58 may cause at least a portion of tray interface portion 58 to interact with tray 20 for at least partially ejecting tray 20 from connector 40 and/or from opening 19 in the direction of arrow O, as shown in FIG. 2D.

When tray interface portion 58 changes from the first tray interface state to the second tray interface state, at least a portion of tray interface portion 58 may impart a first ejection force onto at least a portion of tray 20 that may be great enough to overcome any retention force applied by connector 40 on tray 20, such that the first ejection force may at least partially eject tray 20 from connector 40. For example, tray interface portion 58 of ejector mechanism 50 may be configured to impart a first ejection force onto tray 20 when tray 20 is held in its functional or fully loaded position by connector 40, and this first ejection force may be great enough to overcome a retention force applied by retention members 42a and 42b of connector 40 on tray 20 (e.g., in the direction of arrows Ba and Bb), such that tray 20 may be at least partially ejected from connector 40 in the direction of arrow O (e.g., from the fully loaded tray position of FIG. 2C to the at least partially ejected tray position of FIG. 2D).

Figure 2E:
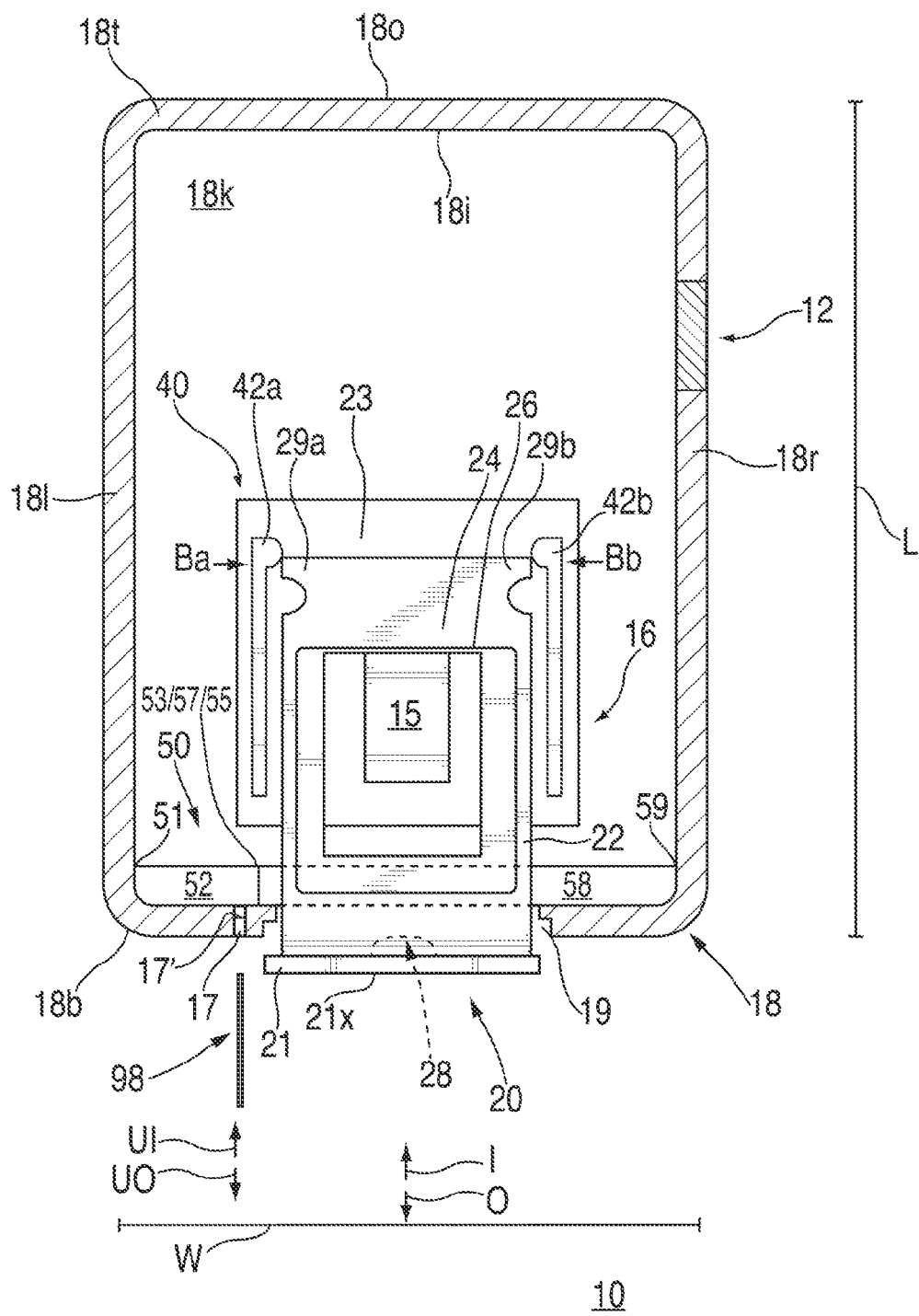
FIG. 2E is an elevational view of a portion of the electronic device of FIGS. 1-2D, similar to FIGS. 2A-2D, but with the ejectable component assembly in a fifth stage of actuation, in accordance with some embodiments of the invention.

Then, when the application of the user input force on user interface portion 52 is terminated, user interface portion 52 may be configured to return from its second user interface state to its first user interface state, which may once again cause tray interface portion 58 to alternate states, which may in turn further eject tray 20. For example, when first end 99 of user input tool 98 is at least partially withdrawn through user interface opening 17 in the direction of arrow UO for terminating the application of a user input force on a portion of user interface portion 52, user interface portion 52 may be configured to return from its second user interface state of FIG. 2D to its first user interface state of FIGS. 2C and 2E. This change of user interface portion 52 from its second user interface state to its first user interface state may cause tray interface portion 58 to change between its second tray interface state of FIG. 2D and its first tray interface state of FIGS. 2C and 2E, which may in turn further eject tray 20 in the direction of arrow O, as shown in FIG. 2E. Alternatively, in some embodiments, when the application of the user input force on user interface portion 52 is terminated, user interface portion 52 may be configured to remain in its second user interface state of FIG. 2D and tray interface portion 58 may remain in its second tray interface state of FIG. 2D (e.g., until tray 20 is re-inserted into device 10).

As shown in FIG. 2A, before any portion of tray 20 has been inserted into housing 18, such as when end 23 of tray 20 is positioned just outside opening 19, user interface portion 52 may be configured to be in its first user interface state, such that tray interface portion 58 may be in its first tray interface state. In some embodiments (e.g., as described in greater detail with respect to FIGS. 8A-8C), tray 20 may not interact with tray interface portion 58 during the insertion of tray 20 into housing 18, such that tray interface portion 58 may not change from its first tray interface state to its second tray interface state, and such that tray interface portion 58 may remain in its first tray interface state throughout the entire tray insertion process of FIGS. 2A-2C.

Alternatively, in some other embodiments (e.g., as described in greater detail with respect to FIGS. 3A-3C), once tray 20 has been initially inserted through opening 19 and into housing 18 in the direction of arrow I to a certain extent, as shown in FIG. 2B, for example, a portion of tray 20 may interact with a portion of tray interface portion 58 such that tray interface portion 58 may change from its first tray interface state to its second tray interface state. For example, in some embodiments, once tray 20 has been at least partially inserted in the direction of arrow I into housing 18, an ejector interface portion 28 on bottom surface 25b of tray 20 may interact with tray interface portion 58 (e.g., ejector interface portion 28 may apply a tray input force on tray interface portion 58 in the direction of arrow I) such that tray interface portion 58 may change from its first tray interface state to its second tray interface state (e.g., as described in greater detail with respect to FIG. 3B).

Moreover, in such embodiments, once tray 20 has been further inserted through opening 19 and into housing 18 in the direction of arrow I to its fully loaded position, as shown in FIG. 2C, for example, the application of such a tray input force by ejector interface portion 28 onto tray interface portion 58 may be terminated (e.g., tray interface portion 58 may overcome such a tray input force). When tray interface portion 58 overcomes such a tray input force, tray interface portion 58 may be configured to change from its second tray interface state back to its first tray interface state. This change from the second tray interface state to the first tray interface state may cause tray interface portion 58 to at least partially secure tray 20 to ejector mechanism 50 (e.g., to at least partially secure tray 20 in its functional or fully loaded position of FIG. 2C). For example, when tray 20 reaches its fully loaded position within housing 18, such that the application of a tray input force by ejector interface portion 28 of tray 20 onto tray interface portion 58 may be terminated, and such that tray interface portion 58 may change from its second tray interface state back to its first tray interface state, tray interface portion 58 may interact with a securement feature of tray 20 for holding tray 20 in its fully loaded position (e.g., as described in greater detail with respect to FIG. 3C).

Therefore, tray interface portion 58 may either be in its first tray interface state or in its second tray interface state at the stage of the insertion of tray 20 into housing 18 of FIG. 2B. Moreover, if tray 20 does interact with tray interface portion 58 during the stage of insertion of FIG. 2B, such that tray interface portion 58 may change from its first tray interface state to its second tray interface state, such a state change of tray interface portion 58 may cause user interface portion 52 to change from its first user interface state to its second user interface state. While, in other embodiments, if tray 20 does not interact with tray interface portion 58 during the stage of insertion of FIG. 2B, such that tray interface portion 58 may not change from its first tray interface state to its second tray interface state, then user interface portion 52 may not change from its first user interface state to its second user interface state. Therefore, user interface portion 52 may likewise be in its first user interface state or in its second user interface state at the stage of the insertion of tray 20 into housing 18 of FIG. 2B.

The tendency for ejector mechanism 50 to change between its first and second ejector mechanism states (e.g., the tendency for user interface portion 52 and tray interface portion 58 to change between their respective first and second states), may be defined by one or more material characteristics of user interface portion 52 and/or tray interface portion 58, by one or more characteristics of how end 51 and/or end 59 is fixed to device 10, and/or by one or more characteristics of coupling 55. For example, in some embodiments, the material characteristics of user interface portion 52 and the characteristics of how end 51 is fixed to device 10 may be such that, absent any external forces acting on user interface portion 52 (e.g., any user input force provided by user input tool 98 or any force provided by tray interface portion 58 via coupling 55), user interface portion 52 may not be biased to exist in one user interface state or the other. That is, if first user interface portion end 51 of a rigid user interface portion 52 is coupled to housing 18 using an unbiased free swinging hinge, such a user interface portion 52 may have no tendency to move from its second user interface state to its first user interface state or from its first user interface state to its second user interface state, absent being coupled via coupling 55 to a tray interface portion 58 having a tendency to move, respectively, from its second tray interface state to its first tray interface state or from its first tray interface state to its second tray interface state (see, e.g., FIG. 2B). Similarly, in other embodiments, the material characteristics of tray interface portion 58 and the characteristics of how end 59 is fixed to device 10 may be such that, absent any external forces acting on tray interface portion 58 (e.g., any tray input force provided by tray 20 or any force provided by user interface portion 52 via coupling 55), tray interface portion 58 may not be biased to exist in one tray interface state or the other. That is, if second tray interface portion end 59 of a rigid tray interface portion 58 is coupled to housing 18 using an unbiased free swinging hinge, such a tray interface portion 58 may have no tendency to move from its second tray interface state to its first tray interface state or from its first tray interface state to its second tray interface state, absent being coupled via coupling 55 to a user interface portion 52 having a tendency to move, respectively, from its second user interface state to its first user interface state or from its first user interface state to its second user interface state. In yet other embodiments, user interface portion 52 and tray interface portion 58 may each be independently biased to exist in one of their two respective states, such that, when they are coupled via coupling 55, the tendency of ejector mechanism 50 to move either from its second ejector mechanism state to its first ejector mechanism state or from its first ejector mechanism state to its second ejector mechanism state may be based on the combination of the independent tendencies of user interface portion 52 and tray interface portion 58 to do so. Any suitable tension may exist between ends 51 and 59 to bias user interface portion 52 and/or tray interface portion 58 such that ejector mechanism 50 may remain in a particular ejector mechanism state when an input force (e.g., a user input force and/or a tray input force) is not applied to ejector mechanism 50. For example, in some embodiments, when ejector mechanism 50 is in its first ejector mechanism state, at least one of user interface portion 52 and tray interface portion 58 may be relaxed in its first state, and when ejector mechanism 50 is in its second ejector mechanism state, at least one of user interface portion 52 and tray interface portion 58 may be pulled taut in its second state. By changing from a state of tautness to a state of relaxation (e.g., from a taut state having a first stress to a relaxed state having a second stress that may be lower than the first stress), tray interface portion 58 may impart an ejection force onto tray 20. As another example, in some embodiments, when ejector mechanism 50 is in its first ejector mechanism state, at least one of user interface portion 52 and tray interface portion 58 may be held taut in its first state, and when ejector mechanism 50 is in its second ejector mechanism state, at least one of user interface portion 52 and tray interface portion 58 may be relaxed in its second state. By changing from a state of relaxation to a state of tautness (e.g., from a relaxed state having a first stress to a taut state having a second stress that may be greater than the first stress), tray interface portion 58 may impart an ejection force onto tray 20.

In some embodiments, first end 51 of user interface portion 52 may be the only portion of user interface portion 52 that is coupled to any portion of housing 18, connector 40, or any other portion of device 10 other than tray interface portion 58. Similarly, in some embodiments, second end 59 of tray interface portion 58 may be the only portion of tray interface portion 58 that is coupled to any portion of housing 18, connector 40, or any other portion of device 10 other than user interface portion 52. That is, besides ends 51 and 59, which may be distinct with tension therebetween, no other portion of ejector mechanism 50 may be coupled to any other portion of device 10. Coupling 55 and ends 53 and 57 may be free from any other components of device 10 and may only be impacted by a removable entity or a user input tool.

Such that a user of device 10 may eject tray 20 from connector 40 using ejector mechanism 50 (e.g., when tray 20 is held in its functional or fully loaded position by connector 40, as shown in FIG. 2C, for example), at least a portion of user interface portion 52 may be accessible to a user through user interface opening 17. As mentioned, user interface opening 17 may be an opening provided through any suitable portion of housing 18 for providing a user external to housing 18 with the ability to apply a user input force in the direction of arrow UI onto user interface portion 52. For example, as shown in FIGS. 2A-2E, user interface opening 17 may be provided through bottom wall 18b of housing 18. It is to be noted that, although user interface opening 17 is shown in FIGS. 2A-2E to be provided through bottom wall 18b, which may be the same housing wall through which module housing opening 19 may be provided, user interface opening 17 may be provided through any other wall of housing 18 having any geometrical or spatial relationship with the wall of housing 18 through which module housing opening 19 may be provided. For example, in other embodiments, user interface opening 17 may be provided through any one of top wall 18t, front wall 18f, back wall 18k, left wall 18l, and right wall 18r when module housing opening 19 is provided through bottom wall 18b, and at least a portion of user interface portion 52 may be accordingly positioned within housing 18 to receive a user input force through user interface opening 17. Moreover, although a user input force may be shown in FIGS. 2A-2E to be applied in the direction of arrow UI that may be parallel to the direction of arrow I along which tray 20 may be inserted through module housing opening 19, the direction of arrow UI of a user input force applied to user input portion 52 of ejector mechanism 50 may have any suitable directional relationship with respect to the direction of arrow I (e.g., the directions of arrows UI and I may be opposite, perpendicular, skew, etc.).

As described in greater detail with respect to the various embodiments of FIGS. 3A-7B, when user interface portion 52 is in its first user interface state, at least a portion of user interface portion 52 may be configured to cover at least a portion of user interface opening 17. In some embodiments, when user interface portion 52 is in its first user interface state, a portion of user interface portion 52 may be biased to press against a portion of housing 18 about user interface opening 17 (e.g., against inner surface 18i of housing 18 about opening 17) and/or may be biased to fit into user interface opening 17 (e.g., within opening 17, between inner surface 18i and outer surface 18o of housing 18), such that user interface portion 52 in its first user interface state may provide an environmental seal for preventing ingress of water or other debris into housing 18 through user interface opening 17. However, in some embodiments, user interface opening 17 may not be an opening that may even permit water or other debris from traveling completely therethrough. Instead, in some embodiments, user interface opening 17 may include a cover that may allow a user input force to be applied to one side of the cover, and then transferred to the other side of the cover, and then onto user interface portion 52, while at the same time preventing debris from passing through such a cover. For example, as shown in FIG. 2E, a cover 17' may be positioned across and/or within user interface opening 17 and may be an elastic filter that can flex when a user input force is applied thereto and that can prevent certain fluids from passing therethrough (e.g., water, dirt, or other debris that could jeopardize the performance of device 10).

In some embodiments, as shown in FIGS. 3A-7B, for example, ejectable component assembly 16 may include an ejector mechanism 150, which may be similar to ejector mechanism 50 of FIGS. 2A-2E, for at least partially ejecting tray 20 and/or module 30 from connector 40 and/or housing 18. Ejector mechanism 150 may include a user interface portion 152 and a tray interface portion 158. User interface portion 152 may extend between a first user interface portion end 151 and a second user interface portion end 153. Tray interface portion 158 may extend between a first tray interface portion end 157 and a second tray interface portion end 159. First end 151 of user interface portion 152 may be coupled to a fixed portion of device 10 (e.g., first end 151 may be coupled to a portion of housing 18 or another component of device 10 whose position may be fixed with respect to housing 18) and second end 159 of tray interface portion 158 may be coupled to another fixed portion of device 10 (e.g., second end 159 may be coupled to a portion of housing 18 or another component of device 10 whose position may be fixed with respect to housing 18), while second end 153 of user interface portion 152 may be coupled to first end 157 of tray interface portion 158.

As described above with respect to user interface portion 52 of ejector mechanism 50 of FIGS. 2A-2E, user interface portion 152 of ejector mechanism 150 may be any suitable unitary component or collection of suitable components that may be capable deflecting, deforming, bending, springing, pivoting, translating, rotating, moving, or otherwise changing between a first user interface state or position (e.g., as shown in FIGS. 3A, 3C, 3E, 4A, 4C, 4E, 5A, 5C, 5E, 6, and 7A) and a second user interface state or position (e.g., as shown in FIGS. 3B, 3D, 4B, 4D, 5B, 5D, and 7B). User interface portion 152 may be made of any suitable material, such as rubber, plastic, metal, or any suitable combinations thereof. In some embodiments, user interface portion 152 may be a single component made of any suitable material while, in other embodiments, user interface portion 152 may be several distinct components. Different portions of user interface portion 152 may be flexible or rigid. For example, a first portion of user interface portion 152 at or near first end 151 may be rigid (e.g., for coupling to a portion of housing 18), while another portion of user interface portion 152 may be flexible (e.g., for bending or deflecting from the first user interface state to the second user interface state).

Moreover, as described above with respect to tray interface portion 58 of ejector mechanism 50 of FIGS. 2A-2E, tray interface portion 158 of ejector mechanism 150 may be any suitable unitary component or collection of suitable components that may be capable of deflecting, deforming, bending, springing, pivoting, translating, rotating, moving, or otherwise changing between a first tray interface state or position (e.g., as shown in FIGS. 3A, 3C, 3E, 4A, 4C, 4E, 5A, 5C, 5E, 6, and 7A) and a second tray interface state or position (e.g., as shown in FIGS. 3B, 3D, 4B, 4D, 5B, 5D, and 7B). Tray interface portion 158 may be made of any suitable material, such as rubber, plastic, metal, or any suitable combinations thereof. In some embodiments, tray interface portion 158 may be a single component made of any suitable material while, in other embodiments, tray interface portion 158 may be several distinct components. Different portions of tray interface portion 158 may be flexible or rigid. For example, a first portion of tray interface portion 158 at or near second end 159 may be rigid (e.g., for coupling to a portion of housing 18), while another portion of tray interface portion 158 may be flexible (e.g., for bending or deflecting from the first tray interface state to the second tray interface state).

For example, as shown in FIGS. 3A-7B, user interface portion 152 may include one or more plates (e.g., plate 172 and/or plate 182) that may extend between first user interface portion end 151 and second user interface portion end 153, and first end 151 may be fixed or otherwise coupled to inner surface 18$i$ of wall 18$b$ by one or more suitable mountings 161 (e.g., one or more welding or bonding locations, cladding, insert molding, screws, fasteners, rivets, hooks, tabs, holes, etc.). When user interface portion 152 is in its first user interface state (e.g., as shown in FIGS. 3A, 3C, 3D, 4A, 4C, 4D, 5A, 5C, 5D, 6, and 7A), user interface portion 152 may extend against and along inner surface 18$i$ of wall 18$b$ from first end 151 towards second end 153. In this first user interface state, user interface portion 152 may extend across and block at least a portion of user interface opening 17 provided through inner surface 18$i$, such that user interface portion 152 may be configured to press against housing 18 about user interface opening 17 for preventing debris from entering into housing 18 through user interface opening 17 when user interface portion 152 is in its first user interface state.

Moreover, as shown in FIGS. 3A-7B, tray interface portion 158 may include a beam (e.g., beam 192) that may extend between first tray interface portion end 157 and second tray interface portion end 159, and second end 159 may be fixed or otherwise coupled to inner surface 18$i$ of wall 18$k$ by one or more suitable mountings 169 (e.g., a ball and socket mounting, a hinge pin mounting, a compliant coupler mounting, etc.). When tray interface portion 158 is in its first tray interface state (e.g., as shown in FIGS. 3A, 3C, 3D, 4A, 4C, 4D, 5A, 5C, 5D, 6, and 7A), tray interface portion 158 may extend across at least a portion of module housing opening 19 from second end 159 towards first end 157. In this first tray interface state, tray interface portion 158 may extend across at least a portion of module housing opening 19, such that tray interface portion 158 may interact with at least a portion of tray 20 when tray 20 is inserted through module housing opening 19 and into connector 40.

In some embodiments, first end 151 of user interface portion 152 and second end 159 of tray interface portion 158 may be fixed with respect to one another or be at least partially constrained with respect to one another. Each one of first end 151 and second end 159 may be fixed to or have its movement at least partially constrained by any portion of device 10 (e.g., housing 18, connector 40, etc.). First end 151 may be fixed to or have its movement at least partially constrained/restrained by a first portion of device 10 at a first location within housing 18 by mounting 161 and second end 159 may be fixed to or otherwise have its movement at least partially constrained/restrained by a second portion of device 10 at a second location within housing 18 by mounting 169.

First end 157 of tray interface portion 158 may be coupled to second end 153 of user interface portion 152 in any suitable manner using any suitable coupling 155. Coupling 155 may allow constrained relative motion between user interface portion 152 and tray interface portion 158, such that user interface portion 152 may change between its first and second user interface states when tray interface portion 158 may change between its first and second tray interface states, and vice versa. Therefore, coupling 155 may allow for ejector mechanism 150 to change between a first ejector mechanism state (e.g., when each one of user interface portion 152 and tray interface portion 158 is in its respective first state) and a second ejector mechanism state (e.g., when each one of user interface portion 152 and tray interface portion 158 is in its respective second state). For example, as shown in FIGS. 3A-7B, coupling 155 formed between second end 153 of user interface portion 152 and first end 157 of tray interface portion 158 may be a hinge bearing, such that first end 157 and second end 153 may each relatively rotate about an axis A of coupling 155 (see, e.g., axis A of FIGS. 3A, 4A, and 6). In other embodiments, coupling 155 may be a ball and socket, a hinge pin, a compliant coupler, or any other suitable mechanism for coupling first end 157 of tray interface portion 158 to second end 153 of user interface portion 152.

The tendency for ejector mechanism 150 to change between its first and second ejector mechanism states (e.g., the tendency for user interface portion 152 and tray interface portion 158 to change between their respective first and second states), may be defined by one or more material characteristics of user interface portion 152 and/or tray interface portion 158, by one or more characteristics of mounting 161 and/or mounting 169, and/or by one or more characteristics of coupling 155. For example, in some embodiments, the material characteristics of user interface portion 152 and the characteristics of mounting 161 may be such that, absent any external forces acting on user interface portion 152 (e.g., any user input force provided by user input tool 98 or any force provided by tray interface portion 158 via coupling 155), user interface portion 152 may not be biased to exist in one user interface state or the other. That is, if first user interface portion end 151 of a rigid user interface portion 152 is coupled to housing 18 using an unbiased free swinging hinge mounting 161, such a user interface portion 152 may have no tendency to move in either the direction of arrow U1 from its second user interface state to its first user interface state or in the direction of arrow U2 from its first user interface state to its second user interface state, absent being coupled via coupling 155 to a tray interface portion 158 having a tendency to move, respectively, in either the direction of arrow T1 from its second tray interface state to its first tray interface state or in the direction of arrow T2 from its first tray interface state to its second tray interface state (see, e.g., FIGS. 3B and 7B). Similarly, in other embodiments, the material characteristics of tray interface portion 158 and the characteristics of mounting 169 may be such that, absent any external forces acting on tray interface portion 158 (e.g., any tray input force provided by tray 20 or any force provided by user interface portion 152 via coupling 155), tray interface portion 158 may not be biased to exist in one tray interface state or the other. That is, if second tray interface portion end 159 of a rigid tray interface portion 158 is coupled to housing 18 using an unbiased free swinging hinge mounting 169, such a tray interface portion 158 may have no tendency to move in either the direction of arrow T1 from its second tray interface state to its first tray interface state or in the direction of arrow T2 from its first tray interface state to its second tray interface state, absent being coupled via coupling 155 to a user interface portion 152 having a tendency to move, respectively, in either the direction of arrow U1 from its second user interface state to its first user interface state or in the direction of arrow U2 from its first user interface state to its second user interface state. In yet other embodiments, user interface portion 152 and tray interface portion 158 may each be independently biased to exist in one of their two respective states, such that, when they are coupled via coupling 155, the tendency of ejector mechanism 150 to move in either the direction of arrow E1 from its second ejector mechanism state to its first ejector mechanism state or in the direction of arrow E2 from its first ejector mechanism state to its second ejector mechanism state may be based on the combination of the independent tendencies of user interface portion 152 and tray interface portion 158 to do so. Any suitable tension may exist between mountings 161 and 169 to bias user interface portion 152 and/or tray interface portion 158 such that ejector mechanism 150 may remain in a particular ejector mechanism state when an input force (e.g., a user input force and/or a tray input force) is not applied to ejector mechanism 150. For example, in some embodiments, when ejector mechanism 150 is in its first ejector mechanism state, at least one of user interface portion 152 and tray interface portion 158 may be relaxed in its first state, and when ejector mechanism 150 is in its second ejector mechanism state, at least one of user interface portion 152 and tray interface portion 158 may be pulled taut in its second state. By changing from a state of tautness to a state of relaxation (e.g., from a taut state having a first stress to a relaxed state having a second stress that may be lower than the first stress), tray interface portion 158 may impart an ejection force onto tray 20. As another example, in some embodiments, when ejector mechanism 150 is in its first ejector mechanism state, at least one of user interface portion 152 and tray interface portion 158 may be held taut in its first state, and when ejector mechanism 150 is in its second ejector mechanism state, at least one of user interface portion 152 and tray interface portion 158 may be relaxed in its second state. By changing from a state of relaxation to a state of tautness (e.g., from a relaxed state having a first stress to a taut state having a second stress that may be greater than the first stress), tray interface portion 158 may impart an ejection force onto tray 20.

For example, as shown in FIGS. 3A, 4A, 5A, and 7A, before any portion of tray 20 has been inserted into housing 18, before any user input force has been applied to user interface portion 152, and before any tray input force has been applied to tray interface portion 158, ejector mechanism 150 may be configured to be in its first ejector mechanism state. Therefore, as shown, when ejector mechanism 150 is in its first ejector mechanism state, user interface portion 152 may extend along inner surface 18i and across at least a portion of user interface opening 17, and tray interface portion 158 may extend across at least a portion of module housing opening 19. In this first ejector mechanism state, ejector mechanism 150 may be biased such that user interface portion 152 may exert a force in the direction of arrow U1 on housing 18 or on any other suitable portion of device 10, and/or such that tray interface portion 158 may exert a force in the direction of arrow T1 on housing 18 or on any other suitable portion of device 10. In other embodiments, neither user interface portion 152 nor tray interface portion 158 may be exerting any force in the directions of respective arrows U1 and T1 when ejector mechanism 150 is in its first ejector mechanism state.

Figure 4A:
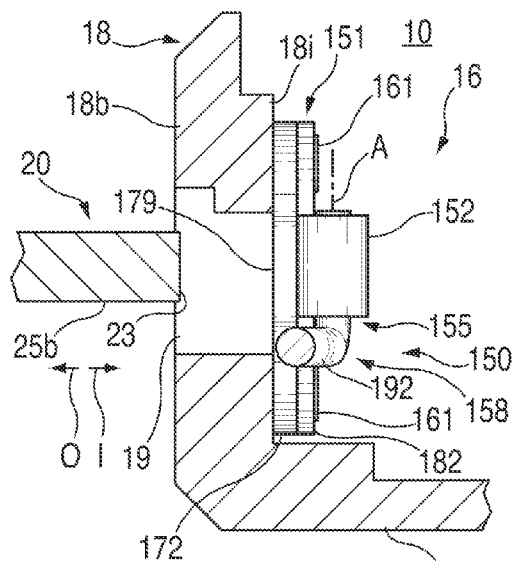
FIG. 4A is a cross-sectional view of the portion of the electronic device of FIGS. 1-3E, taken from line IVA-IVA of FIG. 3A, in accordance with some embodiments of the invention.
Figure 4B:
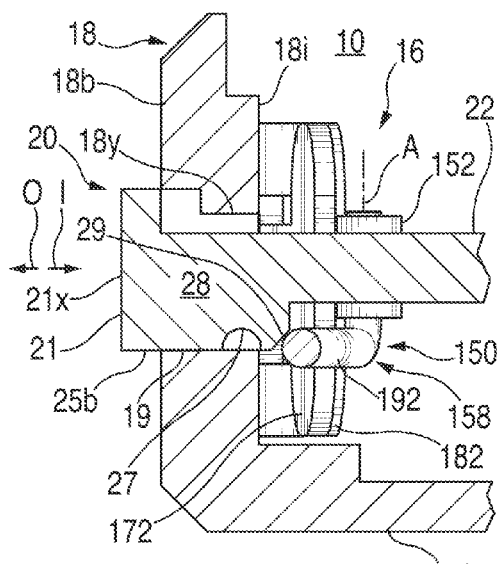
FIG. 4B is a cross-sectional view of the portion of the electronic device of FIGS. 1-4A, taken from line IVB-IVB of FIG. 3B, in accordance with some embodiments of the invention.

Once tray 20 has been initially inserted through opening 19 and into housing 18 in the direction of arrow I to a certain extent, as shown in FIGS. 3B, 4B, and 5B, for example, a portion of tray 20 may interact with a portion of tray interface portion 158 such that tray interface portion 158 may change from its first tray interface state to its second tray interface state. For example, in some embodiments, once tray 20 has been at least partially inserted in the direction of arrow I into housing 18, ejector interface portion 28 on bottom surface 25b of tray 20 may interact with tray interface portion 158 (e.g., ejector interface portion 28 may apply a tray input force on tray interface portion 158 in the direction of arrow I) such that tray interface portion 158 may change from its first tray interface state to its second tray interface state. As shown, a leading edge 29 of ejector interface portion 28 may initially contact tray interface portion 158 and may apply a tray input force onto tray interface portion 158 in the direction of arrow I as tray 20 is initially inserted into device 10 in the direction of arrow I.

Figure 4C:
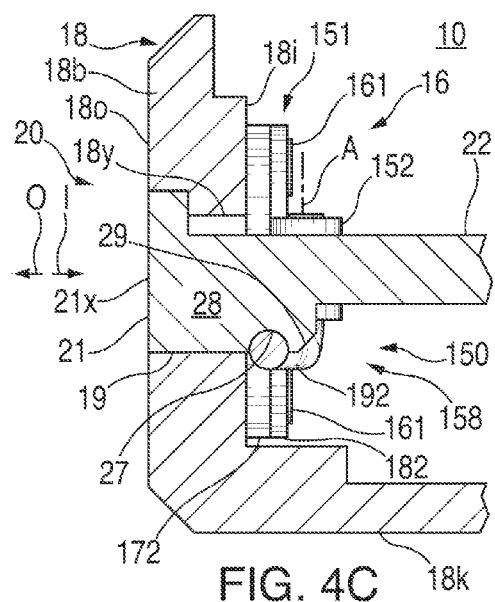
FIG. 4C is a cross-sectional view of the portion of the electronic device of FIGS. 1-4B, taken from line IVC-IVC of FIG. 3C, in accordance with some embodiments of the invention.

When this tray input force is applied by tray 20 onto tray interface portion 158 in the direction of arrow I, ejector mechanism 150 may be configured to change from its first ejector mechanism state to its second ejector mechanism state (e.g., tray interface portion 158 may be configured to change from its first tray interface state to its second tray interface state and user interface portion 152 may be configured to change from its first user interface state to its second user interface state). For example, in some embodiments, as tray 20 may be inserted further into device 10, and as tray 20 may further apply the tray input force onto tray interface portion 158 in the direction of arrow I, tray interface portion 158 may change from its first tray interface state to its second tray interface state. As tray interface portion 158 and, thus, ejector mechanism 150 change from their first states to their second states, ejector mechanism 150 may be biased or otherwise configured to exert a force in the direction of arrow E1 onto tray 20 (e.g., tray interface portion 158 may be biased or otherwise configured to exert a force in the direction of arrow T1 onto tray 20). At some point, during the further insertion of tray 20 into device 10 (e.g., from FIG. 3B to FIG. 3C in the direction of arrow I), the force exerted by ejector mechanism 150 onto tray 20 in the direction of arrow E1/T1 may overcome the further tray input force exerted by tray 20 onto ejector mechanism 150 in the direction of arrow I. At that point, ejector mechanism 150 may be configured to return from its second ejector mechanism state of FIGS. 3B, 4B, and 5B to its first ejector mechanism state of FIGS. 3C, 4C, and 5C. For example, as shown, leading edge 29 of ejector interface portion 28 may be angled such that the competing forces being exerted by tray 20 and tray interface portion 158 may cause tray interface portion 158 to slide downwardly along leading edge 29 and to enter into a securement feature 27 of ejector interface portion 28. As shown in FIGS. 3C, 4C, and 5C, for example, device 10 may be configured such that, when tray interface portion 158 does enter into securement feature 27 of ejector interface portion 28, tray 20 may be in its fully loaded position. In such embodiments, the interaction of securement feature 27 with tray interface portion 158 in its first state may retain tray 20 in its fully loaded position (e.g., without requiring retention members 42a and 42b to retain tray 20 at that fully loaded position). Therefore, in some embodiments, tray interface portion 158 may interact with tray 20 to prevent tray 20 from sliding out of device 10 once tray 20 is held in its fully loaded position by tray interface portion 158. In some embodiments, the geometry of ejector interface portion 28 and the relative geometry of tray interface portion 158 may be configured such that tray interface portion 158 may snap into or otherwise be securely retained within securement feature 27. This retention may be an active contact between tray 20 and tray interface portion 158 (e.g., contact that may reinforce itself via interlocking geometry). In other embodiments, such retention of or contact between tray interface portion 158 and ejector interface portion 28 may be maintained by an active contact that may reinforce itself via attraction (e.g., magnetic attraction) rather than via geometry. For example, as described with respect to an embodiment of FIG. 8C, attractable magnets or any other suitable mechanisms may be provided to hold tray interface portion 158 and ejector interface portion 28 together. In such active contact embodiments, tray interface portion 158 may be configured to hold tray 20 in its fully loaded position (e.g., without the aid of retention members 42a and 42b). In yet other embodiments, one or more magnets could be provided to aid alignment and/or engagement of securement feature 27 with tray interface portion 158.

When retained in its fully loaded position of FIGS. 3C, 4C, and 5C, outer surface 21x of outer tray end 21 of tray 20 may be substantially flush and/or continuous with an outer surface 18o of housing 18 about opening 19. In some embodiments, ejector mechanism 150 may be biased to remain in its first ejector mechanism state, such that ejector mechanism 150 may prevent tray 20 from being inserted further in the direction of arrow I. Additionally or alternatively, a portion of housing 18 may interact with tray 20 to prevent tray 20 from being inserted further in the direction of arrow I. For example, as shown in FIG. 4C, housing 18 may include a housing key portion 18y that may be positioned within or adjacent an end of opening 19, such that housing key portion 18y may obstruct and prevent a portion of tray 20 (e.g., a portion of outer tray end 21) from being inserted further in the direction of arrow I. Ejector mechanism 150 may be configured such that housing key portion 18y may interact with tray 20 at about the same moment that tray interface portion 158 may snap into or otherwise be securely retained within securement feature 27. Moreover, housing key portion 18y may be positioned with respect to opening 19 such that tray 20 may not be inserted too far within opening 19 while tray 20 is upside down. For example, if tray 20 were attempted to be inserted into opening 19 in the direction of arrow I while bottom surface 25b of tray 20 was facing upwards (e.g., towards housing key portion 18y of FIG. 4B), then housing key portion 18y may be configured to obstruct and prevent ejector interface portion 28 from being inserted in the direction of arrow I beyond housing key portion 18y. Therefore, a user may be prevented from inserting tray 20 too far into opening 18 when tray 20 is upside down.

Once tray 20 is held in this functional or fully loaded position within housing 18, ejector mechanism 150 may be configured to receive a user input force, which may cause ejector mechanism 150 to change from its first ejector mechanism state to its second ejector mechanism state, which may at least partially eject tray 20 from device 10. For example, as shown in FIGS. 3D, 4D, 5D, and 7B, first end 99 of user input tool 98 may be inserted through user interface opening 17 in housing 18 for applying a user input force in the direction of arrow UI onto a portion of user interface portion 152. When this user input force is applied onto user interface portion 152, user interface portion 152 may be configured to change from its first user interface state of FIGS. 3C, 4C, and 5C to its second user interface state of FIGS. 3D, 4D, 5D, and 7B. When user interface portion 152 changes from its first user interface state to its second user interface state, the change may cause tray interface portion 158 to change from its first tray interface state of FIGS. 3C, 4C, and 5C to its second tray interface state of FIGS. 3D, 4D, 5D, and 7B. This alteration of states by tray interface portion 158 may cause at least a portion of tray interface portion 158 to interact with tray 20 for at least partially ejecting tray 20 from device 10 in the direction of arrow O, as shown in FIGS. 3D, 4D, 5D, and 7B.

Figure 3A:
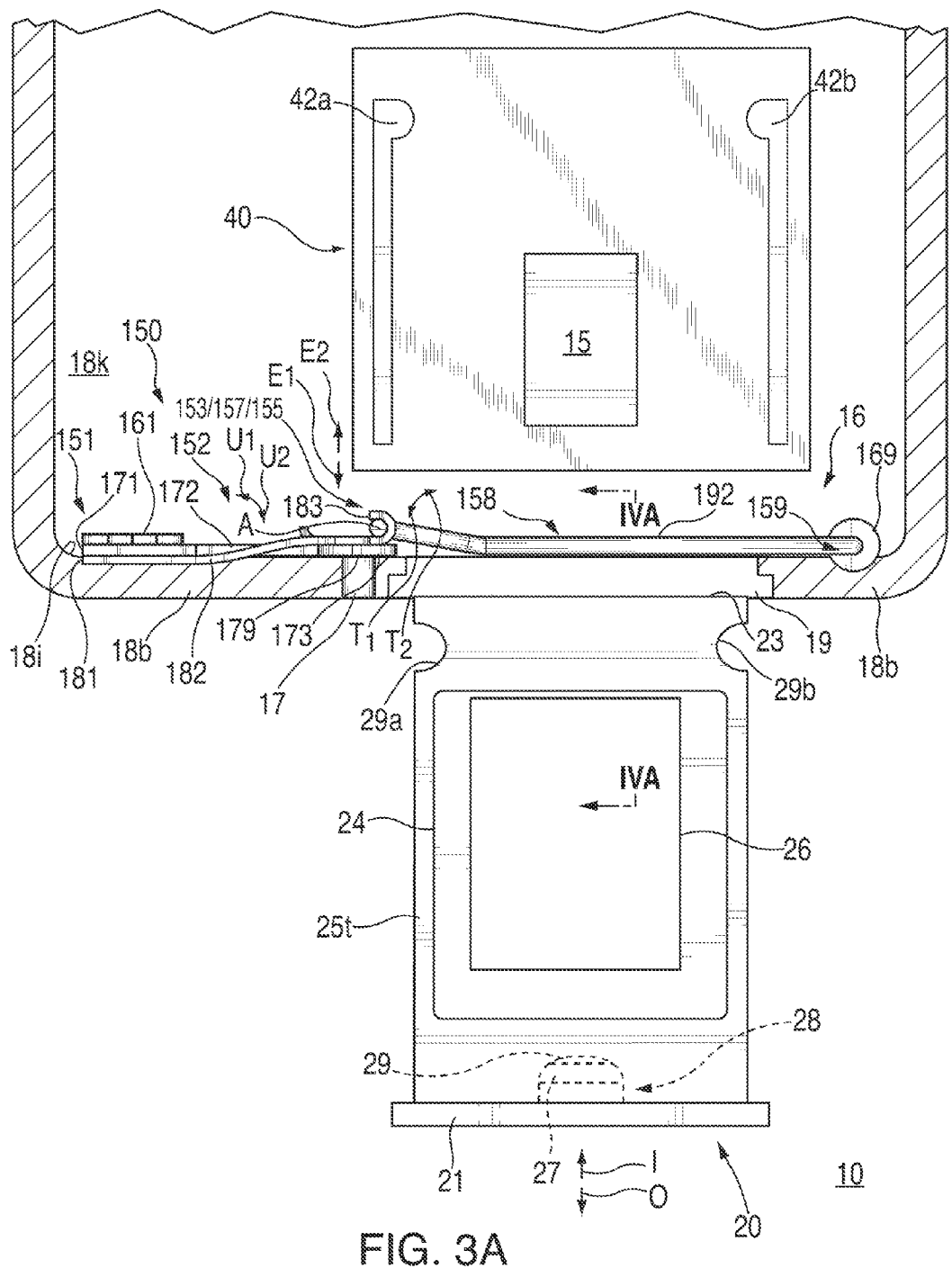
FIG. 3A is an elevational view of a portion of the electronic device of FIGS. 1-2E, similar to FIG. 2A, of a first alternative embodiment of a portion of the ejectable component assembly of FIGS. 1-2E, in a first stage of actuation, similar to FIG. 2A, in accordance with some embodiments of the invention.
Figure 3D:
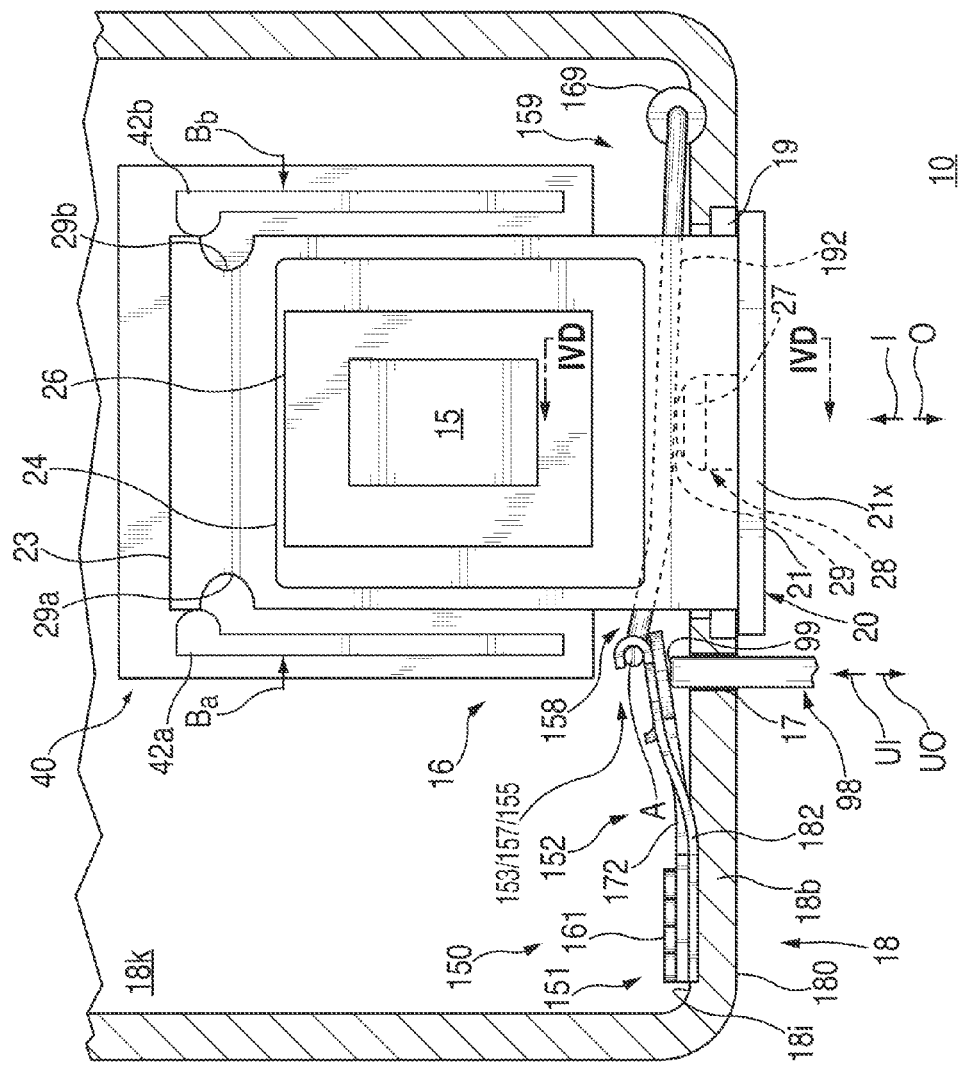
FIG. 3D is an elevational view of a portion of the electronic device of FIGS. 1-3C, similar to FIG. 2D, of the first alternative embodiment of the portion of the ejectable component assembly of FIGS. 3A-3C, in a fourth stage of actuation, similar to FIG. 2D, in accordance with some embodiments of the invention.
Figure 4D:
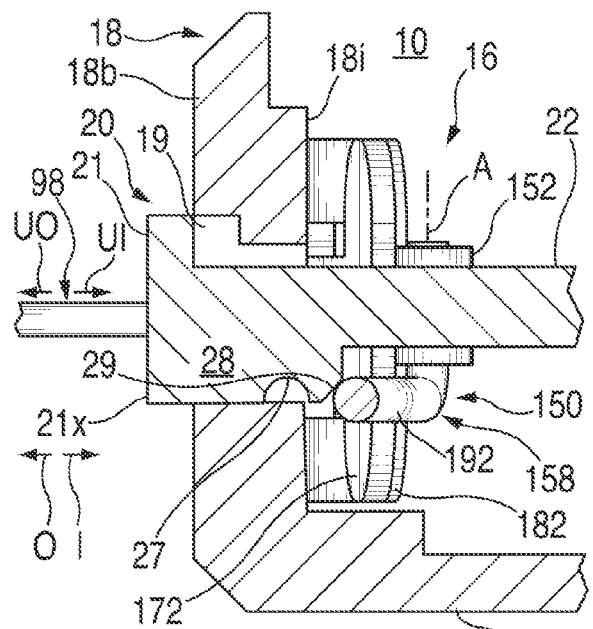
FIG. 4D is a cross-sectional view of the portion of the electronic device of FIGS. 1-4C, taken from line IVD-IVD of FIG. 3D, in accordance with some embodiments of the invention.
Figure 4E:
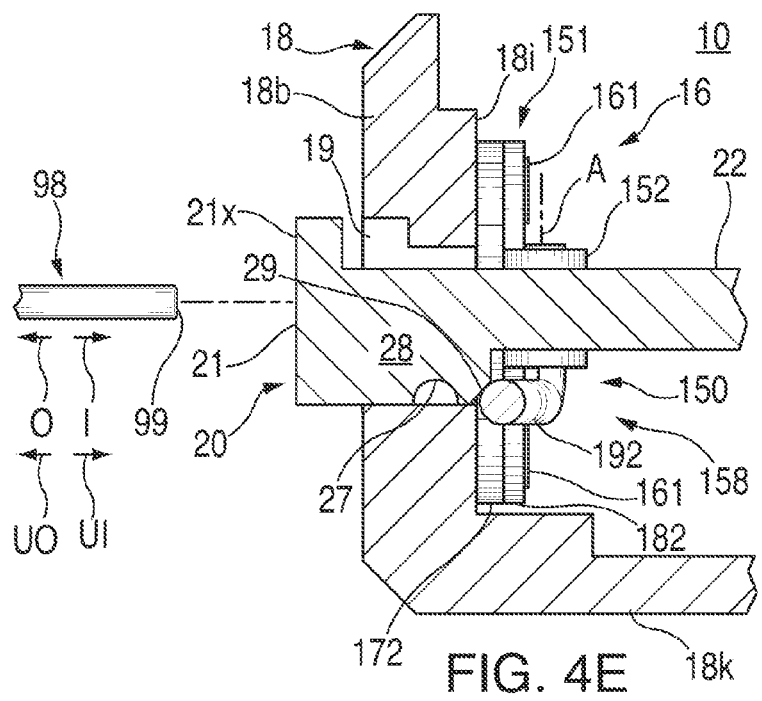
FIG. 4E is a cross-sectional view of the portion of the electronic device of FIGS. 1-4D, taken from line IVE-IVE of FIG. 3E, in accordance with some embodiments of the invention.

For example, as shown, when tray interface portion 158 changes from its first tray interface state to its second tray interface state for at least partially ejecting tray 20, securement feature 27 of ejector interface portion 28 may be shaped such that the competing forces being exerted by tray 20 and tray interface portion 158 may cause tray interface portion 158 to slide out from securement feature 27 and upwardly along leading edge 29. In some embodiments, such sliding of tray interface portion 158 along leading edge 29 of tray 20 may force tray 20 at least partially in the direction of arrow O. As shown in FIGS. 3D, 4D, and 5D, for example, device 10 may be configured such that, when tray interface portion 158 does exit securement feature 27 of ejector interface portion 28, ejector mechanism 150 may no longer retain tray 20 in its fully loaded position. Then, once tray interface portion 158 is in its second tray interface state of FIGS. 3D, 4D, and 5D, and once the application of the user input force on user interface portion 152 is terminated, ejector mechanism 150 may be configured to return from its second ejector mechanism state to its first ejector mechanism state. For example, when first end 99 of user input tool 98 is at least partially withdrawn through user interface opening 17 in the direction of arrow UO for terminating the application of a user input force on a portion of user interface portion 152, user interface portion 152 may be configured to return from its second user interface state of FIGS. 3D, 4D, and 5D to its first user interface state of FIGS. 3E, 4E, and 5E. This change of user interface portion 152 from its second user interface state to its first user interface state may cause tray interface portion 158 to change from its second tray interface state of FIGS. 3D, 4D, and 5D to its first tray interface state of FIGS. 3E, 4E, and 5E, which may in turn eject (e.g., further eject) tray 20 in the direction of arrow O from device 10. For example, the force that tray interface portion 158 may be biased or otherwise configured to exert on tray 20 in the direction of arrow T1 when tray interface portion 158 changes from its second tray interface state to its first tray interface state may be great enough to overcome any retention force that may be applied to tray 20 (e.g., by retention members 42a and 42b of connector 40 on tray 20 in the direction of arrows Ba and Bb), such that tray 20 may be at least partially ejected from connector 40 in the direction of arrow O (e.g., from the tray position of FIGS. 3D, 4D, and 5D to the at least partially ejected tray position of FIGS. 3E, 4E, and 5E). In some embodiments, tray interface portion 158 may be configured to exert an ejection force in the direction of arrow T1 onto leading edge 29 of ejector interface portion 28 of tray 20 or onto any other suitable portion of tray 20 in order to at least partially eject tray 20 from device 10.

Therefore, ejector mechanism 150 of FIGS. 3A-7B may be configured to change between a first ejector mechanism state (e.g., an ejector mechanism state that may include a first user interface state and a first tray interface state) and a second ejector mechanism state (e.g., an ejector mechanism state that may include a second user interface state and a second tray interface state), such that ejector mechanism 150 may receive, retain, and/or eject tray 20 and/or removable module 30. For example, user interface portion 152 may be configured to change from the first user interface state to the second user interface state when a user input force is applied by a user onto user interface portion 152 (e.g., as shown in FIGS. 3D, 4D, 5D, and 7B) or in response to tray interface portion 158 changing from the first tray interface state to the second tray interface state (e.g., as shown in FIGS. 3B, 4B, and 5B). User interface portion 152 may also be configured to change from the second user interface state to the first user interface state when the application of a user input force onto user interface portion 152 is terminated (e.g., as shown in FIGS. 3E, 4E, and 5E) or in response to tray interface portion 158 changing from the second tray interface state to the first tray interface state (e.g., as shown in FIGS. 3C, 4C, and 5C). Moreover, tray interface portion 158 may be configured to change from the first tray interface state to the second tray interface state when a tray input force is applied by tray 20 onto tray interface portion 158 (e.g., as shown in FIGS. 3B, 4B, and 5B) or in response to user interface portion 152 changing from the first user interface state to the second user interface state (e.g., as shown in FIGS. 3D, 4D, 5D, and 7B). Tray interface portion 158 may also be configured to change from the second tray interface state to the first tray interface state when the application of a tray input force onto tray interface portion 158 is terminated or overcome (e.g., as shown in FIGS. 3C, 4C, and 5C) or in response to user interface portion 152 changing from the second user interface state to the first user interface state (e.g., as shown in FIGS. 3E, 4E, and 5E).

In some embodiments, in response to user interface portion 152 receiving a user input force and thereby changing from the first user interface state to the second user interface state, the resultant change of tray interface portion 158 from the first tray interface state to the second tray interface state may cause tray interface portion 158 to at least partially eject tray 20 from connector 40 and/or opening 19 (e.g., as shown in FIGS. 3D, 4D, 5D, and 7B). Moreover, in response to the termination of the application of a tray input force onto tray interface portion 158 (e.g., when tray interface portion 158 may overcome a tray input force), the resultant change of tray interface portion 158 from the second tray interface state to the first tray interface state may cause tray interface portion 158 to at least partially secure tray 20 to ejector mechanism 150 (e.g., to at least partially secure tray 20 in its functional or fully loaded position of FIGS. 3C, 4C, and 5C).

As shown in FIGS. 3A-7B, for example, user interface portion 152 may include a first user interface plate 172 that may extend between a first end 171 and a second end 173. First end 171 of first user interface plate 172 may be fixed or otherwise coupled to housing 18 by at least one mounting component 161 (e.g., at least one weld or other suitable bonding element). For example, as shown, first end 171 of first user interface plate 172 may be fixed or otherwise coupled to inner surface 18i of wall 18b, such that, when user interface portion 152 is in its first user interface state (e.g., as shown in FIGS. 3A, 3C, 3E, 4A, 4C, 4E, 5A, 5C, 5E, and 7A), first user interface plate 172 may extend against and along inner surface 18i of wall 18b towards second end 173. In this first user interface state, first user interface plate 172 may extend across and block at least a portion of user interface opening 17 provided through inner surface 18i, such that user interface portion 152 may be configured to press against housing 18 about user interface opening 17 for preventing debris from entering into housing 18 through user interface opening 17 when user interface portion 152 is in its first user interface state. In some embodiments, user interface portion 152 may only include first user interface plate 172, and coupling 155 may couple second end 173 of first user interface plate 172 to first end 157 of tray interface portion 158 (not shown).

As shown, user interface portion 152 may alternatively or additionally include a second user interface plate 182 that may extend between a first end 18l and a second end 183. In some embodiments, user interface portion 152 may only include second user interface plate 182 and not first user interface plate 172, and coupling 155 may couple second end 183 of second user interface plate 182 to first end 157 of tray interface portion 158. In other embodiments, user interface portion 152 may include both first user interface plate 172 and second user interface plate 182, as shown in FIGS. 3A-7B. Along the lengths of plates 172 and 182, plates 172 and 182 may transverse each other, such that, for example, the relative positions of plates 172 and 182 (e.g., with respect to housing wall 18b) may be different at first ends 171/18l than at second ends 173/183. For example, as shown, plates 172 and 182 may be provided in an offset stack such that first end 18l of second plate 182 may be positioned between housing wall 18b and first end 171 of first plate 172, while second end 173 of first plate 172 may be positioned between housing wall 18b and second end 183 of second plate 182. As shown in FIG. 6, for example, first plate 172 may pass through an opening 185 in second plate 182. When first ends 171 and 18l are independently or together coupled to housing 18 by one or more mounting components 161, portions of plates 172 and 182 may slide and/or pivot with respect to one another (e.g., as shear plates or a slip seam) when a user input force is applied to user interface portion 152 (e.g., when first end 99 of user input tool 98 applies a user input force in the direction of arrow UI onto a portion of first plate 172, as shown in FIGS. 3D, 4D, 5D, and 7B).

Figure 7A:
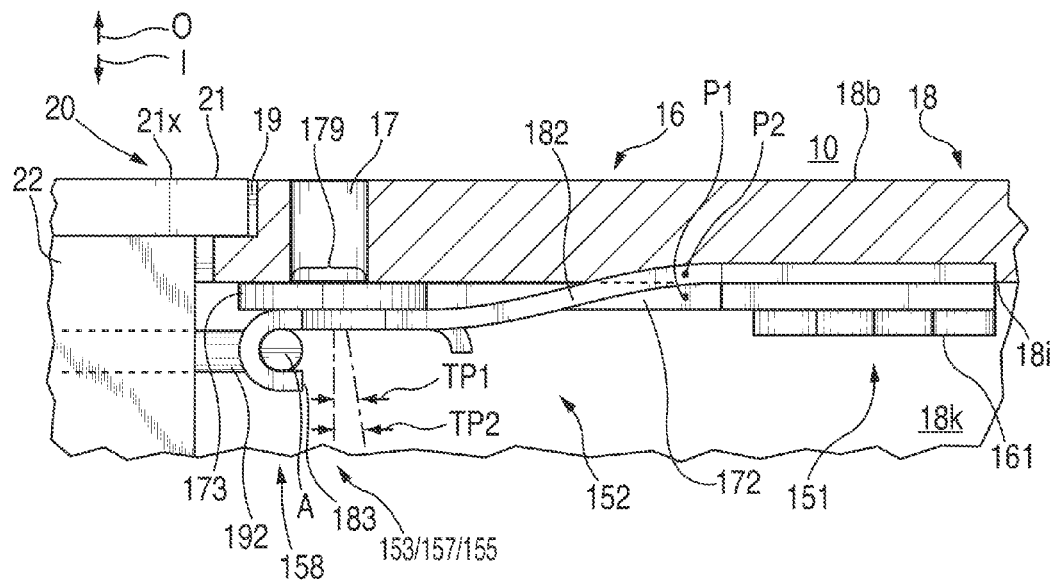
FIG. 7A is an elevational view, similar to FIG. 3C, of the first alternative embodiment of the portion of the ejectable component assembly of FIGS. 3A-6, in the third stage of actuation of FIGS. 3C, 4C, and 5C, in accordance with some embodiments of the invention.
Figure 7B:
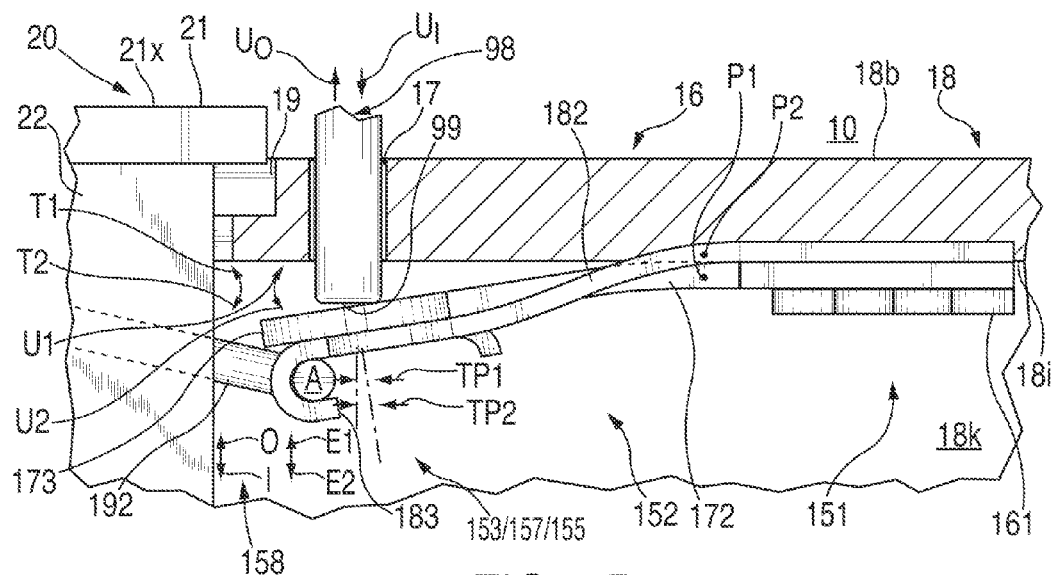
FIG. 7B is an elevational view, similar to FIG. 3D, of the first alternative embodiment of the portion of the ejectable component assembly of FIGS. 3A-7A, in the fourth stage of actuation of FIGS. 3D, 4D, and 5D, in accordance with some embodiments of the invention.

As shown in FIGS. 7A and 7B, for example, when user interface portion 152 includes first plate 172 and second plate 182 configured in a dual plate offset stack, first plate 172 may pivot about a first pivot point P1 and second plate 182 may pivot about a second pivot point P2 as user interface portion 152 changes between its first and second user interface states. Accordingly, these different pivot points may allow second end 173 of first plate 172 and second end 183 of second plate 182 to travel by different amounts when changing between user interface states. For example, as shown, second end 173 of first plate 172 may translate a first distance TP1 when user interface portion 152 changes from its first user interface state to its second user interface state, whereas second end 183 of second plate 182 may translate a second distance TP2 when user interface portion 152 changes from its first user interface state to its second user interface state. When user interface portion 152 includes first plate 172 and second plate 182 configured in a dual plate offset stack, second distance TP2 may be greater than distance TP1, such that first end 157 of tray interface portion 158 may travel a significant distance along with second end 183 of second plate 182, which may provide for a significant physical distinction between first and second tray interface states, while second end 173 of first plate 172 may travel a shorter distance, which may reduce the amount of galling or other degradation that first end 99 of user input tool 98 may inflict on a cosmetic surface portion 179 of first plate 172 proximate to second end 173 (e.g., a cosmetic surface portion of user interface portion 152 that may be visible to a user of device 10 through opening 17). Therefore, as shown, second end 173 of first plate 172 may be a free end that may not be directly coupled to any other component, while second end 183 of second plate 182 may be coupled to first end 157 of tray interface portion 158 via coupling 155. By including both of plates 172 and 182, rather than only a single one of plates 172 and 182, user interface portion 152 may require less travel of user input tool 98 through opening 17 in the direction of arrow UI to activate the change of states of tray interface portion 158. Offset pivot points of a multi-layer or multi-plate user interface portion may translate portions of ejector mechanism 150 with a user input force sooner than a single-layer or single-plate user interface portion.

As mentioned, the tendency for ejector mechanism 150 to change between its first and second ejector mechanism states (e.g., the tendency for user interface portion 152 and tray interface portion 158 to change between their respective first and second states), may be defined by one or more material characteristics of user interface portion 152 and/or tray interface portion 158, by one or more characteristics of mounting 161 and/or mounting 169, and/or by one or more characteristics of coupling 155. For example, in some embodiments, the characteristics of mounting 161 and the characteristics of first plate 172 and/or second plate 182 may be such that user interface portion 152 may be biased to remain in the first user interface state absent any external forces acting on user interface portion 152 (e.g., any user input force provided by user input tool 98 or any force provided by tray interface portion 158 via coupling 155). For example, first plate 172 and/or second plate 182 may be a spring plate that may be biased to pivot about point P1 and/or P2 in the direction of arrow U1 towards inner surface 18i of housing 18. Such a spring bias may also force beam 192 in the direction of arrow T1, such that ejector mechanism 150 may tend to be in its first ejector mechanism state. Alternatively, in some embodiments, the characteristics of mounting 169 and the characteristics of beam 192 may be such that tray interface portion 158 may be biased to remain in the first tray interface state absent any external forces acting on tray interface portion 158 (e.g., any tray input force provided by tray 20 or any force provided by user interface portion 152 via coupling 155). For example, beam 192 may be a spring beam that may be biased to pivot about mounting 169 in the direction of arrow T1 towards inner surface 18i of housing 18. Such a spring bias may also force plate 172 and/or plate 182 in the direction of arrow U1, such that ejector mechanism 150 may tend to be in its first ejector mechanism state. In yet other embodiments, beam 192 and plates 172/182 may each be independently biased to exist in one of their two respective states, such that, when they are coupled via coupling 155, the tendency of ejector mechanism 150 to move in either the direction of arrow E1 from its second ejector mechanism state to its first ejector mechanism state or in the direction of arrow E2 from its first ejector mechanism state to its second ejector mechanism state may be based on the combination of the independent tendencies of beam 192 and plates 172/182 to do so. Any suitable tension may exist between mountings 161 and 169 to bias user interface portion 152 and/or tray interface portion 158 such that ejector mechanism 150 may remain in a particular ejector mechanism state when an input force (e.g., a user input force and/or a tray input force) is not applied to ejector mechanism 150.

In some embodiments, first end 151 of user interface portion 152 may be the only portion of user interface portion 152 that is coupled to any portion of housing 18, connector 40, or any other portion of device 10 other than tray interface portion 158. Similarly, in some embodiments, second end 159 of tray interface portion 158 may be the only portion of tray interface portion 158 that is coupled to any portion of housing 18, connector 40, or any other portion of device 10 other than user interface portion 152. That is, besides ends 151 and 159, which may be distinct with tension therebetween, no other portion of ejector mechanism 150 may be coupled to any other portion of device 10. Coupling 155 and ends 153 and 157 may be free from any other components of device 10 and may only be impacted by a removable entity or a user input tool.

In some embodiments, as shown in FIGS. 8A-11, for example, ejectable component assembly 16 may include an ejector mechanism 250, which may be similar to ejector mechanism 50 of FIGS. 2A-2E, for at least partially ejecting tray 20 and/or module 30 from connector 40 and/or housing 18. Ejector mechanism 250 may include a user interface portion 252 and a tray interface portion 258. User interface portion 252 may extend between a first user interface portion end 251 and a second user interface portion end 253. Tray interface portion 258 may extend between a first tray interface portion end 257 and a second tray interface portion end 259. First end 251 of user interface portion 252 may be coupled to a fixed portion of device 10 (e.g., first end 251 may be coupled to a portion of housing 18 or another component of device 10 whose position may be fixed with respect to housing 18) and second end 259 of tray interface portion 258 may be coupled to another fixed portion of device 10 (e.g., second end 259 may be coupled to a portion of housing 18 or another component of device 10 whose position may be fixed with respect to housing 18), while second end 253 of user interface portion 252 may be coupled to first end 257 of tray interface portion 258.

Figure 8A:
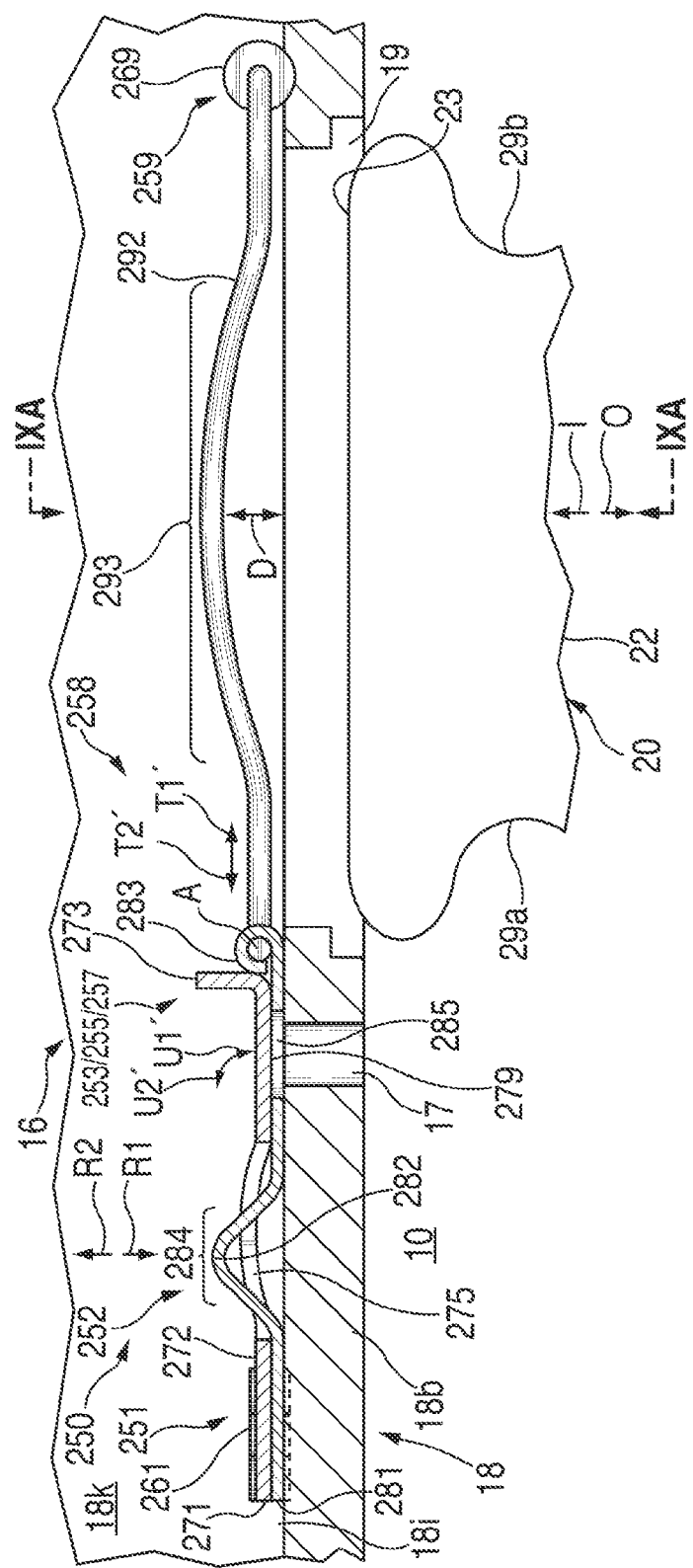
FIG. 8A is an elevational view of a portion of the electronic device of FIGS. 1-2E, similar to FIG. 2A, of a second alternative embodiment of a portion of the ejectable component assembly of FIGS. 1-2E, in a first stage of actuation, similar to FIG. 2A, in accordance with some embodiments of the invention.
Figure 8B:
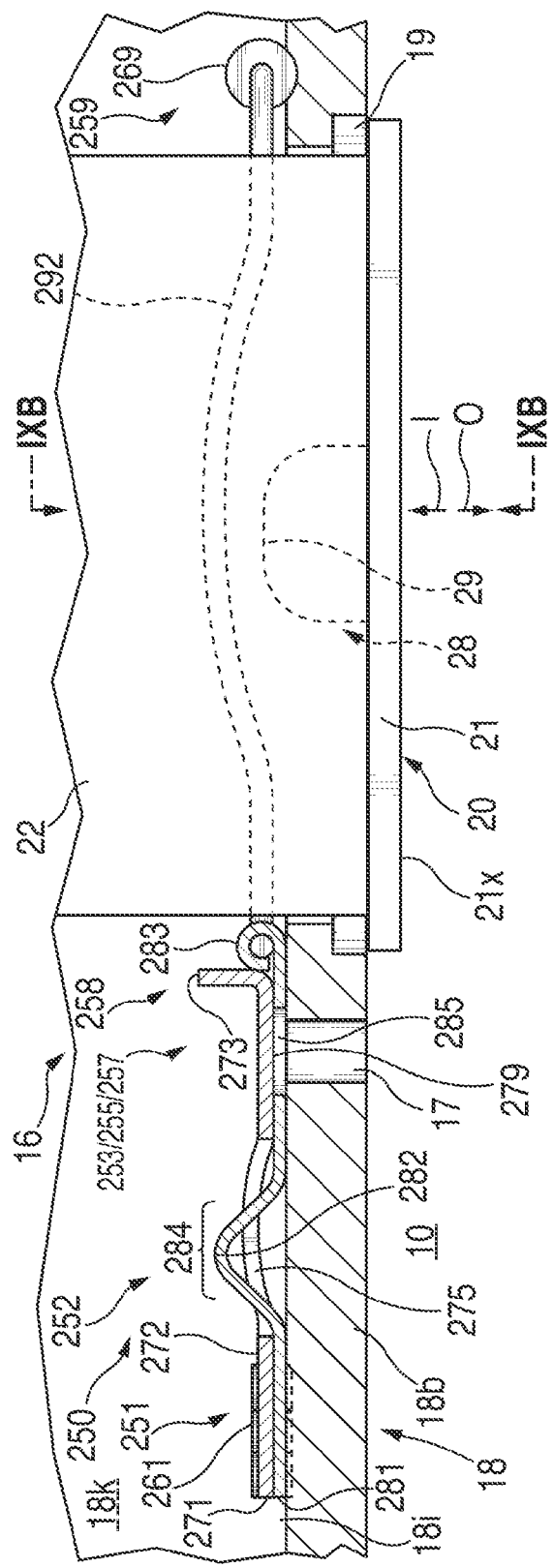
FIG. 8B is an elevational view of a portion of the electronic device of FIGS. 1-2E and 8A, similar to FIG. 2B, of the second alternative embodiment of the portion of the ejectable component assembly of FIG. 8A, in a second stage of actuation, similar to FIG. 2B, in accordance with some embodiments of the invention.
Figure 8C:
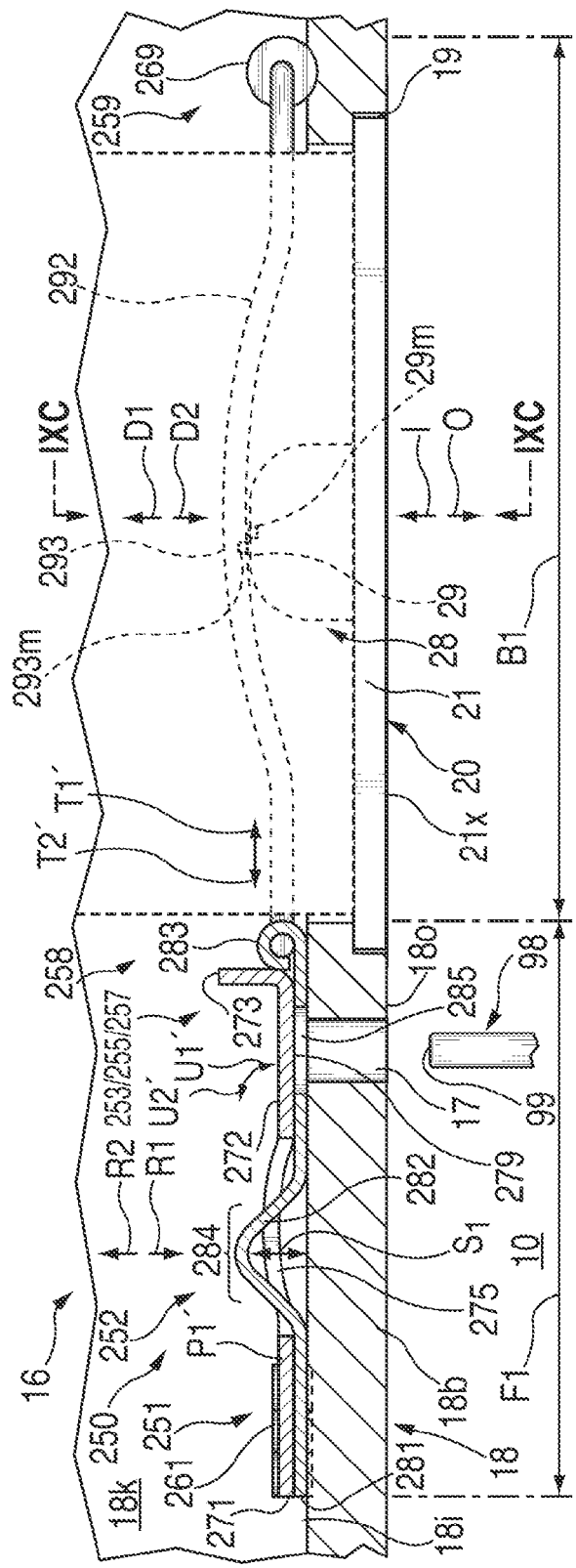
FIG. 8C is an elevational view of a portion of the electronic device of FIGS. 1-2E, 8A, and 8B, similar to FIG. 2C, of the second alternative embodiment of the portion of the ejectable component assembly of FIGS. 8A and 8B, in a third stage of actuation, similar to FIG. 2C, in accordance with some embodiments of the invention.
Figure 8D:
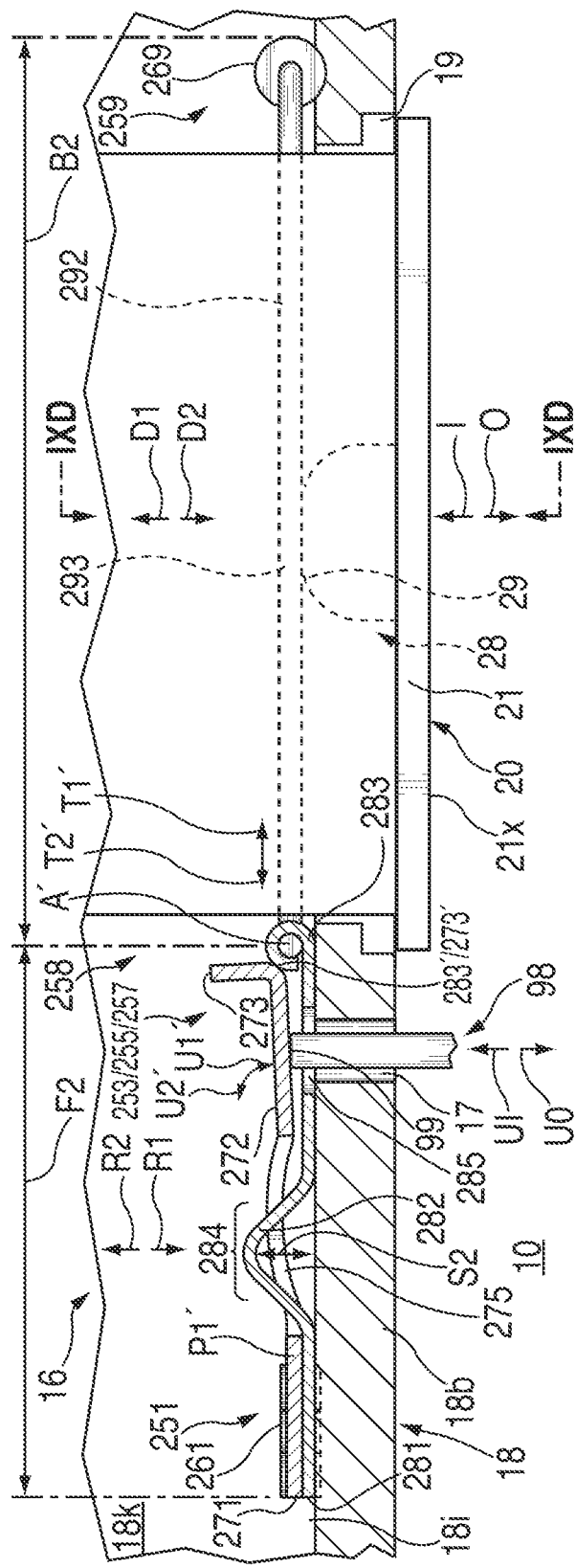
FIG. 8D is an elevational view of a portion of the electronic device of FIGS. 1-2E and 8A-8C, similar to FIG. 2D, of the second alternative embodiment of the portion of the ejectable component assembly of FIGS. 8A-8C, in a fourth stage of actuation, similar to FIG. 2D, in accordance with some embodiments of the invention.
Figure 8E:
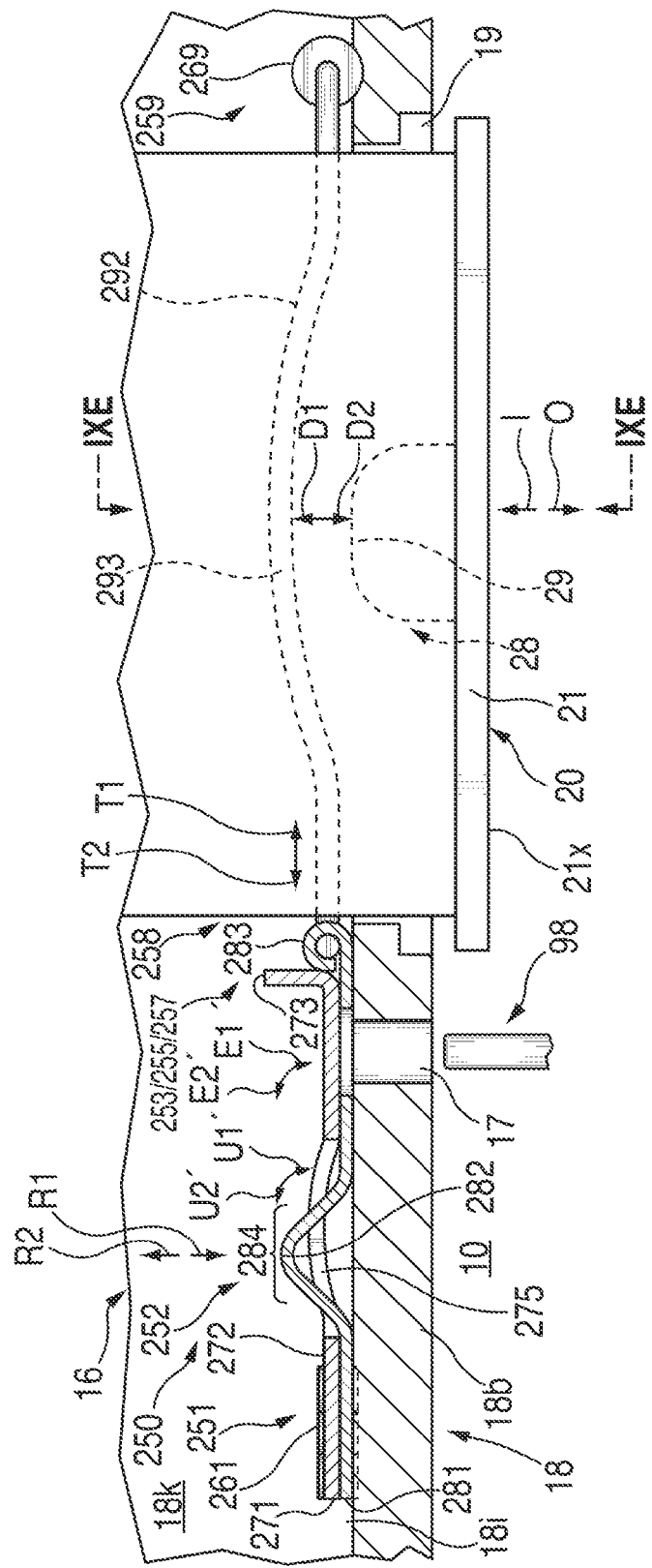
FIG. 8E is an elevational view of a portion of the electronic device of FIGS. 1-2E and 8A-8D, similar to FIG. 2E, of the second alternative embodiment of the portion of the ejectable component assembly of FIGS. 8A-8D, in a fifth stage of actuation, similar to FIG. 2E, in accordance with some embodiments of the invention.
Figure 9A:
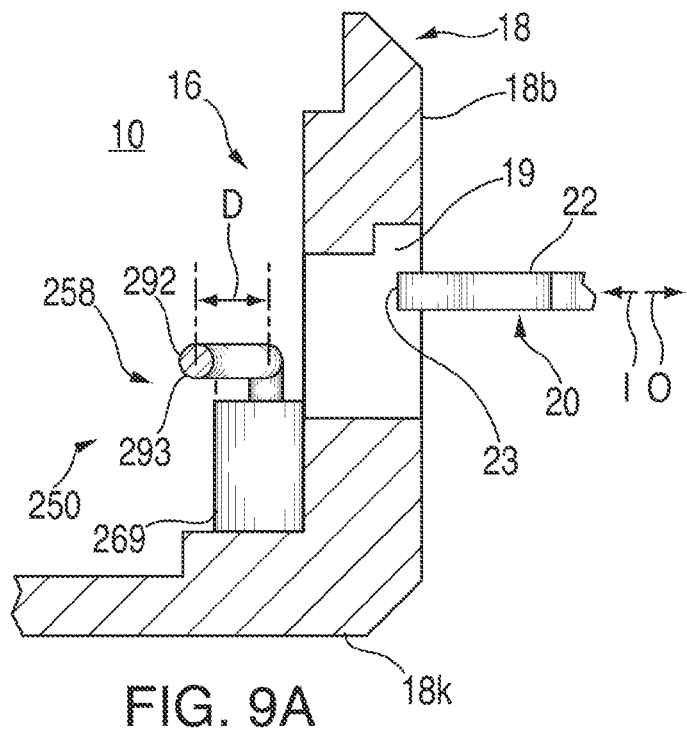
FIG. 9A is a cross-sectional view of the portion of the electronic device of FIGS. 1-2E and 8A-8E, taken from line IXA-IXA of FIG. 8A, in accordance with some embodiments of the invention.
Figure 9B:
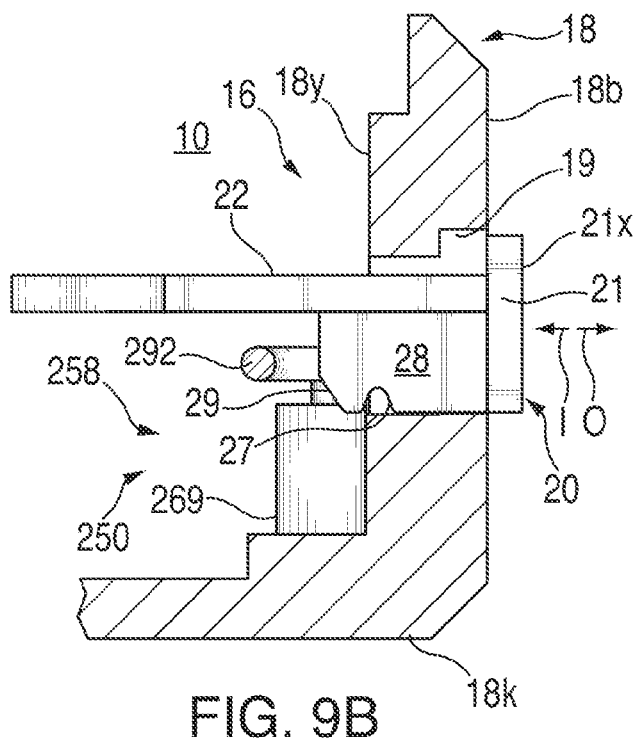
FIG. 9B is a cross-sectional view of the portion of the electronic device of FIGS. 1-2E and 8A-9A, taken from line IXB-IXB of FIG. 8B, in accordance with some embodiments of the invention.
Figure 9C:
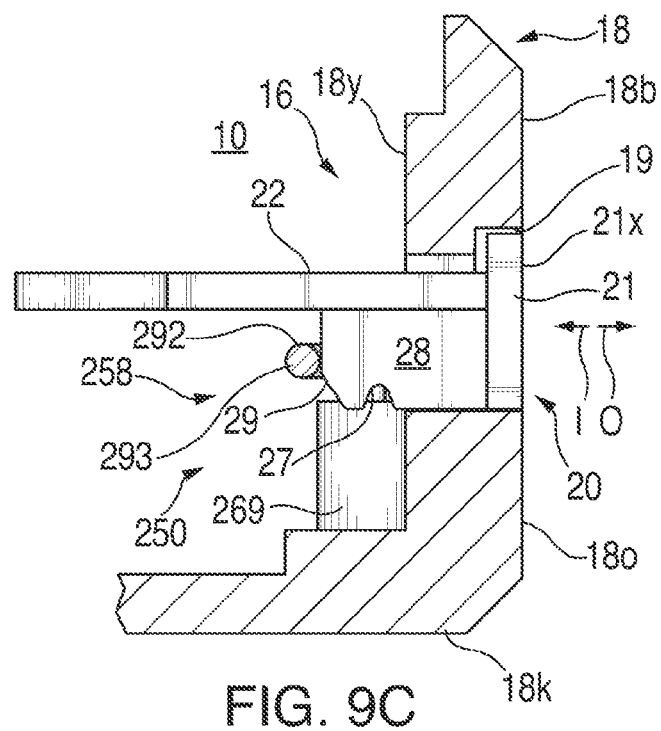
FIG. 9C is a cross-sectional view of the portion of the electronic device of FIGS. 1-2E and 8A-9B, taken from line IXC-IXC of FIG. 8C, in accordance with some embodiments of the invention.
Figure 9D:
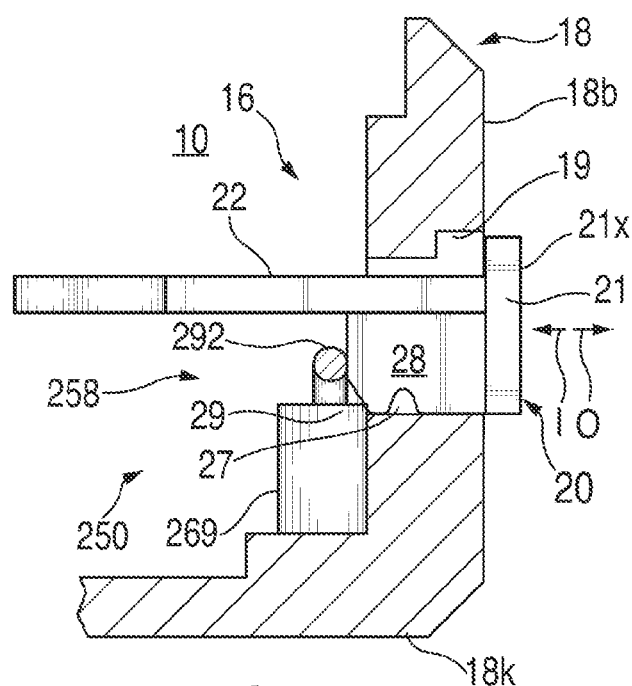
FIG. 9D is a cross-sectional view of the portion of the electronic device of FIGS. 1-2E and 8A-9C, taken from line IXD-IXD of FIG. 8D, in accordance with some embodiments of the invention.

As described above with respect to user interface portion 52 of ejector mechanism 50 of FIGS. 2A-2E, user interface portion 252 of ejector mechanism 250 may be any suitable unitary component or collection of suitable components that may be capable deflecting, deforming, bending, springing, pivoting, translating, rotating, moving, or otherwise changing between a first user interface state or position (e.g., as shown in FIGS. 8A, 8B, 8C, 8E, 9A, 9B, 9C, 9E, 10, and 11) and a second user interface state or position (e.g., as shown in FIGS. 8D and 9D). User interface portion 252 may be made of any suitable material, such as rubber, plastic, metal, or any suitable combinations thereof. In some embodiments, user interface portion 252 may be a single component made of any suitable material while, in other embodiments, user interface portion 252 may be several distinct components. Different portions of user interface portion 252 may be flexible or rigid. For example, a first portion of user interface portion 252 at or near first end 251 may be rigid (e.g., for coupling to a portion of housing 18), while another portion of user interface portion 252 may be flexible (e.g., for bending or deflecting from the first user interface state to the second user interface state).

Moreover, as described above with respect to tray interface portion 58 of ejector mechanism 50 of FIGS. 2A-2E, tray interface portion 258 of ejector mechanism 250 may be any suitable unitary component or collection of suitable components that may be capable of deflecting, deforming, bending, springing, pivoting, translating, rotating, moving, or otherwise changing between a first tray interface state or position (e.g., as shown in FIGS. 8A, 8B, 8C, 8E, 9A, 9B, 9C, 9E, 10, and 11) and a second tray interface state or position (e.g., as shown in FIGS. 8D and 9D). Tray interface portion 258 may be made of any suitable material, such as rubber, plastic, metal, or any suitable combinations thereof. In some embodiments, tray interface portion 258 may be a single component made of any suitable material while, in other embodiments, tray interface portion 258 may be several distinct components. Different portions of tray interface portion 258 may be flexible or rigid. For example, a first portion of tray interface portion 258 at or near second end 259 may be rigid (e.g., for coupling to a portion of housing 18), while another portion of tray interface portion 258 may be flexible (e.g., for bending or deflecting from the first tray interface state to the second tray interface state).

For example, as shown in FIGS. 8A-11, user interface portion 252 may include one or more user interface plates (e.g., a plate 272) and/or one or more user interface retraction mechanisms (e.g., a retraction mechanism 282). User interface portion 252 may extend between first user interface portion end 251 and second user interface portion end 253, and first end 251 may be fixed or otherwise coupled to inner surface 18i of wall 18b by one or more suitable mountings 261 (e.g., one or more welding or bonding locations, cladding, insert molding, screws, fasteners, rivets, hooks, tabs, holes, etc.). When user interface portion 252 is in its first user interface state (e.g., as shown in FIGS. 8A, 8B, 8C, 8E, 9A, 9B, 9C, 9E, 10, and 11), user interface portion 252 may extend against and along inner surface 18i of wall 18b from first end 251 towards second end 253. In this first user interface state, user interface portion 252 may extend across and block at least a portion of user interface opening 17 provided through inner surface 18i, such that user interface portion 252 may be configured to press against housing 18 about user interface opening 17 for preventing debris from entering into housing 18 through user interface opening 17 when user interface portion 252 is in its first user interface state.

Moreover, as shown in FIGS. 8A-11, tray interface portion 258 may include a beam (e.g., a beam 292) that may extend between first tray interface portion end 257 and second tray interface portion end 259, and second end 259 may be fixed or otherwise coupled to inner surface 18i of wall 18k by one or more suitable mountings 269 (e.g., one or more welding or bonding locations, cladding, insert molding, screws, fasteners, rivets, hooks, tabs, holes, etc.). When tray interface portion 258 is in its first tray interface state (e.g., as shown in FIGS. 8A, 8B, 8C, 8E, 9A, 9B, 9C, 9E, 10, and 11), tray interface portion 258 may extend across at least a portion of module housing opening 19 from second end 259 towards first end 257. In this first tray interface state, tray interface portion 258 may extend across at least a portion of module housing opening 19, such that tray interface portion 258 may interact with at least a portion of tray 20 when tray 20 is inserted through module housing opening 19 and into connector 40.

In some embodiments, first end 251 of user interface portion 252 and second end 259 of tray interface portion 258 may be fixed with respect to one another or be at least partially constrained with respect to one another. Each one of first end 251 and second end 259 may be fixed to or have its movement at least partially constrained by any portion of device 10 (e.g., housing 18, connector 40, etc.). First end 251 may be fixed to or have its movement at least partially constrained/restrained by a first portion of device 10 at a first location within housing 18 by mounting 261 and second end 259 may be fixed to or otherwise have its movement at least partially constrained/restrained by a second portion of device 10 at a second location within housing 18 by mounting 269.

First end 257 of tray interface portion 258 may be coupled to second end 253 of user interface portion 252 in any suitable manner using any suitable coupling 255. Coupling 255 may allow constrained relative motion between user interface portion 252 and tray interface portion 258, such that user interface portion 252 may change between its first and second user interface states when tray interface portion 258 may change between its first and second tray interface states, and vice versa. Therefore, coupling 255 may allow for ejector mechanism 250 to change between a first ejector mechanism state (e.g., when each one of user interface portion 252 and tray interface portion 258 is in its respective first state) and a second ejector mechanism state (e.g., when each one of user interface portion 252 and tray interface portion 258 is in its respective second state). For example, as shown in FIGS. 8A-11, coupling 255 formed between second end 253 of user interface portion 252 and first end 257 of tray interface portion 258 may be a hinge bearing, such that first end 257 and second end 253 may each relatively rotate about an axis A' of coupling 255 (see, e.g., axis A' of FIGS. 8A, 8D, and 11).

The tendency for ejector mechanism 250 to change between its first and second ejector mechanism states (e.g., the tendency for user interface portion 252 and tray interface portion 258 to change between their respective first and second states), may be defined by one or more material characteristics of user interface portion 252 and/or tray interface portion 258, by one or more characteristics of mounting 261 and/or mounting 269, and/or by one or more characteristics of coupling 255. For example, in some embodiments, the material characteristics of user interface portion 252 and the characteristics of mounting 261 may be such that, absent any external forces acting on user interface portion 252 (e.g., any user input force provided by user input tool 98 or any force provided by tray interface portion 258 via coupling 255), user interface portion 252 may not be biased to exist in one user interface state or the other. That is, if first user interface portion end 251 of a rigid user interface portion 252 is coupled to housing 18 using an unbiased free swinging hinge mounting 261, such a user interface portion 252 may have no tendency to move in either the direction of arrow U1' from its second user interface state to its first user interface state or in the direction of arrow U2' from its first user interface state to its second user interface state, absent being coupled via coupling 255 to a tray interface portion 258 having a tendency to move, respectively, in either the direction of arrow T1' from its second tray interface state to its first tray interface state or in the direction of arrow T2' from its first tray interface state to its second tray interface state (see, e.g., FIGS. 8D and 8E). Similarly, in other embodiments, the material characteristics of tray interface portion 258 and the characteristics of mounting 269 may be such that, absent any external forces acting on tray interface portion 258 (e.g., any tray input force provided by tray 20 or any force provided by user interface portion 252 via coupling 255), tray interface portion 258 may not be biased to exist in one tray interface state or the other. That is, if second tray interface portion end 259 of a rigid tray interface portion 258 is coupled to housing 18 using an unbiased free swinging hinge mounting 269, such a tray interface portion 258 may have no tendency to move in either the direction of arrow T1' from its second tray interface state to its first tray interface state or in the direction of arrow T2' from its first tray interface state to its second tray interface state, absent being coupled via coupling 255 to a user interface portion 252 having a tendency to move, respectively, in either the direction of arrow U1' from its second user interface state to its first user interface state or in the direction of arrow U2' from its first user interface state to its second user interface state. In yet other embodiments, user interface portion 252 and tray interface portion 258 may each be independently biased to exist in one of their two respective states, such that, when they are coupled via coupling 255, the tendency of ejector mechanism 250 to move in either the direction of arrow E1' from its second ejector mechanism state to its first ejector mechanism state or in the direction of arrow E2' from its first ejector mechanism state to its second ejector mechanism state may be based on the combination of the independent tendencies of user interface portion 252 and tray interface portion 258 to do so. Any suitable tension may exist between mountings 261 and 269 to bias user interface portion 252 and/or tray interface portion 258 such that ejector mechanism 250 may remain in a particular ejector mechanism state when an input force (e.g., a user input force and/or a tray input force) is not applied to ejector mechanism 150.

For example, as shown in FIGS. 8A and 9A, before any portion of tray 20 has been inserted into housing 18, before any user input force has been applied to user interface portion 252, and before any tray input force has been applied to tray interface portion 258, ejector mechanism 250 may be configured to be in its first ejector mechanism state. Therefore, as shown, when ejector mechanism 250 is in its first ejector mechanism state, user interface portion 252 may extend along inner surface 18i and across at least a portion of user interface opening 17, and tray interface portion 258 may extend across at least a portion of module housing opening 19. In this first ejector mechanism state, ejector mechanism 250 may be biased such that user interface portion 252 (e.g., plate 272) may exert a force in the direction of arrow U1' on housing 18 or on any other suitable portion of device 10, and/or such that tray interface portion 258 may exert a force in the direction of arrow T1' along housing 18 or on any other suitable portion of device 10. In other embodiments, neither user interface portion 252 nor tray interface portion 258 may be exerting any force in the directions of respective arrows U1' and T1' when ejector mechanism 250 is in its first ejector mechanism state.

Once tray 20 has been initially inserted through opening 19 and into housing 18 in the direction of arrow I to a certain extent, as shown in FIGS. 8B and 9B, for example, a portion of tray 20 may not interact with a portion of tray interface portion 258 such that tray interface portion 258 may remain in its first tray interface state. For example, as shown, when tray interface portion 258 is in its first tray interface state, a portion of tray interface portion 258 may be deflected away from opening 19 and, thus, away from end 23 of tray 20 as tray 20 is initially inserted through opening 19 and into housing 18. As shown in FIGS. 8A and 9A, for example, a deflectable portion 293 of beam 292 may be in a deflected state that may be deflected away from a substantially linear path of beam 292 by a deflected distance D when tray interface portion 258 is in its first tray interface state. This deflected state may prevent leading edge 29 of tray 20 from contacting beam 292 as tray 20 is initially inserted through opening 19 and into housing 18 in the direction of arrow I.

However, once tray 20 has been fully inserted into housing 18 in the direction of arrow I, such that tray 20 may be in its fully loaded position of FIGS. 8C and 9C, for example, tray interface portion 258 may be configured to contact a portion of tray 20 while remaining in its first tray interface state. For example, as shown, a portion of deflectable portion 293 of beam 292 of tray interface portion 258 may contact leading edge 29 of tray 20 once tray 20 reaches its fully loaded position (e.g., a position whereby retention members 42a and 42b may retain tray 20 in its fully loaded position). In some embodiments, such contact between tray interface portion 258 in its first tray interface state and tray 20 in its fully loaded position may be a passive contact (e.g., contact that may not reinforce itself via geometry or attraction (e.g., magnetic attraction)). In other embodiments, such contact between tray interface portion 258 in its first tray interface state and tray 20 in its fully loaded position may be an active contact (e.g., as shown in FIG. 8C, deflectable portion 293 of beam 292 and leading edge 29 of tray 20 may respectively comprise attractable magnets 293m and 29m, which may hold tray 20 in contact with beam 292). In such an active contact embodiment, tray interface portion 258 may be configured to hold tray 20 in its fully loaded position (e.g., without the aid of retention members 42a and 42b). In other embodiments, once tray 20 has been fully inserted into housing 18 in the direction of arrow I, such that tray 20 may be in its fully loaded position of FIGS. 8C and 9C, for example, tray interface portion 258 may be configured to remain in its first tray interface state but may not contact tray 20.

When retained in its fully loaded position of FIGS. 8C and 9C, outer surface 21x of outer tray end 21 of tray 20 may be substantially flush and/or continuous with an outer surface 18o of housing 18 about opening 19. In some embodiments, ejector mechanism 250 may be biased to remain in its first ejector mechanism state, such that ejector mechanism 250 may prevent tray 20 from being inserted further in the direction of arrow I. For example, deflectable portion 293 of beam 292 of tray interface portion 258 may be configured such that it is unable to be deflected further in the direction of arrow I (e.g., to increase deflected distance D), thereby preventing tray 20 from being inserted further in the direction of arrow I after initially contacting beam 292. Additionally or alternatively, a portion of housing 18 may interact with tray 20 to prevent tray 20 from being inserted further in the direction of arrow I. For example, as shown in FIG. 9C, housing 18 may include a housing key portion 18y that may be positioned within or adjacent an end of opening 19, such that housing key portion 18y may obstruct and prevent a portion of tray 20 (e.g., a portion of outer tray end 21) from being inserted further in the direction of arrow I. Ejector mechanism 250 may be configured such that housing key portion 18y may interact with tray 20 at about the same moment that tray interface portion 258 may contact tray 20. Moreover, housing key portion 18y may be positioned with respect to opening 19 such that tray 20 may not be inserted too far within opening 19 while tray 20 is upside down. For example, if tray 20 were attempted to be inserted into opening 19 in the direction of arrow I while bottom surface 25b of tray 20 was facing upwards (e.g., towards housing key portion 18y of FIG. 9B), then housing key portion 18y may be configured to obstruct and prevent ejector interface portion 28 from being inserted in the direction of arrow I beyond housing key portion 18y. Therefore, a user may be prevented from inserting tray 20 too far into opening 18 when tray 20 is upside down.

Once tray 20 is held in its functional or fully loaded position of FIGS. 8C and 9C, ejector mechanism 250 may be configured to receive a user input force, which may cause ejector mechanism 250 to change from its first ejector mechanism state to its second ejector mechanism state, which may at least partially eject tray 20 from device 10. For example, as shown in FIGS. 8D and 9D, first end 99 of user input tool 98 may be inserted through user interface opening 17 in housing 18 for applying a user input force in the direction of arrow UI onto a portion of user interface portion 252. When this user input force is applied onto user interface portion 252, user interface portion 252 may be configured to change from its first user interface state of FIGS. 8C and 9C to its second user interface state of FIGS. 8D and 9D. When user interface portion 252 changes from its first user interface state to its second user interface state, the change may cause tray interface portion 258 to change from its first tray interface state of FIGS. 8C and 9C to its second tray interface state of FIGS. 8D and 9D. This alteration of states by tray interface portion 258 may cause at least a portion of tray interface portion 258 to interact with tray 20 for at least partially ejecting tray 20 from device 10 in the direction of arrow O, as shown in FIGS. 8D and 9D.

For example, as shown, when tray interface portion 258 changes from its first tray interface state to its second tray interface state for at least partially ejecting tray 20, deflectable portion 293 of beam 292 of tray interface portion 258 may change from its deflected state to an undeflected or straight state (e.g., by reducing or eliminating deflected distance D). This movement of deflectable portion 293 of beam 292 of tray interface portion 258 from its deflected state to its undeflected state in the direction of arrow D2, when tray interface portion 258 changes from its first tray interface state to its second tray interface state, may push leading edge 29 of tray 20 in the direction of arrow D2 for at least partially ejecting tray 20 from device 10 in the direction of arrow O. As shown in FIGS. 8D and 9D, for example, device 10 may be configured such that, when tray interface portion 258 does change to its second tray interface state, ejector mechanism 250 may no longer retain tray 20 in its fully loaded position. For example, the force that may be applied by beam 292 onto tray 20 in the direction of arrow D2 may be great enough to overcome any other retaining force that device 10 may use to retain tray 20 in its fully loaded position (e.g., any retention force that may be applied by retention members 42a and 42b). Moreover, when contact between tray interface portion 258 and tray 20 may be configured to be an active contact, such an active contact may be terminated when tray interface portion 258 changes to its second tray interface state. For example, when tray interface portion 258 changes to its second tray interface state (e.g., when deflectable portion 293 of beam 292 may change from its deflected state to its undeflected state), at least one of attractable magnets 293m and 29m may be weakened such that any active contact created by attractable magnets 293m and 29m may be terminated or overcome. This may allow tray 20 to be more easily removed from device 10.

Then, once tray interface portion 258 is in its second tray interface state of FIGS. 8D and 9D, and once the application of the user input force on user interface portion 252 is terminated, ejector mechanism 250 may be configured to return from its second ejector mechanism state to its first ejector mechanism state. For example, when first end 99 of user input tool 98 is at least partially withdrawn through user interface opening 17 in the direction of arrow UO for terminating the application of a user input force on a portion of user interface portion 252 (e.g., on cosmetic surface portion 279 of plate 272), user interface portion 252 may be configured to return from its second user interface state of FIGS. 8D and 9D to its first user interface state of FIGS. 8E and 9E. This change of user interface portion 252 from its second user interface state to its first user interface state may cause tray interface portion 258 to change from its second tray interface state of FIGS. 8D and 9D to its first tray interface state of FIGS. 8E and 9E and, thus, may cause deflectable portion 293 of beam 292 of tray interface portion 258 to move in the direction of arrow D1 from its undeflected state of FIGS. 8D and 9D to its deflected state of FIGS. 8E and 9E.

Therefore, ejector mechanism 250 of FIGS. 8A-11 may be configured to change between a first ejector mechanism state (e.g., an ejector mechanism state that may include a first user interface state and a first tray interface state) and a second ejector mechanism state (e.g., an ejector mechanism state that may include a second user interface state and a second tray interface state), such that ejector mechanism 250 may receive, retain, and/or eject tray 20 and/or removable module 30. For example, user interface portion 252 may be configured to change from the first user interface state to the second user interface state when a user input force is applied by a user onto user interface portion 252 (e.g., as shown in FIGS. 8D and 9D). User interface portion 252 may also be configured to change from the second user interface state to the first user interface state when the application of a user input force onto user interface portion 252 is terminated (e.g., as shown in FIGS. 8E and 9E). Moreover, tray interface portion 258 may be configured to change from the first tray interface state to the second tray interface state in response to user interface portion 252 changing from the first user interface state to the second user interface state (e.g., as shown in FIGS. 8D and 9D). Tray interface portion 258 may also be configured to change from the second tray interface state to the first tray interface state in response to user interface portion 252 changing from the second user interface state to the first user interface state (e.g., as shown in FIGS. 8E and 9E). In some embodiments, in response to user interface portion 252 receiving a user input force and thereby changing from the first user interface state to the second user interface state, the resultant change of tray interface portion 258 from the first tray interface state to the second tray interface state may cause tray interface portion 258 to at least partially eject tray 20 from connector 40 and/or opening 19 (e.g., as shown in FIGS. 8D and 9D).

As shown in FIGS. 8A-11, for example, user interface portion 252 may include a user interface plate 272 that may extend between a first end 271 and a second end 273. First end 271 of user interface plate 272 may be fixed or otherwise coupled to housing 18 by at least one mounting component 261 (e.g., at least one weld or other suitable bonding element). Moreover, as shown in FIGS. 8A-11, for example, user interface portion 252 may alternatively or additionally include a user interface retraction mechanism 282 that may extend between a first end 281 and a second end 283. First end 281 of user interface retraction mechanism 282 may be fixed or otherwise coupled to housing 18 by at least one mounting component 261 (e.g., at least one weld or other suitable bonding element).

For example, as shown, first end 281 of user interface retraction mechanism 282 may be fixed or otherwise coupled to inner surface 18i of wall 18b, such that, when user interface portion 252 is in its first user interface state (e.g., as shown in FIGS. 8A-8C, 8E, 9A-9C, 9E, 10, and 11), user interface retraction mechanism 282 may extend against and along inner surface 18i of wall 18b towards second end 283. In this first user interface state, user interface retraction mechanism 282 may extend about and beyond at least a portion of user interface opening 17 provided through inner surface 18i. For example, retraction mechanism 282 may include an opening 285 through retraction mechanism 282 that may align with at least a portion of user interface opening 17 when user interface portion 252 is in its first user interface state. Moreover, as shown, first end 271 of user interface plate 272 may be fixed or otherwise coupled to first end 281 of retraction mechanism 282 and/or to inner surface 18i of wall 18b, such that, when user interface portion 252 is in its first user interface state (e.g., as shown in FIGS. 8A-8C, 8E, 9A-9C, 9E, 10, and 11), user interface plate 272 may extend against and along retraction mechanism 282 towards second end 273. In this first user interface state, user interface plate 272 may extend across opening 285 of retraction mechanism 282, such that user interface portion 252 may be configured to press against housing 18 about user interface opening 17 for preventing debris from entering into housing 18 through user interface opening 17 when user interface portion 252 is in its first user interface state. For example, when user interface portion 252 is in its first user interface state, plate 272 may be configured to press against retraction mechanism 282 in the direction of arrow U1', such that retraction mechanism 282 may be held against inner surface 18i of wall 18b, and such that cosmetic surface portion 279 of plate 272 may cover opening 285 and, thus, opening 17 for preventing debris from entering into housing 18 through user interface opening 17 when user interface portion 252 is in its first user interface state. In some embodiments, at least a portion of retraction mechanism 282 (e.g., a portion about opening 285) may be biased against inner surface 18i of wall 18b in both the first and second user interface states of user interface portion 252.

In some embodiments, retraction mechanism 282 may include a flexible portion 284 that may relax and retract. For example, flexible portion 284 may be any suitable portion of retraction mechanism 282 that may be configured to bend or otherwise flex to alter a flexible distance between first end 281 and second end 283 of retraction mechanism 282 when user interface portion 252 changes between first and second user interface states (e.g., from a flexible distance F1 of FIG. 8C to a flexible distance F2 of FIG. 8D). In some embodiments, flexible portion 284 may allow retraction mechanism 282 to act as a retraction spring. In some embodiments, flexible portion 284 may be an elastomer or any other suitable material or combination of materials. As shown, plate 272 may include an opening 275 through plate 272 that may be aligned with flexible portion 284, such that flexible portion 284 may extend through opening 275 and away from inner surface 18i of wall 18b for flexing.

Second end 283 of retraction mechanism 282 may be coupled to first end 257 of tray interface portion 258 (e.g., to a first end of beam 292) via coupling 255. In some embodiments, when ejector mechanism is in the first ejector mechanism state of FIG. 8C, at least one of beam 292 and retraction mechanism 282 may be biased or otherwise configured to change the distance between its two ends. For example, when ejector mechanism 250 is in the first ejector mechanism state of FIG. 8C, beam 292 of tray interface portion 258 may be biased to extend first end 257 in the direction of arrow T2' away from fixed second end 259 (e.g., to extend the distance between the ends of beam 192 from distance B1 of FIG. 8C to distance B2 of FIG. 8D), such that tray interface portion 258 may change from its first tray interface state to its second tray interface state. As shown, this extension of the distance between the ends of beam 292 from distance B1 of FIG. 8C to distance B2 of FIG. 8D may reduce or eliminate deflected distance D of beam 292, which may move deflectable portion 293 of beam 292 of tray interface portion 258 in the direction of arrow D2 from its deflected state of FIG. 8C to its undeflected state of FIG. 8D. Alternatively or additionally, when ejector mechanism 250 is in the first ejector mechanism state of FIG. 8C, retraction mechanism 282 of user interface portion 252 may be biased to retract second end 283 in the direction of arrow T2' towards fixed first end 281 (e.g., to retract the distance between the ends of retraction mechanism 282 from distance F1 of FIG. 8C to distance F2 of FIG. 8D), such that user interface portion 252 may change from its first user interface state to its second user interface state. As shown, this retraction of the distance between the ends of retraction mechanism 282 from distance F1 of FIG. 8C to distance F2 of FIG. 8D may increase the size of flexible portion 284 that may retract through opening 275 of plate 272 from a first a retracted size S1 to a second retracted size S2, which may move flexible portion 284 of retraction mechanism 282 of user interface portion 252 in the direction of arrow R2 from an expanded state of FIG. 8C to a retracted state of FIG. 8D.

In some embodiments, for example, ejector mechanism 250 may be configured such that the extension of the distance between the ends of beam 292 from distance B1 of FIG. 8C to distance B2 of FIG. 8D may extend end 257 of beam 292 from end 259 by an additional distance of about 0.15 millimeters to about 0.35 millimeters. Likewise, ejector mechanism 250 may be configured such that the retraction of the distance between the ends of retraction mechanism 282 from distance F1 of FIG. 8C to distance F2 of FIG. 8D may retract end 283 of retraction mechanism 282 closer to end 281 by a retraction distance of about 0.15 millimeters to about 0.35 millimeters.

User interface plate 272 may be configured to interact with retraction mechanism 282, coupling 255, and/or tray interface portion 258, such that, when user interface portion 252 is in the first user interface state of FIG. 8C, user interface plate 272 may prevent retraction mechanism 282 from retracting second end 283 in the direction of arrow T2' towards fixed first end 281 (e.g., from retracting the distance between the ends of retraction mechanism 282 from distance F1 of FIG. 8C to distance F2 of FIG. 8D) and, thus, may prevent beam 292 of tray interface portion 258 from extending first end 257 in the direction of arrow T2' away from fixed second end 259 (e.g., from extending the distance between the ends of beam 192 from distance B1 of FIG. 8C to distance B2 of FIG. 8D). For example, as shown in FIG. 8C, when user interface portion 252 is in the first user interface state, second end 273 of user interface plate 272 may be biased to exert a force in the direction of arrow U1' on retraction mechanism 282, which may hold at least a portion of retraction mechanism 282 (e.g., the portion of retraction mechanism 282 adjacent second end 283 and coupling 255) against inner surface 18i of wall 18b.

However, as shown in FIG. 8D, when user interface portion 252 changes from the first user interface state to the second user interface state (e.g., when first end 99 of user input tool 98 is inserted through user interface opening 17 in housing 18 and through opening 285 of retraction mechanism 282 for applying a user input force in the direction of arrow UI onto cosmetic surface portion 279 of plate 272), user interface plate 272 may pivot about pivot point P1' in the direction of arrow U2'. When plate 272 pivots in the direction of arrow U2', second end 273 of plate 272 may be removed from a portion of the path along which retraction mechanism 282 may be biased to retract second end 283 in the direction of arrow T2' towards fixed first end 281 (e.g., to retract the distance between the ends of retraction mechanism 282 from distance F1 of FIG. 8C to distance F2 of FIG. 8D) and, thus, from a portion of the path along which beam 292 of tray interface portion 258 may be biased to extend first end 257 in the direction of arrow T2' away from fixed second end 259 (e.g., to extend the distance between the ends of beam 192 from distance B1 of FIG. 8C to distance B2 of FIG. 8D). Therefore, when user interface portion 252 changes to the second user interface state (e.g., when user input tool 98 applies a user input force in the direction of arrow UI onto plate 272), user interface plate 272 may be pushed out of a travel path of retraction mechanism 282 that may actively straighten a portion of beam 292 and/or that may allow a portion of beam 292 to straighten, thereby at least partially ejecting tray 20 from device 10 in the direction of arrow O.

Additionally or alternatively, when user interface portion 252 changes from the second user interface state of FIG. 8D to the first user interface state of FIG. 8E (e.g., when first end 99 of user input tool 98 is at least partially withdrawn through openings 285 and 17 in the direction of arrow UO for terminating the application of a user input force on cosmetic surface portion 279 of plate 272), user interface plate 272 may be biased to pivot about pivot point P1' in the direction of arrow U1'. When plate 272 pivots in the direction of arrow U1', second end 273 of plate 272 may exert a force in the direction of arrow T1' on a portion of retraction mechanism 282 (e.g., second end 283) and/or on a portion of tray interface portion 258 (e.g., first end 257 of beam 292) and/or on a portion of coupling 255. Therefore, when user interface portion 252 changes to the first user interface state (e.g., when an application of a user input force by user input tool 98 in the direction of arrow UI onto plate 272 is terminated), a portion of user interface plate 272 may be inserted into a travel path that may expand retraction mechanism 282 and that may deflect a portion of beam 292. As shown, this expansion of retraction mechanism 282 may extend the distance between the ends of retraction mechanism 282 from distance F2 of FIG. 8D to distance F1 and, thus, may decrease the size of flexible portion 284 that may retract through opening 275 of plate 272 from second retracted size S2 to first retracted size S1, which may move flexible portion 284 of retraction mechanism 282 of user interface portion 252 in the direction of arrow R1 from a retracted of FIG. 8D to an expanded state of FIG. 8E.

The geometry of second end 273 of user interface plate 272 and the geometry of at least one of second end 283 of retraction mechanism 282, coupling 255, and first send 257 of beam 292 may be configured such that they may smoothly interact with one another for inserting second end 273 into and removing second end 273 from a portion of the path along which retraction mechanism 282 may expand and retract. For example, as shown, a curved portion 273' of second end 273 of user interface plate 272 may interact with a curved portion 283' of second end 283 of retraction mechanism 282 when user interface portion 252 changes between first and second user interface states.

Figure 9E:
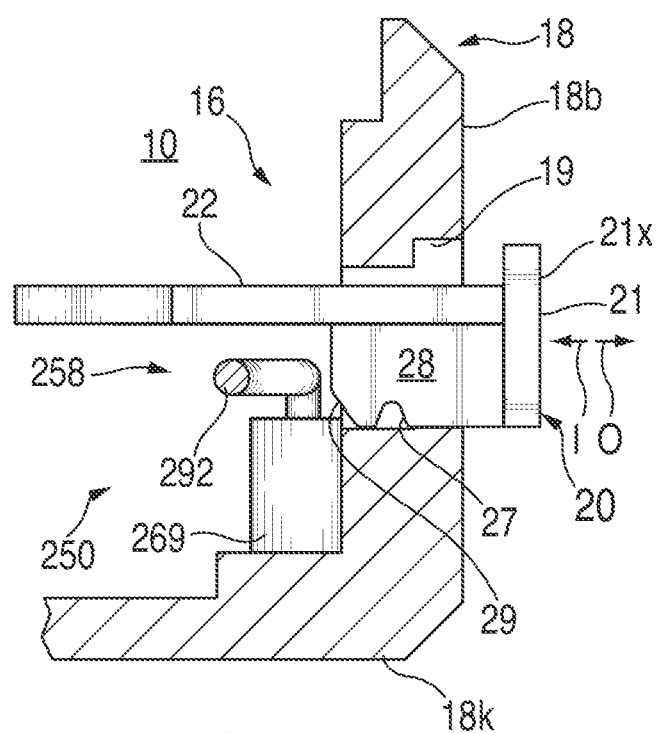
FIG. 9E is a cross-sectional view of the portion of the electronic device of FIGS. 1-2E and 8A-9D, taken from line IXE-IXE of FIG. 8E, in accordance with some embodiments of the invention.

Although ejector mechanism 250 may have been described with respect to FIGS. 8A-11 as being configured to change from its second ejector mechanism state of FIGS. 8D and 9D to its first ejector mechanism state of FIGS. 8E and 9E once application of a user input force by user input tool 98 in the direction of arrow UI onto plate 272 is terminated, ejector mechanism 250 may alternatively be configured to remain in its second ejector mechanism state until tray 20 is re-inserted into device 10. For example, rather than being in its first ejector mechanism state during initial insertion of tray 20 (e.g., as shown in FIGS. 8B and 9B), ejector mechanism 250 may be configured to be in its second ejector mechanism state of FIGS. 8D and 9D during the initial insertion stage of tray 20 depicted in FIGS. 8B and 9B (e.g., the second ejector mechanism state of ejector mechanism 250 may be the ejector mechanism state for initial insertion of tray 20 into device 10). This may be done, for example, by configuring the bias of tray interface portion 258 and/or the bias of retraction mechanism 282 towards the second ejector mechanism state to be greater than the bias of user interface plate 272 towards the first ejector mechanism state. Therefore, for example, tray interface portion 258 may be relaxed when in its second state and held taut in its first state. In such embodiments, when tray 20 is initially inserted through opening 19 in the direction of arrow I, leading edge 29 of tray 20 may initially make contact with beam 292 while beam 292 is in its undeflected or straight state (e.g., while tray interface portion 258 is in its second tray interface state of FIGS. 8D and 9D). Once this initial contact has been made, tray 20 may apply a tray input force in the direction of arrow I onto tray interface portion 258 as tray 20 is further inserted into device 10, which may cause tray interface portion 258 to change from its second tray interface state to its first tray interface state. For example, this tray input force may be applied in the direction of arrow I by leading edge 29 of tray 20 onto deflectable portion 293 of beam 292 of tray interface portion 258, which may cause deflectable portion 293 to move in the direction of arrow D1 from its undeflected state of FIGS. 8D and 9D to its deflected state of FIGS. 8C and 9C, such that tray 20 may be held in its fully loaded position as described above.

As mentioned, the tendency for ejector mechanism 250 to change between its first and second ejector mechanism states (e.g., the tendency for user interface portion 252 and tray interface portion 258 to change between their respective first and second states), may be defined by one or more material characteristics of user interface portion 252 and/or tray interface portion 258, by one or more characteristics of mounting 261 and/or mounting 269, and/or by one or more characteristics of coupling 255. For example, in some embodiments, the characteristics of mounting 261 and the characteristics of user interface plate 272 may be such that user interface plate 272 may be biased to remain in the first user interface state absent any external forces acting on user interface plate 272 (e.g., any user input force provided by user input tool 98 or any force provided by tray interface portion 258 via coupling 255 and/or retraction mechanism 282). For example, plate 272 may be a spring plate that may be biased to pivot about point P1 in the direction of arrow U1' towards retraction mechanism 282. Such a spring bias may also force retraction mechanism 282 and beam 292 in the direction of arrow T1', such that ejector mechanism 250 may tend to be in its first ejector mechanism state. Alternatively, in some embodiments, the characteristics of mounting 269 and the characteristics of beam 292 may be such that tray interface portion 258 may be biased to remain in the second tray interface state absent any external forces acting on tray interface portion 258 (e.g., any tray input force provided by tray 20 or any force provided by user interface plate 272 via coupling 255 and/or retraction mechanism 282). For example, beam 292 may be a deflectable beam that may be biased to straighten and expand the distance of end 257 from end 259 in the direction of arrow T2'. Such a straightening bias (e.g., a relaxed position, a straight static beam without deflection, a straightening tendency of a non-formed beam, etc.) may also force end 273 of user interface plate 272 in the direction of arrow U2', such that ejector mechanism 250 may tend to be in its second ejector mechanism state. In yet other embodiments, beam 292, retraction mechanism 282, and plate 272 may each be independently biased to exist in one of their two respective states, such that, when they are coupled via coupling 255, the tendency of ejector mechanism 250 to move from its second ejector mechanism state to its first ejector mechanism state or from its first ejector mechanism state to its second ejector mechanism state may be based on the combination of the independent tendencies of beam 292, retraction mechanism 282, and plate 272 to do so. Any suitable tension may exist between mountings 261 and 269 (e.g., between ends 251 and 259) to bias user interface portion 252 and/or tray interface portion 258 such that ejector mechanism 250 may remain in a particular ejector mechanism state when an input force (e.g., a user input force and/or a tray input force) is not applied to ejector mechanism 250. For example, in some embodiments, when ejector mechanism 250 is in its first ejector mechanism state, at least one of user interface portion 252 and tray interface portion 258 may be relaxed in its first state, and when ejector mechanism 250 is in its second ejector mechanism state, at least one of user interface portion 252 and tray interface portion 258 may be pulled taut in its second state. By changing from a state of tautness to a state of relaxation (e.g., from a taut state having a first stress to a relaxed state having a second stress that may be lower than the first stress), tray interface portion 258 may impart an ejection force onto tray 20. As another example, in some embodiments, when ejector mechanism 250 is in its first ejector mechanism state, at least one of user interface portion 252 and tray interface portion 258 may be held taut in its first state, and when ejector mechanism 250 is in its second ejector mechanism state, at least one of user interface portion 252 and tray interface portion 258 may be relaxed in its second state. By changing from a state of relaxation to a state of tautness (e.g., from a relaxed state having a first stress to a taut state having a second stress that may be greater than the first stress), tray interface portion 258 may impart an ejection force onto tray 20.

In some embodiments, first end 251 of user interface portion 252 may be the only portion of user interface portion 252 that is coupled to any portion of housing 18, connector 40, or any other portion of device 10 other than tray interface portion 258. Similarly, in some embodiments, second end 259 of tray interface portion 258 may be the only portion of tray interface portion 258 that is coupled to any portion of housing 18, connector 40, or any other portion of device 10 other than user interface portion 252. That is, besides ends 251 and 259, which may be distinct with tension therebetween, no other portion of ejector mechanism 250 may be coupled to any other portion of device 10. Coupling 255 and ends 253 and 257 may be free from any other components of device 10 and may only be impacted by a removable entity or a user input tool.

In some embodiments, as shown in FIGS. 12A-14, for example, ejectable component assembly 16 may include an ejector mechanism 350, which may be similar to ejector mechanism 50 of FIGS. 2A-2E, for at least partially ejecting tray 20 and/or module 30 from connector 40 and/or housing 18. Ejector mechanism 350 may include a user interface portion 352 and a tray interface portion 358. User interface portion 352 may extend between a first user interface portion end 351 and a second user interface portion end 353. Tray interface portion 358 may extend between a first tray interface portion end 357 and a second tray interface portion end 359. First end 351 of user interface portion 352 may be coupled to a fixed portion of device 10 (e.g., first end 351 may be coupled to a portion of housing 18 or another component of device 10 whose position may be fixed with respect to housing 18) and second end 359 of tray interface portion 358 may be coupled to another fixed portion of device 10 (e.g., second end 359 may be coupled to a portion of housing 18 or another component of device 10 whose position may be fixed with respect to housing 18), while second end 353 of user interface portion 352 may be coupled to first end 357 of tray interface portion 358.

Figure 12E:
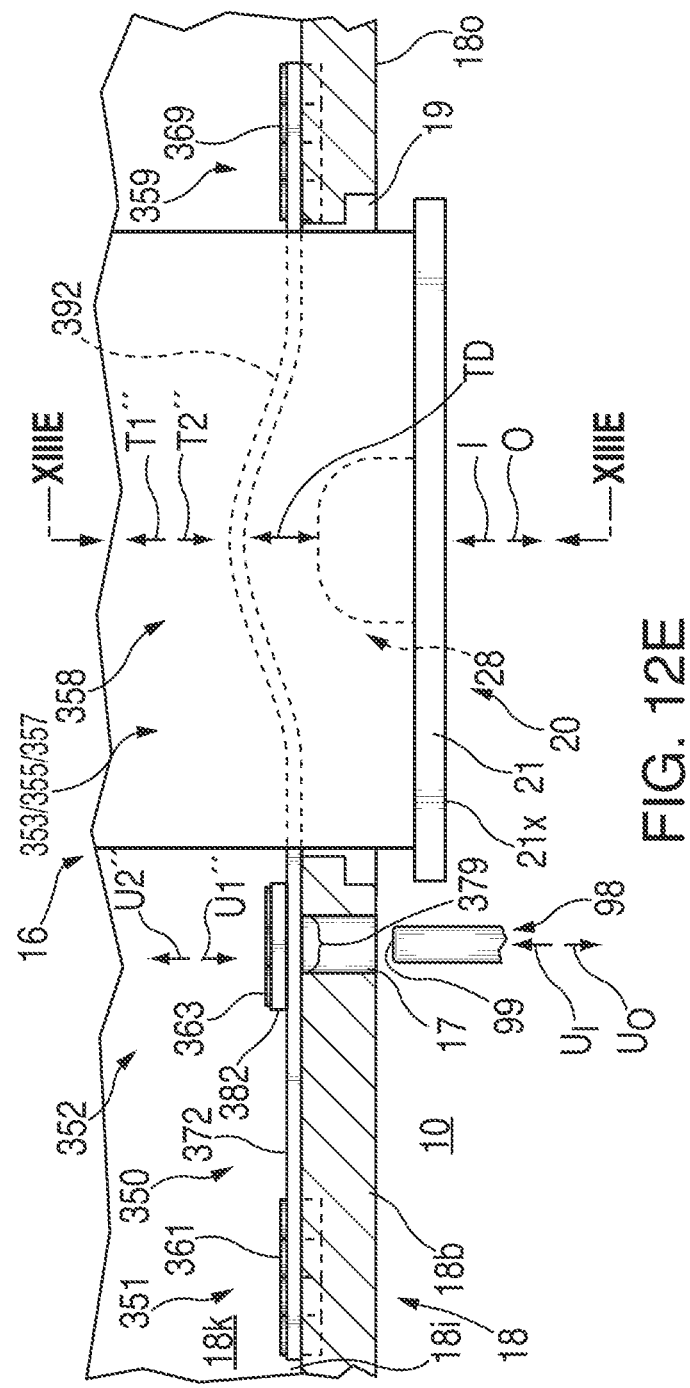
FIG. 12E is an elevational view of a portion of the electronic device of FIGS. 1-2E and 12A-12D, similar to FIG. 2E, of the third alternative embodiment of the portion of the ejectable component assembly of FIGS. 12A-12D, in a fifth stage of actuation, similar to FIG. 2E, in accordance with some embodiments of the invention.
Figure 13A:
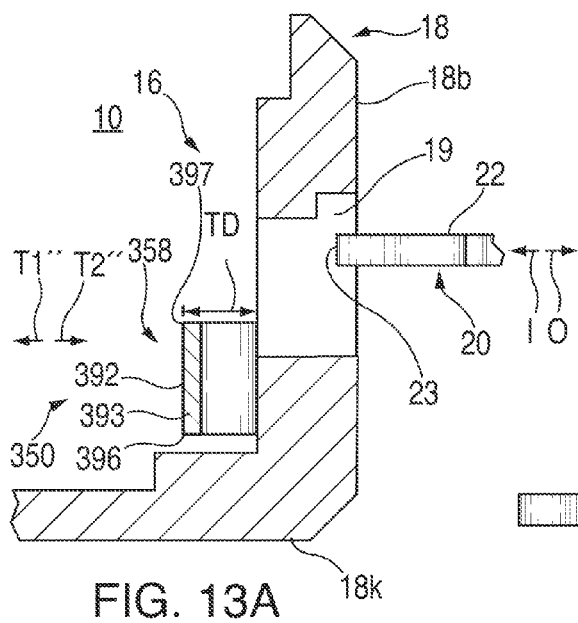
FIG. 13A is a cross-sectional view of the portion of the electronic device of FIGS. 1-2E and 12A-12E, taken from line XIIIA-XIIIA of FIG. 12A, in accordance with some embodiments of the invention.
Figure 13B:
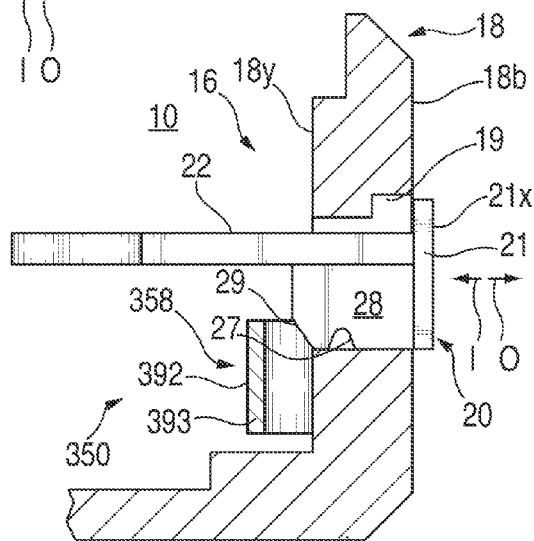
FIG. 13B is a cross-sectional view of the portion of the electronic device of FIGS. 1-2E and 12A-13A, taken from line XIIIB-XIIIB of FIG. 12B, in accordance with some embodiments of the invention.
Figure 13C:
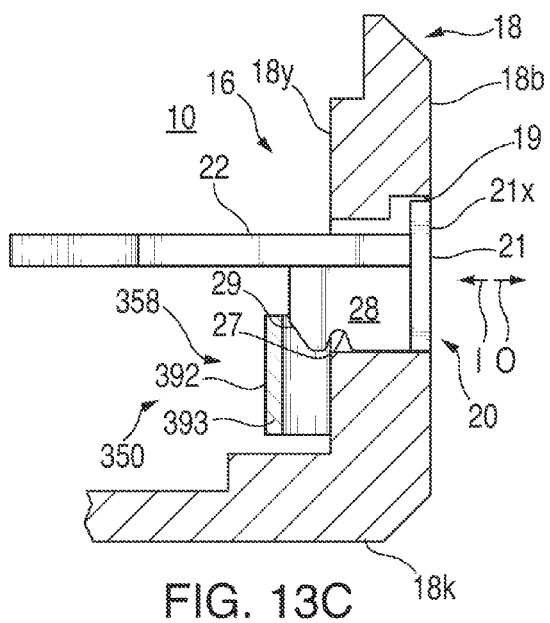
FIG. 13C is a cross-sectional view of the portion of the electronic device of FIGS. 1-2E and 12A-13B, taken from line XIIIC-XIIIC of FIG. 12C, in accordance with some embodiments of the invention.
Figure 13D:
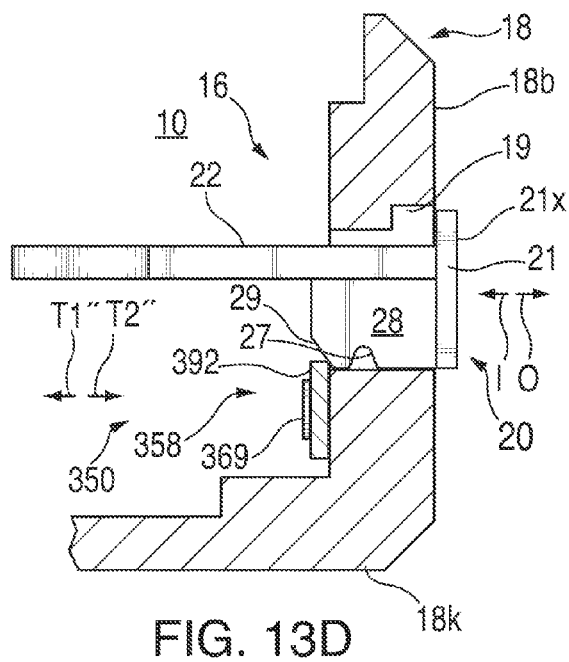
FIG. 13D is a cross-sectional view of the portion of the electronic device of FIGS. 1-2E and 12A-13C, taken from line XIIID-XIIID of FIG. 12D, in accordance with some embodiments of the invention.

As described above with respect to user interface portion 52 of ejector mechanism 50 of FIGS. 2A-2E, user interface portion 352 of ejector mechanism 350 may be any suitable unitary component or collection of suitable components that may be capable deflecting, deforming, bending, springing, pivoting, translating, rotating, moving, or otherwise changing between a first user interface state or position (e.g., as shown in FIGS. 12A-12C, 12E, 13A-13C, 13E, and 14) and a second user interface state or position (e.g., as shown in FIGS. 12D and 13D). User interface portion 352 may be made of any suitable material, such as rubber, plastic, metal, or any suitable combinations thereof. In some embodiments, user interface portion 352 may be a single component made of any suitable material while, in other embodiments, user interface portion 352 may be several distinct components. Different portions of user interface portion 352 may be flexible or rigid. For example, a first portion of user interface portion 352 at or near first end 351 may be rigid (e.g., for coupling to a portion of housing 18), while another portion of user interface portion 352 may be flexible (e.g., for bending or deflecting from the first user interface state to the second user interface state).

Moreover, as described above with respect to tray interface portion 58 of ejector mechanism 50 of FIGS. 2A-2E, tray interface portion 358 of ejector mechanism 350 may be any suitable unitary component or collection of suitable components that may be capable of deflecting, deforming, bending, springing, pivoting, translating, rotating, moving, or otherwise changing between a first tray interface state or position (e.g., as shown in FIGS. 12A-12C, 12E, 13A-13C, 13E, and 14) and a second tray interface state or position (e.g., as shown in FIGS. 12D and 13D). Tray interface portion 358 may be made of any suitable material, such as rubber, plastic, metal, or any suitable combinations thereof. In some embodiments, tray interface portion 358 may be a single component made of any suitable material while, in other embodiments, tray interface portion 358 may be several distinct components. Different portions of tray interface portion 358 may be flexible or rigid. For example, a first portion of tray interface portion 358 at or near second end 359 may be rigid (e.g., for coupling to a portion of housing 18), while another portion of tray interface portion 358 may be flexible (e.g., for bending or deflecting from the first tray interface state to the second tray interface state).

For example, as shown in FIGS. 12A-14, user interface portion 352 may include one or more user interface plates (e.g., a user interface plate 372). User interface portion 352 may extend between first user interface portion end 351 and second user interface portion end 353, and first end 351 may be fixed or otherwise coupled to inner surface 18*i* of wall 18*b* by one or more suitable mountings 361 (e.g., one or more welding or bonding locations, cladding, insert molding, screws, fasteners, rivets, hooks, tabs, holes, etc.). When user interface portion 352 is in its first user interface state (e.g., as shown in FIGS. 12A-12C, 12E, 13A-13C, 13E, and 14), user interface portion 352 may extend against and along inner surface 18*i* of wall 18*b* from first end 351 towards second end 353. In this first user interface state, user interface portion 352 may extend across and block at least a portion of user interface opening 17 provided through inner surface 18*i*, such that user interface portion 352 may be configured to press against housing 18 about user interface opening 17 for preventing debris from entering into housing 18 through user interface opening 17 when user interface portion 352 is in its first user interface state.

Moreover, as shown in FIGS. 12A-14, tray interface portion 358 may include a tray interface plate (e.g., a tray interface plate 392) that may extend between first tray interface portion end 357 and second tray interface portion end 359, and second end 359 may be fixed or otherwise coupled to inner surface 18*i* of wall 18*k* by one or more suitable mountings 369 (e.g., one or more welding or bonding locations, cladding, insert molding, screws, fasteners, rivets, hooks, tabs, holes, etc.). When tray interface portion 358 is in its first tray interface state (e.g., as shown in FIGS. 12A-12C, 12E, 13A-13C, 13E, and 14), tray interface portion 358 may extend across at least a portion of module housing opening 19 from second end 359 towards first end 357. In this first tray interface state, tray interface portion 358 may extend across at least a portion of module housing opening 19, such that tray interface portion 358 may interact with at least a portion of tray 20 when tray 20 is inserted through module housing opening 19 and into connector 40.

In some embodiments, first end 351 of user interface portion 352 and second end 359 of tray interface portion 358 may be fixed with respect to one another or be at least partially constrained with respect to one another. Each one of first end 351 and second end 359 may be fixed to or have its movement at least partially constrained by any portion of device 10 (e.g., housing 18, connector 40, etc.). First end 351 may be fixed to or have its movement at least partially constrained/restrained by a first portion of device 10 at a first location within housing 18 by mounting 361 and second end 359 may be fixed to or otherwise have its movement at least partially constrained/restrained by a second portion of device 10 at a second location within housing 18 by mounting 369.

First end 357 of tray interface portion 358 may be coupled to second end 353 of user interface portion 352 in any suitable manner using any suitable coupling 355. Coupling 355 may allow constrained relative motion between user interface portion 352 and tray interface portion 358, such that user interface portion 352 may change between its first and second user interface states when tray interface portion 358 may change between its first and second tray interface states, and vice versa. Therefore, coupling 355 may allow for ejector mechanism 350 to change between a first ejector mechanism state (e.g., when each one of user interface portion 352 and tray interface portion 358 is in its respective first state) and a second ejector mechanism state (e.g., when each one of user interface portion 352 and tray interface portion 358 is in its respective second state). For example, as shown in FIGS. 12A-14, coupling 355 formed between second end 353 of user interface portion 352 and first end 357 of tray interface portion 358 may be a seamless integrated coupling, such that user interface portion 352 and tray interface portion 358 may be a single unitary component extending between first end 351 and second end 359. In other embodiments, coupling 355 may be a hinged bearing (e.g., to allow relative rotation of ends 353 and 357), a welded or bonded coupling, a rivet, a fastener, a screw, or any other suitable coupling.

The tendency for ejector mechanism 350 to change between its first and second ejector mechanism states (e.g., the tendency for user interface portion 352 and tray interface portion 358 to change between their respective first and second states), may be defined by one or more material characteristics of user interface portion 352 and/or tray interface portion 358, by one or more characteristics of mounting 361 and/or mounting 369, and/or by one or more characteristics of coupling 355. For example, in some embodiments, the material characteristics of user interface portion 352 and the characteristics of mounting 361 may be such that, absent any external forces acting on user interface portion 352 (e.g., any user input force provided by user input tool 98 or any force provided by tray interface portion 358 via coupling 355), user interface portion 352 may not be biased to exist in one user interface state or the other. That is, if first user interface portion end 351 of a rigid user interface portion 352 is coupled to housing 18 using an unbiased free swinging hinge mounting 361, such a user interface portion 352 may have no tendency to move in either the direction of arrow U1" from its second user interface state to its first user interface state or in the direction of arrow U2" from its first user interface state to its second user interface state, absent being coupled via a coupling 355 to a tray interface portion 358 having a tendency to move, respectively, in either the direction of arrow T1" from its second tray interface state to its first tray interface state or in the direction of arrow T2" from its first tray interface state to its second tray interface state (see, e.g., FIGS. 12D and 12E). Similarly, in other embodiments, the material characteristics of tray interface portion 358 and the characteristics of mounting 369 may be such that, absent any external forces acting on tray interface portion 358 (e.g., any tray input force provided by tray 20 or any force provided by user interface portion 352 via coupling 355), tray interface portion 358 may not be biased to exist in one tray interface state or the other. That is, if second tray interface portion end 359 of a rigid tray interface portion 358 is coupled to housing 18 using an unbiased free swinging hinge mounting 369, such a tray interface portion 358 may have no tendency to move in either the direction of arrow T1" from its second tray interface state to its first tray interface state or in the direction of arrow T2" from its first tray interface state to its second tray interface state, absent being coupled via coupling 355 to a user interface portion 352 having a tendency to move, respectively, in either the direction of arrow U1" from its second user interface state to its first user interface state or in the direction of arrow U2" from its first user interface state to its second user interface state. In yet other embodiments, user interface portion 352 and tray interface portion 358 may each be independently biased to exist in one of their two respective states, such that, when they are coupled via coupling 355, the tendency of ejector mechanism 350 to move from its second ejector mechanism state to its first ejector mechanism state or from its first ejector mechanism state to its second ejector mechanism state may be based on the combination of the independent tendencies of user interface portion 352 and tray interface portion 358 to do so. Any suitable tension may exist between mountings 361 and 369 (e.g., between ends 351 and 359) to bias user interface portion 352 and/or tray interface portion 358 such that ejector mechanism 350 may remain in a particular ejector mechanism state when an input force (e.g., a user input force and/or a tray input force) is not applied to ejector mechanism 350. For example, in some embodiments, when ejector mechanism 350 is in its first ejector mechanism state, at least one of user interface portion 352 and tray interface portion 358 may be relaxed in its first state, and when ejector mechanism 350 is in its second ejector mechanism state, at least one of user interface portion 352 and tray interface portion 358 may be pulled taut in its second state. By changing from a state of tautness to a state of relaxation (e.g., from a taut state having a first stress to a relaxed state having a second stress that may be lower than the first stress), tray interface portion 358 may impart an ejection force onto tray 20. As another example, in some embodiments, when ejector mechanism 350 is in its first ejector mechanism state, at least one of user interface portion 352 and tray interface portion 358 may be held taut in its first state, and when ejector mechanism 350 is in its second ejector mechanism state, at least one of user interface portion 352 and tray interface portion 358 may be relaxed in its second state. By changing from a state of relaxation to a state of tautness (e.g., from a relaxed state having a first stress to a taut state having a second stress that may be greater than the first stress), tray interface portion 358 may impart an ejection force onto tray 20.

For example, as shown in FIGS. 12A and 13A, before any portion of tray 20 has been inserted into housing 18, before any user input force has been applied to user interface portion 352, and before any tray input force has been applied to tray interface portion 358, ejector mechanism 350 may be configured to be in its first ejector mechanism state. Therefore, as shown, when ejector mechanism 350 is in its first ejector mechanism state, user interface portion 352 may extend along inner surface 18i and across at least a portion of user interface opening 17, and tray interface portion 358 may extend across at least a portion of module housing opening 19. In this first ejector mechanism state, ejector mechanism 350 may be biased such that user interface portion 352 (e.g., plate 372) may exert a force in the direction of arrow U1" on housing 18 or on any other suitable portion of device 10, and/or such that tray interface portion 358 may exert a force in the direction of arrow T1" along housing 18 or on any other suitable portion of device 10. In other embodiments, neither user interface portion 352 nor tray interface portion 358 may be exerting any force in the directions of respective arrows U1" and T1" when ejector mechanism 350 is in its first ejector mechanism state.

Once tray 20 has been initially inserted through opening 19 and into housing 18 in the direction of arrow I to a certain extent, as shown in FIGS. 12B and 13B, for example, a portion of tray 20 may not interact with a portion of tray interface portion 358 such that tray interface portion 358 may remain in its first tray interface state. For example, as shown, when tray interface portion 358 is in its first tray interface state, a portion of tray interface portion 358 may be deflected away from opening 19 and, thus, away from end 23 of tray 20 as tray 20 is initially inserted through opening 19 and into housing 18. As shown in FIGS. 12A and 13A, for example, a deflectable tray interface portion 393 of tray interface plate 392 may be in a deflected state that may be deflected away from a substantially linear path of plate 392 by a deflected tray interface distance TD when tray interface portion 358 is in its first tray interface state. This deflected state may prevent leading edge 29 of tray 20 from contacting tray interface plate 392 as tray 20 is initially inserted through opening 19 and into housing 18 in the direction of arrow I.

However, once tray 20 has been fully inserted into housing 18 in the direction of arrow I, such that tray 20 may be in its fully loaded position of FIGS. 12C and 13C, for example, tray interface portion 358 may be configured to contact a portion of tray 20 while remaining in its first tray interface state. For example, as shown, a portion of deflectable tray interface portion 393 of tray interface plate 392 of tray interface portion 358 may contact leading edge 29 of tray 20 once tray 20 reaches its fully loaded position (e.g., a position whereby retention members 42a and 42b may retain tray 20 in its fully loaded position). In some embodiments, such contact between tray interface portion 358 in its first tray interface state and tray 20 in its fully loaded position may be a passive contact (e.g., contact that may not reinforce itself via geometry or attraction (e.g., magnetic attraction)). In other embodiments, such contact between tray interface portion 358 in its first tray interface state and tray 20 in its fully loaded position may be an active contact (e.g., as shown in FIG. 12C, deflectable portion 393 of tray interface plate 392 and leading edge 29 of tray 20 may respectively comprise attractable magnets 393m and 29m, which may hold tray 20 in contact with tray interface plate 392). In such an active contact embodiment, tray interface portion 358 may be configured to hold tray 20 in its fully loaded position (e.g., without the aid of retention members 42a and 42b). In other embodiments, once tray 20 has been fully inserted into housing 18 in the direction of arrow I, such that tray 20 may be in its fully loaded position of FIGS. 12C and 13C, for example, tray interface portion 358 may be configured to remain in its first tray interface state but may not contact tray 20.

When retained in its fully loaded position of FIGS. 12C and 13C, outer surface 21x of outer tray end 21 of tray 20 may be substantially flush and/or continuous with an outer surface 18o of housing 18 about opening 19. In some embodiments, ejector mechanism 350 may be biased to remain in its first ejector mechanism state, such that ejector mechanism 350 may prevent tray 20 from being inserted further in the direction of arrow I. For example, deflectable tray interface portion 393 of tray interface plate 392 of tray interface portion 358 may be configured such that it is unable to be deflected further in the direction of arrow I (e.g., to increase deflected tray interface distance TD in the direction of arrow T1"), thereby preventing tray 20 from being inserted further in the direction of arrow I after initially contacting tray interface plate 392. Additionally or alternatively, a portion of housing 18 may interact with tray 20 to prevent tray 20 from being inserted further in the direction of arrow I. For example, as shown in FIG. 13C, housing 18 may include a housing key portion 18y that may be positioned within or adjacent an end of opening 19, such that housing key portion 18y may obstruct and prevent a portion of tray 20 (e.g., a portion of outer tray end 21) from being inserted further in the direction of arrow I. Ejector mechanism 350 may be configured such that housing key portion 18y may interact with tray 20 at about the same moment that tray interface portion 358 may contact tray 20. Moreover, housing key portion 18y may be positioned with respect to opening 19 such that tray 20 may not be inserted too far within opening 19 while tray 20 is upside down. For example, if tray 20 were attempted to be inserted into opening 19 in the direction of arrow I while bottom surface 25b of tray 20 was facing upwards (e.g., towards housing key portion 18y of FIG. 13B), then housing key portion 18y may be configured to obstruct and prevent ejector interface portion 28 from being inserted in the direction of arrow I beyond housing key portion 18y. Therefore, a user may be prevented from inserting tray 20 too far into opening 18 when tray 20 is upside down.

Once tray 20 is held in its functional or fully loaded position of FIGS. 12C and 13C, ejector mechanism 350 may be configured to receive a user input force, which may cause ejector mechanism 350 to change from its first ejector mechanism state to its second ejector mechanism state, which may at least partially eject tray 20 from device 10. For example, as shown in FIGS. 12D and 13D, first end 99 of user input tool 98 may be inserted through user interface opening 17 in housing 18 for applying a user input force in the direction of arrow UI onto a portion of user interface portion 352 (e.g., onto a cosmetic surface portion 379 of user interface plate 372, which may cover opening 17 when in the first ejector mechanism state). When this user input force is applied onto user interface portion 352, user interface portion 352 (e.g., plate 372) may be configured to change from its first user interface state of FIGS. 12C and 13C to its second user interface state of FIGS. 12D and 13D. As shown in FIGS. 12D and 13D, for example, a deflectable user interface portion 377 of user interface plate 372 may be deflected away from a substantially linear path of plate 372 by a deflected user interface distance UD from an undeflected state to a deflected state in the direction of arrow U2" when user interface portion 352 is in its second user interface state. When user interface portion 352 changes from its first user interface state to its second user interface state, the change may cause tray interface portion 358 to change from its first tray interface state of FIGS. 12C and 13C to its second tray interface state of FIGS. 12D and 13D. This alteration of states by tray interface portion 358 may cause at least a portion of tray interface portion 358 to interact with tray 20 for at least partially ejecting tray 20 from device 10 in the direction of arrow O, as shown in FIGS. 12D and 13D.

For example, as shown, when tray interface portion 358 changes from its first tray interface state to its second tray interface state for at least partially ejecting tray 20, deflectable tray interface portion 393 of tray interface plate 392 of tray interface portion 358 may change from its deflected state to an undeflected or straight state (e.g., by reducing or eliminating deflected tray interface distance TD as shown in FIGS. 12D and 13D). This movement of deflectable tray interface portion 393 of tray interface plate 392 of tray interface portion 358 from its deflected state to its undeflected state in the direction of arrow T2", when tray interface portion 358 changes from its first tray interface state to its second tray interface state, may push leading edge 29 of tray 20 in the direction of arrow T2" for at least partially ejecting tray 20 from device 10 in the direction of arrow O. As shown in FIGS. 12D and 13D, for example, device 10 may be configured such that, when tray interface portion 358 does change to its second tray interface state, ejector mechanism 350 may no longer retain tray 20 in its fully loaded position. For example, the force that may be applied by tray interface plate 392 onto tray 20 in the direction of arrow T2" may be great enough to overcome any other retaining force that device 10 may use to retain tray 20 in its fully loaded position (e.g., any retention force that may be applied by retention members 42a and 42b). Moreover, when contact between tray interface portion 358 and tray 20 may be configured to be an active contact, such an active contact may be terminated when tray interface portion 358 changes to its second tray interface state. For example, when tray interface portion 358 changes to its second tray interface state (e.g., when deflectable portion 393 of tray interface plate 392 may change from its deflected state to its undeflected state), at least one of attractable magnets 393m and 29m may be weakened such that any active contact created by attractable magnets 393m and 29m may be terminated or otherwise overcome. This may allow tray 20 to be more easily removed from device 10.

Figure 13E:
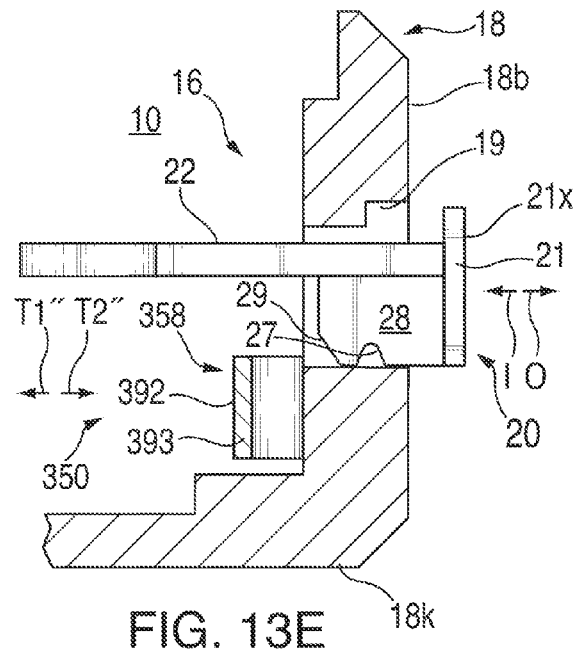
FIG. 13E is a cross-sectional view of the portion of the electronic device of FIGS. 1-2E and 12A-13D, taken from line XIIIE-XIIIE of FIG. 12E, in accordance with some embodiments of the invention.

Then, once tray interface portion 358 is in its second tray interface state of FIGS. 12D and 13D, and once the application of the user input force on user interface portion 352 is terminated, ejector mechanism 350 may be configured to return from its second ejector mechanism state to its first ejector mechanism state. For example, when first end 99 of user input tool 98 is at least partially withdrawn through user interface opening 17 in the direction of arrow UO for terminating the application of a user input force on a portion of user interface portion 352 (e.g., on cosmetic surface portion 379 of user interface plate 372), user interface portion 352 may be configured to return from its second user interface state of FIGS. 12D and 13D to its first user interface state of FIGS. 12E and 13E. For example, as shown, when user interface portion 352 changes from its second user interface state to its first user interface state, deflectable user interface portion 377 of user interface plate 372 of user interface portion 352 may change from its deflected state to an undeflected or straight state (e.g., by reducing or eliminating deflected user interface distance UD as shown in FIGS. 12E and 13E). This movement of deflectable user interface portion 377 of user interface plate 372 of user interface portion 352 from its deflected user interface state to its undeflected user interface state in the direction of arrow U1", when user interface portion 352 changes from its second user interface state to its first user interface state, may cause tray interface portion 358 to change from its second tray interface state of FIGS. 12D and 13D to its first tray interface state of FIGS. 12E and 13E and, thus, may cause deflectable tray interface portion 393 of tray interface plate 392 of tray interface portion 258 to move in the direction of arrow T1" from its undeflected tray interface state of FIGS. 12D and 13D to its deflected tray interface state of FIGS. 12E and 13E.

Therefore, ejector mechanism 350 of FIGS. 12A-14 may be configured to change between a first ejector mechanism state (e.g., an ejector mechanism state that may include a first user interface state and a first tray interface state) and a second ejector mechanism state (e.g., an ejector mechanism state that may include a second user interface state and a second tray interface state), such that ejector mechanism 350 may receive, retain, and/or eject tray 20 and/or removable module 30. For example, user interface portion 352 may be configured to change from the first user interface state to the second user interface state when a user input force is applied by a user onto user interface portion 352 (e.g., deflectable user interface portion 377 of user interface plate 372 of user interface portion 352 may be configured to change from its undeflected tray interface state to its deflected tray interface state, as shown in FIGS. 12D and 13D). User interface portion 352 may also be configured to change from the second user interface state to the first user interface state when the application of a user input force onto user interface portion 352 is terminated (e.g., deflectable user interface portion 377 of user interface plate 372 of user interface portion 352 may be configured to change from its deflected tray interface state to its undeflected tray interface state, as shown in FIGS. 12E and 13E). Moreover, tray interface portion 358 may be configured to change from the first tray interface state to the second tray interface state in response to user interface portion 352 changing from the first user interface state to the second user interface state (e.g., deflectable tray interface portion 393 of tray interface plate 392 of tray interface portion 358 may be configured to change from its deflected tray interface state to its undeflected tray interface state, as shown in FIGS. 12D and 13D). Tray interface portion 358 may also be configured to change from the second tray interface state to the first tray interface state in response to user interface portion 352 changing from the second user interface state to the first user interface state (e.g., deflectable tray interface portion 393 of tray interface plate 392 of tray interface portion 358 may be configured to change from its undeflected tray interface state to its deflected tray interface state, as shown in FIGS. 12E and 13E). In some embodiments, in response to user interface portion 352 receiving a user input force and thereby changing from the first user interface state to the second user interface state, the resultant change of tray interface portion 358 from the first tray interface state to the second tray interface state may cause tray interface portion 358 to at least partially eject tray 20 from connector 40 and/or opening 19 (e.g., as shown in FIGS. 12D and 13D).

Although ejector mechanism 350 may have been described with respect to FIGS. 12A-14 as being configured to change from its second ejector mechanism state of FIGS. 12D and 13D to its first ejector mechanism state of FIGS. 12E and 13E once application of a user input force by user input tool 98 in the direction of arrow UI onto user interface plate 372 is terminated, ejector mechanism 350 may alternatively be configured to remain in its second ejector mechanism state until tray 20 is re-inserted into device 10. For example, rather than being in its first ejector mechanism state during initial insertion of tray 20 (e.g., as shown in FIGS. 12B and 13B), ejector mechanism 350 may be configured to be in its second ejector mechanism state of FIGS. 12D and 13D during the initial insertion stage of tray 20 depicted in FIGS. 12B and 13B (e.g., the second ejector mechanism state of ejector mechanism 350 may be the ejector mechanism state for initial insertion of tray 20 into device 10). This may be done, for example, by configuring the bias of tray interface plate 392 of tray interface portion 358 towards the second ejector mechanism state to be greater than the bias of user interface plate 372 of user interface portion 352 towards the first ejector mechanism state. In such embodiments, when tray 20 is initially inserted through opening 19 in the direction of arrow I, leading edge 29 of tray 20 may initially make contact with tray interface plate 392 while plate 392 is in its undeflected or straight state (e.g., while tray interface portion 358 is in its second tray interface state of FIGS. 12D and 13D). Once this initial contact has been made, tray 20 may apply a tray input force in the direction of arrow I onto tray interface portion 358 as tray 20 is further inserted into device 10, which may cause tray interface portion 358 to change from its second tray interface state to its first tray interface state. For example, this tray input force may be applied in the direction of arrow I by leading edge 29 of tray 20 onto deflectable tray interface portion 393 of tray interface plate 392 of tray interface portion 358, which may cause deflectable portion 393 to move in the direction of arrow T1" from its undeflected state of FIGS. 12D and 13D to its deflected state of FIGS. 12C and 13C, such that tray 20 may be held in its fully loaded position as described above.

As mentioned, the tendency for ejector mechanism 350 to change between its first and second ejector mechanism states (e.g., the tendency for user interface portion 352 and tray interface portion 358 to change between their respective first and second states), may be defined by one or more material characteristics of user interface portion 352 and/or tray interface portion 358, by one or more characteristics of mounting 361 and/or mounting 369, and/or by one or more characteristics of coupling 355. For example, in some embodiments, the characteristics of mounting 361 and the characteristics of user interface plate 372 may be such that user interface plate 372 may be biased to remain in the first user interface state absent any external forces acting on user interface plate 372 (e.g., any user input force provided by user input tool 98 or any force provided by tray interface portion 358 via coupling 355). For example, user interface plate 372 may be biased to remain in its undeflected state. Such a bias may also force tray interface plate 392 in the direction of arrow T1", such that ejector mechanism 350 may tend to be in its first ejector mechanism state. Alternatively, in some embodiments, the characteristics of mounting 369 and the characteristics of tray interface plate 392 may be such that tray interface portion 358 may be biased to remain in the second tray interface state absent any external forces acting on tray interface portion 358 (e.g., any tray input force provided by tray 20 or any force provided by user interface plate 372 via coupling 355). For example, tray interface plate 392 may be biased to remain in its undeflected state. Such a bias may also force user interface plate 372 in the direction of arrow U2", such that ejector mechanism 350 may tend to be in its second ejector mechanism state. In yet other embodiments, tray interface plate 392 and user interface plate 372 may each be independently biased to exist in one of their two respective states, such that, when they are coupled via coupling 355, the tendency of ejector mechanism 350 to move from its second ejector mechanism state to its first ejector mechanism state or from its first ejector mechanism state to its second ejector mechanism state may be based on the combination of the independent tendencies of tray interface plate 392 and user interface plate 372 to do so. Any suitable tension may exist between mountings 361 and 369 (e.g., between ends 351 and 359) to bias user interface portion 352 and/or tray interface portion 358 such that ejector mechanism 350 may remain in a particular ejector mechanism state when an input force (e.g., a user input force and/or a tray input force) is not applied to ejector mechanism 350. For example, in some embodiments, when ejector mechanism 350 is in its first ejector mechanism state, at least one of user interface portion 352 and tray interface portion 358 may be relaxed in its first state, and when ejector mechanism 350 is in its second ejector mechanism state, at least one of user interface portion 352 and tray interface portion 358 may be pulled taut in its second state. By changing from a state of tautness to a state of relaxation (e.g., from a taut state having a first stress to a relaxed state having a second stress that may be lower than the first stress), tray interface portion 358 may impart an ejection force onto tray 20. As another example, in some embodiments, when ejector mechanism 350 is in its first ejector mechanism state, at least one of user interface portion 352 and tray interface portion 358 may be held taut in its first state, and when ejector mechanism 350 is in its second ejector mechanism state, at least one of user interface portion 352 and tray interface portion 358 may be relaxed in its second state. By changing from a state of relaxation to a state of tautness (e.g., from a relaxed state having a first stress to a taut state having a second stress that may be greater than the first stress), tray interface portion 358 may impart an ejection force onto tray 20.

In some embodiments, first end 351 of user interface portion 352 may be the only portion of user interface portion 352 that is coupled to any portion of housing 18, connector 40, or any other portion of device 10 other than tray interface portion 358. Similarly, in some embodiments, second end 359 of tray interface portion 358 may be the only portion of tray interface portion 358 that is coupled to any portion of housing 18, connector 40, or any other portion of device 10 other than user interface portion 352. That is, besides ends 351 and 359, which may be distinct with tension therebetween, no other portion of ejector mechanism 350 may be coupled to any other portion of device 10. Coupling 355 and ends 353 and 357 may be free from any other components of device 10 and may only be impacted by a removable entity or a user input tool.

In some embodiments, user interface portion 352 and tray interface portion 358 may together may be any suitable unitary component that may be capable of deflecting, deforming, bending, springing, pivoting, translating, rotating, moving, or otherwise changing between a first ejector mechanism state or position (e.g., as shown in FIGS. 12A-12C, 12E, 13A-13C, 13E, and 14) and a second ejector mechanism state or position (e.g., as shown in FIGS. 12D and 13D). For example, both user interface plate 372 and tray interface plate 392 may be made of any suitable material, such as rubber, plastic, metal, or any suitable combinations thereof. In some embodiments, one or both of plates 372 and 392 may be made of a woven material (e.g., Kevlar™) and may be treated with a rubber material and/or impregnated with a polyurethane plastic (e.g., a thermoplastic polyurethane), such that one or both of plates 372 and 392 may be similar to a rubber band with internal woven material. In some other embodiments, one or both of plates 372 and 392 may be made of a spring steel or other suitable material, and one or both of plates 372 and 392 may be conductive or electrically isolated. In some embodiments, user interface plate 372 and tray interface plate 392 may be formed separately (e.g., by the same or different processes and/or with the same or different materials), and then plates 372 and 392 may be joined together (e.g., by coupling 355) using any suitable technique, such as welding, cladding, crimping, bonding, gluing, fusing, adhering, and the like.

Moreover, in some embodiments, as shown, a backing plate 382 may be provided to reinforce at least a portion of user interface portion 352. For example, as shown, backing plate 382 may be positioned at least along a portion of the backside of user interface plate 372 that may be opposite to cosmetic surface portion 379. Backing plate 382 may be coupled to user interface plate 372 by one or more suitable mountings 363 (e.g., one or more welding or bonding locations, cladding, crimping, gluing, fusing, adhering, etc.). In some embodiments, user interface plate 372 may be flexible sheet metal or any other suitable material or combination of materials, and backing plate 382 may be a laminate that may be welded or otherwise coupled to user interface plate 372 via one or more mountings 363 for increasing the rigidity of the portion of user interface plate 372 that may receive a user input tool force in the direction of arrow UI.

Figure 14:
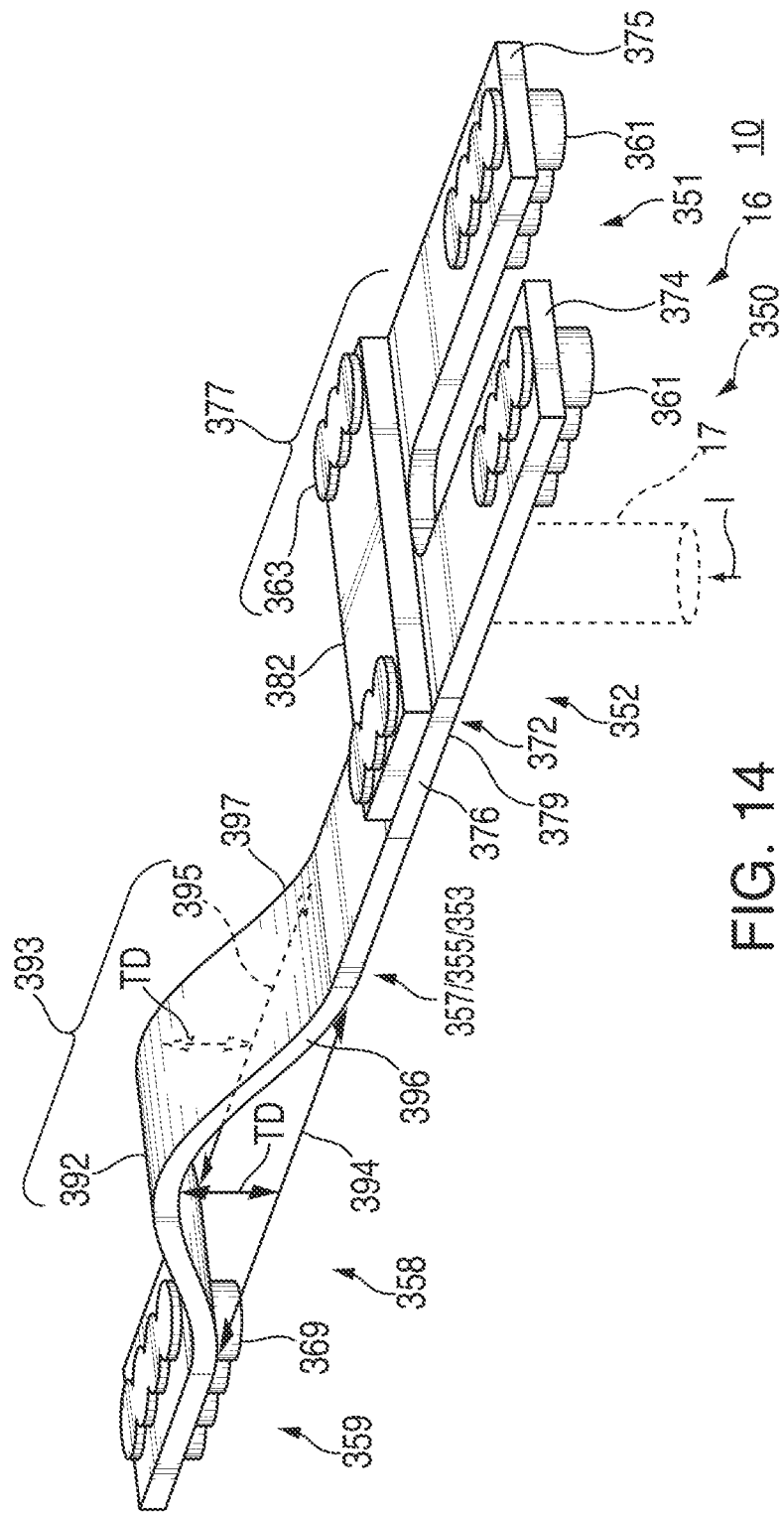
FIG. 14 is a perspective view of a portion of the third alternative embodiment of the portion of the ejectable component assembly of FIGS. 12A-13E, in accordance with some embodiments of the invention.

In some embodiments, as shown in FIG. 14, user interface plate 372 may include an input tool receiving section 376 (e.g., a section that may include cosmetic surface portion 379) and at least a first extension section 374 that may extend from input tool receiving section 376 towards first end 351 of user interface portion 352 and that may be coupled to device 10 using one or more suitable mountings 361. Moreover, in some embodiments, as shown, user interface plate 372 may also include a second extension section 375 that may extend from input tool receiving section 376 towards first end 351 of user interface portion 352 and that may be coupled to device 10 using one or more suitable mountings 361. First extension section 374 and second extension section 375 may be distinct, may extend from different portions of input tool receiving section 376, and may be coupled to different portions of device 10 (e.g., by different mountings 361).

Figure 15A:
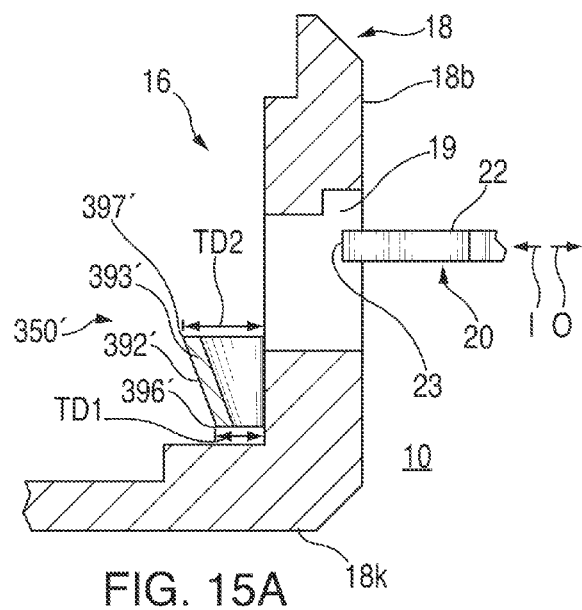
FIG. 15A is a cross-sectional view, similar to FIG. 13A, of the portion of the fourth alternative embodiment of the portion of the ejectable component assembly of FIG. 15, in accordance with some embodiments of the invention.

Moreover, in some embodiments, as shown in FIG. 14, deflectable tray interface portion 393 of tray interface plate 392, when in its deflected state, may define a first deflected perimeter 394 along a first edge 396 of tray interface plate 392 and a second deflected perimeter 395 along a second edge 397 of tray interface plate 392. As shown in FIGS. 13A and 14, first edge 396 and second edge 397 may be on opposite sides of tray interface plate 392, first deflected perimeter 394 and second deflected perimeter 395 may be the same length and geometry, and each one of first deflected perimeter 394 and second deflected perimeter 395 may define the same deflected tray interface distance TD when tray interface plate 392 is in its deflected tray interface state. However, in other embodiments, as shown in FIGS. 15 and 15A, an ejector mechanism 350' may be provided that may be substantially identical to ejector mechanism 350 of FIGS. 12A-14, except that deflectable tray interface portion 393' of tray interface plate 392', when in its deflected state, may define a first deflected perimeter 394' along a first edge 396' of tray interface plate 392' and a second deflected perimeter 395' along a second edge 397' of tray interface plate 392', such that first deflected perimeter 394' may be shorter and/or of a different geometry than second deflected perimeter 395'. In such an embodiment, first deflected perimeter 394' may define a first deflected tray interface distance TD1 at first edge 396' and second deflected perimeter 395' may define a second deflected tray interface distance TD2 at second edge 397' that may be greater than first deflected tray interface distance TD1 when tray interface plate 392' is in its deflected tray interface state of FIG. 15. Distance TD1 of FIG. 15A may be less than distance TD of FIGS. 13A and 14, such that edge 396' of ejector mechanism 350' may be held closer than edge 396 of ejector mechanism 350 to inner surface 18*i* of housing 18. Edge 396' may reach peak tension and may straighten sooner than edge 397', which may create a different ejection force than edges 396 and 397, which may straighten at the same time.

It is to be understood that any portion of any user interface portion of any ejector mechanism may be provided as an independent element of the ejector mechanism or may be provided as a single unitary element along with any portion of any tray interface portion of the ejector mechanism. Therefore, in some embodiments, an ejector mechanism may be provided with a single element that may function as a user interface portion and a tray interface portion.

Figure 16:
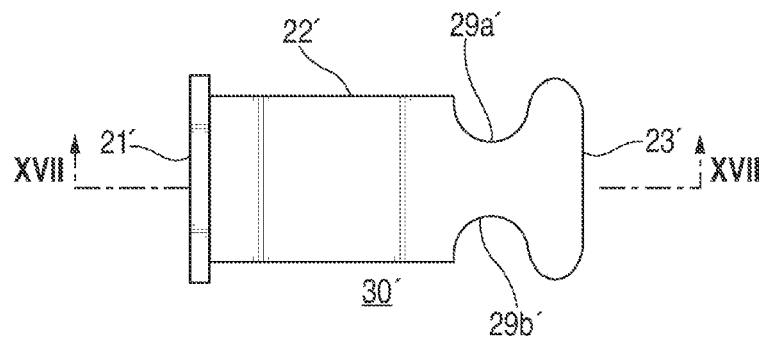
FIG. 16 is an elevational view of an alternative embodiment of a removable module for an ejectable component assembly, in accordance with some embodiments of the invention.
Figure 17:
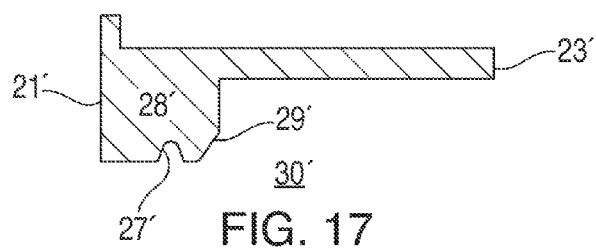
FIG. 17 is a cross-sectional view of the removable module of FIG. 16, taken from line XVII-XVII of FIG. 16, in accordance with some embodiments of the invention.

It is to be understood that, although ejectable component assembly 16 has been described as including a connector 40 and a tray 20 for loading a removable module 30 within connector 40, tray 20 may be unnecessary and any removable module to be inserted into connector 40 may be shaped with some or all of the features of tray 20. For example, as shown in FIGS. 16 and 17, a removable module 30' can be provided that may be substantially the same as removable module 30, but that also can include one or more of a first end 21' that may be shaped similarly to first tray end 21 of tray 20, a second end 23' that may be shaped similarly to second end 23 of tray 20, grooves 29*a*' and 29*b*' that may be shaped similarly to grooves 29*a* and 29*b* of tray 20, an ejector interface portion 28' that may shaped similarly to ejector interface portion 28 of tray 20, a securement feature 27' that may shaped similarly to securement feature 27 of tray 20, and a leading edge 29' that may shaped similarly to leading edge 29 of tray 20, such that module 30' may be inserted into and ejected from device 10 in the same way that tray 20 may be inserted into and ejected from device 10. Therefore, a tray input force that may be applied by a tray, as described above with respect to FIGS. 1-15A, may similarly be referred to as a removable entity input force that may be applied by a removable entity (e.g., by removable module 30).

While there have been described systems and methods for ejecting removable modules from electronic devices, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms such as "up and "down," "front" and "back," "top" and "bottom," "left" and "right," "length" and "width," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention. Moreover, an electronic device constructed in accordance with the principles of the invention may be of any suitable three-dimensional shape, including, but not limited to, a sphere, cone, octahedron, or combination thereof, rather than a hexahedron, as illustrated by FIGS. 1-17.

Therefore, those skilled in the art will appreciate that the invention can be practiced by other than the described embodiments, which are presented for purposes of illustration rather than of limitation.

What is claimed is:

1. An electronic device comprising:
   a tray having a first external surface and defining a securement feature;
   a housing having a second external surface that defines an opening for receiving the tray; and an ejector mechanism positioned within the housing and comprising:

a tray interface portion configured to occupy a first position at least partially contained within the securement feature, thereby applying a retaining force to the tray such that the first external surface of the tray is substantially flush with the second external surface of the housing, and further configured to occupy a second position, thereby applying an election force to an edge of the securement feature so as to cause the tray to elect from the opening.

2. The electronic device of claim 1, further comprising a connector positioned within the housing and configured to interface with at least one electrical contact of a removable module sized to fit within the tray.

3. The electronic device of claim 1, wherein the housing further comprises a user interface aperture positioned adjacent the opening.

4. The electronic device of claim 3, wherein the user interface portion is positioned within the housing and aligned with the user interface aperture.

5. The electronic device of claim 1, wherein the user interface portion transitions the tray interface portion from the first position to the second position when an input force is applied to the user interface portion.

6. The electronic device of claim 5, wherein the user input force is applied through the user interface aperture to a surface of the user interface portion.

7. The electronic device of claim 5, wherein, when the tray is placed into the opening and a user force is applied to advance the tray into the opening, the user interface portion changes from the second position to the first position.

8. The electronic device of claim 2, wherein the removable module comprises a subscriber identity module ("SIM") card.

9. The electronic device of claim 1, wherein the retaining force is provided by magnetic attraction between the tray and the ejector mechanism.

10. The electronic device of claim 1, wherein the retaining force is provided by a spring beam biased to apply a mechanical force to maintain the user interface portion in the first position.

11. An apparatus for separating a removable entity from a connector comprising:

a plate comprising a deflectable end and a fixed end joined to the deflectable end; and a spring beam coupled to the deflectable end of the plate, configured to pivot about an axis when the deflectable end deflects; wherein the spring beam is configured to interface with a securement feature of the removable entity when the spring beam is in a first position and further configured to move to a second position in response to the deflectable end deflecting, thereby applying an ejection force to the removable entity.

12. The apparatus of claim 11, wherein the removable entity comprises a tray for receiving a removable module.

13. The apparatus of claim 12, wherein the removable module comprises a subscriber identification module ("SIM)" card.

14. The apparatus of claim 11, wherein, when the deflectable end is not deflected, the spring beam occupies the first position and thereby applies a retaining force to the securement feature to retain the position of the removable entity.

15. The apparatus of claim 11, wherein deflecting the deflectable end comprises received a user force.

16. The apparatus of claim 14, wherein the retaining force is configured to retain a substantially flush relationship between an external surface of the removable entity and an external surface of an electronic device enclosing the apparatus.

17. The apparatus of claim 16, wherein the plate applies a springing force to maintain the deflectable end in a non-deflected position when a user force is not applied.

18. The apparatus of claim 11, wherein the securement feature comprises a notch.

* * * * *

UNITED STATES PATENT AND TRADEMARK OFFICE
CERTIFICATE OF CORRECTION

| | |
|---|---|
| PATENT NO. | : 9,135,944 B2 |
| APPLICATION NO. | : 14/089704 |
| DATED | : September 15, 2015 |
| INVENTOR(S) | : Kenneth A. Jenks |

Page 1 of 1

It is certified that error appears in the above-identified patent and that said Letters Patent is hereby corrected as shown below:

In the Claims

In column 49, at line 9, delete "election" and insert --ejection--.

In column 49, at line 10, delete "elect" and insert --eject--.

Signed and Sealed this
Fifteenth Day of March, 2016

Michelle K. Lee
*Director of the United States Patent and Trademark Office*